US009688825B2

(12) United States Patent
Katou et al.

(10) Patent No.: US 9,688,825 B2
(45) Date of Patent: *Jun. 27, 2017

(54) METHOD FOR MANUFACTURING RUBBER COMPOSITION

(75) Inventors: Seiichi Katou, Tokyo (JP); Satoshi Horie, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 379 days.

This patent is subject to a terminal disclaimer.

(21) Appl. No.: 13/876,983

(22) PCT Filed: Oct. 3, 2011

(86) PCT No.: PCT/JP2011/072791
§ 371 (c)(1),
(2), (4) Date: Jun. 10, 2013

(87) PCT Pub. No.: WO2012/043855
PCT Pub. Date: Apr. 5, 2012

(65) Prior Publication Data
US 2013/0296463 A1  Nov. 7, 2013

(30) Foreign Application Priority Data

Oct. 1, 2010 (JP) ................................ 2010-224358

(51) Int. Cl.
| C08J 3/20 | (2006.01) |
| C08J 3/22 | (2006.01) |
| C08K 3/00 | (2006.01) |
| C08K 3/04 | (2006.01) |
| C08K 3/36 | (2006.01) |
| C08K 5/00 | (2006.01) |
| C08K 5/31 | (2006.01) |
| C08K 5/38 | (2006.01) |
| C08K 5/39 | (2006.01) |
| C08K 5/40 | (2006.01) |
| C08K 5/44 | (2006.01) |
| C08K 5/47 | (2006.01) |
| C08K 5/548 | (2006.01) |
| C08K 9/06 | (2006.01) |
| C08K 5/405 | (2006.01) |
| C08L 7/00 | (2006.01) |

(52) U.S. Cl.
CPC . *C08J 3/22* (2013.01); *C08J 3/20* (2013.01); *C08K 3/0033* (2013.01); *C08K 3/04* (2013.01); *C08K 3/36* (2013.01); *C08K 5/0025* (2013.01); *C08K 5/31* (2013.01); *C08K 5/38* (2013.01); *C08K 5/39* (2013.01); *C08K 5/40* (2013.01); *C08K 5/44* (2013.01); *C08K 5/47* (2013.01); *C08K 5/548* (2013.01); *C08K 9/06* (2013.01); *C08J 2309/00* (2013.01); *C08K 5/405* (2013.01); *C08L 7/00* (2013.01)

(58) Field of Classification Search
CPC ........................................................ C08J 3/22
USPC ........................................................ 523/351
See application file for complete search history.

(56) References Cited

U.S. PATENT DOCUMENTS

| 6,420,488 | B1 | 7/2002 | Penot |
| 8,969,455 | B2 * | 3/2015 | Katou ...................... C08K 3/36 524/322 |
| 9,115,257 | B2 * | 8/2015 | Katou ........................ C08J 3/20 |
| 9,228,072 | B2 * | 1/2016 | Katou ...................... C08K 3/36 |
| 2001/0034389 | A1 | 10/2001 | Vasseur |
| 2003/0008954 | A1 * | 1/2003 | Tadaki et al. ................. 524/261 |
| 2003/0105242 | A1 | 6/2003 | Penot |
| 2003/0144394 | A1 | 7/2003 | Penot et al. |
| 2006/0089451 | A1 * | 4/2006 | Nakazono et al. ........... 524/571 |
| 2008/0306213 | A1 | 12/2008 | Jiang et al. |
| 2010/0048775 | A1 | 2/2010 | Mihara et al. |
| 2014/0181580 | A1 * | 6/2014 | Bharadwaj et al. ............ 714/15 |

FOREIGN PATENT DOCUMENTS

| EP | 0643098 A1 | 3/1995 |
| EP | 0818478 A1 | 1/1998 |
| EP | 0849321 A1 | 6/1998 |
| JP | 7-165991 A | 6/1995 |
| JP | 11-263882 A | 9/1999 |

(Continued)

OTHER PUBLICATIONS

Communication from the Japanese Patent Office issued Sep. 16, 2014 in a counterpart Japanese Patent Application No. 2012-536605.
International Search Report for PCT/JP2011/072791 dated Dec. 13, 2011.
Extended Search Report issued in corresponding European Patent Application No. 11829407.3 on Mar. 14, 2014.
Communication dated Aug. 10, 2015 from the Russian Patent Office in counterpart application No. 2013120287.

*Primary Examiner* — Hannah Pak
(74) *Attorney, Agent, or Firm* — Sughrue Mion, PLLC

(57) ABSTRACT

The present invention relates to a method for producing a rubber composition containing a rubber component (A) of at least one selected from natural rubbers and synthetic dienic rubbers, a filler containing an inorganic filler (B), a silane coupling agent (C) and at least one vulcanization promoter (D) selected from guanidines, sulfenamides, thiazoles, thiurams, dithiocarbamate salts, thioureas and xanthate salts, wherein the rubber composition is kneaded in at least three stages, in the first stage (X) of kneading, the rubber component (A), all or a part of the inorganic filler (B), and all or a part of the silane coupling agent (C) are kneaded, then in the stage (Y) on and after the second stage of kneading but before the final stage, the vulcanization promoter (D) is added and kneaded, and in the final stage (Z) of kneading, a vulcanizing agent is added and kneaded.

14 Claims, No Drawings

(56) References Cited

FOREIGN PATENT DOCUMENTS

| | | |
|---|---|---|
| JP | 2002-521515 A | 7/2002 |
| JP | 2002-521516 A | 7/2002 |
| JP | 2003-523472 A | 8/2003 |
| JP | 2003-530443 A | 10/2003 |
| WO | 96/30419 A1 | 10/1996 |
| WO | 2008/102513 A1 | 8/2008 |

* cited by examiner

METHOD FOR MANUFACTURING RUBBER COMPOSITION

CROSS REFERENCE TO RELATED APPLICATIONS

This application is a National Stage of International Application No. PCT/JP2011/072791 filed Oct. 3, 2011, claiming priority based on Japanese Patent Application No. 2010-224358 filed Oct. 1, 2010, the contents of all of which are incorporated herein by reference in their entirety.

TECHNICAL FIELD

The present invention relates to a method for producing a rubber composition containing an inorganic filler and having an improved low-heat-generation property.

BACKGROUND ART

Recently, in association with the movement of global regulation of carbon dioxide emission associated with the increase in attraction to environmental concerns, the demand for low fuel consumption by automobiles is increasing. To satisfy the requirement, it is desired to reduce rolling resistance relating to tire performance. Heretofore, as a means for reducing the rolling resistance of tires, a method of optimizing tire structures has been investigated; however, at present, a technique of using a low-heat-generating rubber composition for tires has become employed as the most common method.

For obtaining such a low-heat-generating rubber composition, there is known a method of using an inorganic filler such as silica or the like.

However, in incorporating an inorganic filler such as silica or the like in a rubber composition to prepare an inorganic filler-containing rubber composition, the inorganic filler, especially silica aggregates in the rubber composition (owing to the hydroxyl group in the surface of silica), and therefore, for preventing the aggregation, a silane coupling agent is used.

Accordingly, for successfully solving the above-mentioned problem by incorporation of a silane coupling agent, various trials have been made for increasing the activity of the coupling function of the silane coupling agent.

For example, Patent Reference 1 proposes a rubber composition containing, as basic components, at least (i) one diene elastomer, (ii) a white filler as a reinforcing filler and (iii) an alkoxysilane polysulfide as a coupling agent (white filler/diene elastomer) along with (iv) an enamine and (v) a guanidine derivative.

Patent Reference 2 discloses a rubber composition containing, as basic components, at least (i) one diene elastomer, (ii) a white filler as a reinforcing filler and (iii) an alkoxysilane polysulfide as a coupling agent (white filler/diene elastomer) along with (iv) zinc thiophosphate and (v) a guanidine derivative.

Patent Reference 3 describes a rubber composition containing, as basic components, at least (i) a diene elastomer, (ii) an inorganic filler as a reinforcing filler and (iii) an alkoxysilane polysulfide (PSAS) as an (inorganic filler/diene elastomer) coupling agent, as combined with (iv) an aldimine (R—CH=N—R) and (v) a guanidine derivative.

Further, Patent Reference 4 proposes a rubber composition basically containing at least (i) a diene elastomer, (ii) an inorganic filer as a reinforcing filer and (iii) an alkoxysilane polysulfide as a coupling agent, as combined with (iv) 1,2-dihydropyridine and (v) a guanidine derivative.

However, in these inventions, nothing is taken into consideration relating to kneading conditions.

As a case of increasing the activity of the coupling function of a silane coupling agent in consideration of kneading conditions, there is mentioned Patent Reference 5; however, it is desired to further improve the effect of enhancing the activity of the coupling function of a silane coupling agent.

CITATION LIST

Patent References

Patent Reference 1: JP-T 2002-521515
Patent Reference 2: JP-T 2002-521516
Patent Reference 3: JP-T 2003-530443
Patent Reference 4: JP-T 2003-523472
Patent Reference 5: WO2008/123306

SUMMARY OF THE INVENTION

Problems that the Invention is to Solve

Given the situation as above, an object of the present invention is to provide a method for producing a rubber composition capable of further increasing the activity of the coupling function of a silane coupling agent to thereby successfully produce a low-heat-generating rubber composition.

Means for Solving the Problems

For solving the above-mentioned problems, the present inventors have made various investigations of a method of adding at least one vulcanization promoter selected from guanidines, sulfenamides, thiazoles, thiurams, dithiocarbamate salts, thioureas and xanthate salts in a process of producing a rubber composition comprising kneading a rubber component, all or a part of an inorganic filer and all or a part of a silane coupling agent in the first stage in the kneading step therein, and, as a result, have experimentally found that, in order to enhance the activity of the coupling function, it is good to optimize the kneading stage in which at least one vulcanization promoter selected from guanidines, sulfenamides, thiazoles, thiurams, dithiocarbamate salts, thioureas and xanthate salts is added to the rubber composition, and have completed the present invention.

Specifically, the present invention is a method for producing a rubber composition containing a rubber component (A) of at least one selected from natural rubbers and synthetic dienic rubbers, a filler containing an inorganic filler (B), a silane coupling agent (C) and at least one vulcanization promoter (D) selected from guanidines, sulfenamides, thiazoles, thiurams, dithiocarbamate salts, thioureas and xanthate salts, wherein the rubber composition is kneaded in at least three stages, in the first stage (X) of kneading, the rubber component (A), all or a part of the inorganic filler (B), and all or a part of the silane coupling agent (C) are kneaded, then in the stage (Y) on and after the second stage of kneading but before the final stage, the vulcanization promoter (D) is added and kneaded, and in the final stage (Z) of kneading, a vulcanizing agent is added and kneaded.

Advantage of the Invention

According to the present invention, there is provided a method for producing a rubber composition capable of further increasing the activity of the coupling function of a silane coupling agent to produce a rubber composition excellent in low-heat-generation property.

MODE FOR CARRYING OUT THE INVENTION

The present invention is described in detail hereinunder.

The method for producing a rubber composition of the present invention is a method for producing a rubber composition containing a rubber component (A) of at least one selected from natural rubbers and synthetic dienic rubbers, a filler containing an inorganic filler (B), a silane coupling agent (C) and at least one vulcanization promoter (D) selected from guanidines, sulfenamides, thiazoles, thiurams, dithiocarbamate salts, thioureas and xanthate salts, wherein the rubber composition is kneaded in at least three stages, in the first stage (X) of kneading, the rubber component (A), all or a part of the inorganic filler (B), and all or a part of the silane coupling agent (C) are kneaded, then in the stage (Y) on and after the second stage of kneading but before the final stage, the vulcanization promoter (D) is added and kneaded, and in the final stage (Z) of kneading, a vulcanizing agent is added and kneaded.

In the present invention, the ingredients are kneaded in at least three kneading stages, and this is for preventing the molecular weight of the rubber component (A) from lowering owing to long-term high-temperature kneading. Specifically, when the kneading time in one stage is prolonged for reducing the number of kneading stages, then the rubber component (A) is exposed to a high temperature for a long period of time whereby the molecular weight of the rubber component (A) is lowered, and it is important to evade this.

In the first stage (X) of kneading, the rubber component (A), all or a part of the inorganic filler (B) and all or a part of the silane coupling agent are kneaded, and this is for the purpose of fully promoting the reaction between the inorganic filler (B) and the silane coupling agent (C).

In the present invention, the vulcanization promoter (D) is added and kneaded in the stage (Y) on and after the second stage of kneading but before the final stage, and this is in order to increase the activity of the coupling function of the silane coupling agent (C) by the vulcanization promoter (D) after the reaction between the inorganic filler (B) and the silane coupling agent (C) has fully gone on, thereby more successfully promoting the reaction between the silane coupling agent (C) and the rubber component (A).

For more successfully enhancing the activity of the coupling function of the silane coupling agent (C) to thereby more successfully promote the reaction between the silane coupling agent (C) and the rubber component (A), preferably, the highest temperature of the rubber composition in the stage (Y) of kneading is from 120 to 190° C., more preferably from 130 to 175° C.

For sufficiently promoting the reaction between the inorganic filler (B) and the silane coupling agent (C), preferably, the highest temperature of the rubber composition in the first stage (X) of kneading is from 140 to 190° C., more preferably from 150 to 180° C.

Preferably, the kneading time in the first stage (X) of kneading and in the second stage (Y) of kneading is from 10 seconds to 20 minutes, more preferably from 10 seconds to 10 minutes, even more preferably from 30 seconds to 5 minutes.

The highest temperature of the rubber composition in the final stage (Z) of kneading is preferably from 60 to 140° C., more preferably from 80 to 120° C., even more preferably from 100 to 120° C. The kneading time is preferably from 10 seconds to 20 minutes, more preferably from 10 seconds to 10 minutes, even more preferably from 20 seconds to 5 minutes.

In going to the next stage, it is desirable that the temperature of the rubber composition is lowered by at least 10° C. than the temperature thereof after the kneading in the previous stage.

The kneading step for the rubber composition in the present invention includes at least the first stage (X) of kneading, the stage (Y) on and after the second stage of kneading but before the final stage, and the final stage (Z) of kneading, and optionally includes any other intermediate stage of kneading.

The first stage of kneading in the present invention is the first stage of kneading the rubber component (A), the inorganic filler (B) and the silane coupling agent (C), but does not include a case of kneading the rubber component (A) and the other filler than the inorganic filler (B) in the initial stage and a case of pre-kneading the rubber component (A) alone.

The kneading step in the production method of the present invention shall include at least three stages, and the upper limit of the number of the stages is not specifically defined. In consideration of the productivity, the number of the stages is preferably at most 8 stages, more preferably at most 6 stages, even more preferably at most 4 stages.

For the reason of securing the reaction between the silane coupling agent and silica and the reaction between the silane coupling agent and polymer in the production method of the present invention, the method may comprise the first stage (X) of kneading, the stage (Y) of the second stage of kneading, and the final stage (Z) of the third stage of kneading.

In the second stage (Y) of kneading and the intermediate stage, the rubber component, a filler and others may be added and kneaded.

[Silane Coupling Agent (C)]

The silane coupling agent (C) for use in the rubber composition production method of the present invention is preferably at least one compound selected from a group consisting of compounds of the following general formulae (I) to (IV).

Using the silane coupling agent (C) of the type, the rubber composition in the method of the present invention is excellent in workability thereof and can give pneumatic tires having good abrasion resistance.

General formulae (I) to (IV) are sequentially described below.

[Chemical Formula 1]

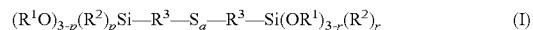
(I)

wherein multiple $R^1$'s may be the same or different, each representing a linear, cyclic or branched alkyl group having from 1 to 8 carbon atoms, a linear or branched alkoxylalkyl group having from 2 to 8 carbon atoms, or a hydrogen atom; multiple $R^2$'s may be the same or different, each representing a linear, cyclic or branched alkyl group having from 1 to 8 carbon atoms; multiple $R^3$'s may be the same or different, each representing a linear or branched alkylene group having from 1 to 8 carbon atoms; a indicates from 2 to 6 as a mean value; p and r may be the same or different, each indicating from 0 to 3 as a mean value, provided that both p and r are not 3 at the same time.

Specific examples of the silane coupling agent (C) represented by the above-mentioned general formula (I) include bis(3-triethoxysilylpropyl)tetrasulfide, bis(3-trimethoxysilylpropyl)tetrasulfide, bis(3-methyldimethoxysilylpropyl) tetrasulfide, bis(2-triethoxysilylethyl)tetrasulfide, bis(3-triethoxysilylpropyl)disulfide, bis(3-trimethoxysilylpropyl) disulfide, bis(3-methyldimethoxysilylpropyl)disulfide, bis (2-triethoxysilylethyl)disulfide, bis(3-triethoxysilylpropyl) trisulfide, bis(3-trimethoxysilylpropyl)trisulfide, bis(3-methyldimethoxysilylpropyl)trisulfide, bis(2-triethoxysilylethyl)trisulfide, bis(3-monoethoxydimethylsilylpropyl) tetrasulfide, bis(3-monoethoxydimethylsilylpropyl)trisulfide, bis(3-monoethoxydimethylsilylpropyl)disulfide, bis(3-monomethoxydimethylsilylpropyl)tetrasulfide, bis(3-monomethoxydimethylsilylpropyl)trisulfide, bis(3-monomethoxydimethylsilylpropyl)disulfide, bis(2-monoethoxydimethylsilylethyl)tetrasulfide, bis(2-monoethoxydimethylsilylethyl)trisulfide, bis(2-monoethoxydimethylsilylethyl)disulfide.

[Chemical Formula 2]

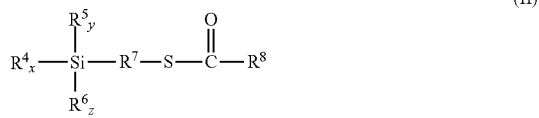

(II)

wherein $R^4$ represents a monovalent group selected from —Cl, —Br, $R^9O$—, $R^9C(=O)O$—, $R^9R^{10}C=NO$—, $R^9R^{10}CNO$—, $R^9R^{10}N$—, and —$(OSiR^9R^{10})_h$ $(OSiR^9R^{10}R^{11})$ (where $R^9$, $R^{10}$ and $R^{11}$ each represents a hydrogen atom or a monovalent hydrocarbon group having from 1 to 18 carbon atoms; and h indicates from 1 to 4 as a mean value); $R^5$ represents $R^4$, a hydrogen atom, or a hydrocarbon group having from 1 to 18 carbon atoms; $R^6$ represents $R^4$, $R^5$, a hydrogen atom, or a group —$[O(R^{12}O)_j]_{0.5}$ (where $R^{12}$ represents an alkylene group having from 1 to 18 carbon atoms; and j indicates an integer of from 1 to 4); $R^7$ represents a divalent hydrocarbon group having from 1 to 18 carbon atoms; $R^8$ represents a monovalent hydrocarbon group having from 1 to 18 carbon atoms; x, y and z each indicates a number satisfying the relationship of x+y+2z=3, 0≤x≤3, 0≤y≤2, 0≤z≤1.

In the general formula (II), $R^8$, $R^9$, $R^{10}$ and $R^{11}$ may be the same or different, each preferably representing a linear, cyclic or branched alkyl, alkenyl, aryl or aralkyl group having from 1 to 18 carbon atoms. In case where $R^5$ is a monovalent hydrocarbon group having from 1 to 18 carbon atoms, the group is preferably a linear, cyclic or branched alkyl, alkenyl, aryl or aralkyl group. Preferably, $R^{12}$ is a linear, cyclic or branched alkylene group, and is more preferably a linear one. $R^7$ is, for example, an alkylene group having from 1 to 18 carbon atoms, an alkenylene group having from 2 to 18 carbon atoms, a cycloalkylene group having from 5 to 18 carbon atoms, a cycloalkylalkylene group having from 6 to 18 carbon atoms, an arylene group having from 6 to 18 carbon atoms, or an aralkylene group having from 7 to 18 carbon atoms. The alkylene group and the alkenylene group may be linear or branched; and the cycloalkylene group, the cycloalkylalkylene group, the arylene group and the aralkylene group may have a substituent such as a lower alkyl group or the like on the ring thereof. Preferably, $R^7$ is an alkylene group having from 1 to 6 carbon atoms, more preferably a linear alkylene group, for example, a methylene group, an ethylene group, a trimethylene group, a tetramethylene group, a pentamethylene group or a hexamethylene group.

Specific examples of the monovalent hydrocarbon group having from 1 to 18 carbon atoms of $R^5$, $R^8$, $R^9$, $R^{10}$ and $R^{11}$ in the general formula (II) include a methyl group, an ethyl group, an n-propyl group, an isopropyl group, an n-butyl group, an isobutyl group, a sec-butyl group, a tert-butyl group, a pentyl group, a hexyl group, an octyl group, a decyl group, a dodecyl group, a cyclopentyl group, a cyclohexyl group, a vinyl group, a propenyl group, an allyl group, a hexenyl group, an octenyl group, a cyclopentenyl group, a cyclohexenyl group, a phenyl group, a tolyl group, a xylyl group, a naphthyl group, a benzyl group, a phenethyl group, a naphthylmethyl group, etc.

Examples of $R^{12}$ in the general formula (II) include a methylene group, an ethylene group, a trimethylene group, a tetramethylene group, a pentamethylene group, a hexamethylene group, an octamethylene group, a decamethylene group, a dodecamethylene group, etc.

Specific examples of the silane coupling agent (C) represented by the general formula (II) include 3-hexanoylthiopropyltriethoxysilane, 3-octanoylthiopropyltriethoxysilane, 3-decanoylthiopropyltriethoxysilane, 3-lauroylthiopropyltriethoxysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethxysilane, 2-decanoylthioethyltrimethoxysilane, 2-lauroylthioethyltrimethoxysilane, etc. Of those, especially preferred is 3-octanoylthiopropyltriethoxysilane (General Electric Silicones' trade name NXT Silane).

[Chemical Formula 3]

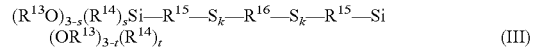

(III)

wherein multiple $R^{13}$'s may be the same or different, each representing a linear, cyclic or branched alkyl group having from 1 to 8 carbon atoms, a linear or branched alkoxylalkyl group having from 2 to 8 carbon atoms, or a hydrogen atom; multiple $R^{14}$'s may be the same or different, each representing a linear, cyclic or branched alkyl group having from 1 to 8 carbon atoms; multiple $R^{15}$'s may be the same or different, each representing a linear or branched alkylene group having from 1 to 8 carbon atoms; $R^{16}$ represents a divalent group of a general formula (—S—$R^{17}$—S—), (—$R^{18}$—$S_{m1}$—$R^{19}$—) or (—$R^{20}$—$S_{m2}$—$R^{21}$—$S_{m3}$—$R^{22}$—) (where $R^{17}$ to $R^{22}$ each represents a divalent hydrocarbon group, a divalent aromatic group or a divalent organic group containing a hetero element except sulfur and oxygen, having from 1 to 20 carbon atoms; m1, m2 and m3 may be the same or different, each indicating from 1 to less than 4 as a mean value); multiple k's may be the same or different, each indicating from 1 to 6 as a mean value; s and t each indicates from 0 to 3 as a mean value, provided that both s and t are not 3 at the same time.

Preferred examples of the silane coupling agent (C) represented by the above-mentioned general formula (III) are compounds represented by an average compositional formula $(CH_3CH_2O)_3Si$—$(CH_2)_3$—$S_2$—$(CH_2)_6$—$S_2$—$(CH_2)_3$—$Si(OCH_2CH_3)$, an average compositional formula $(CH_3CH_2O)_3Si$—$(CH_2)_3$—$S_2$—$(CH_2)_{10}$—$S_2$—$(CH_2)_3$—$Si(OCH_2CH_3)_3$, an average compositional formula $(CH_3CH_2O)_3Si$—$(CH_2)_3$—$S_3$—$(CH_2)_6$—$S_3$—$(CH_2)_3$—$Si$ (OCH$_2$CH$_3$)$_3$, an average compositional formula (CH$_3$CH$_2$O)$_3$Si—(CH$_2$)$_3$—S$_4$—(CH$_2$)$_6$—S$_4$—(CH$_2$)$_3$—Si(OCH$_2$CH$_3$)$_3$, an average compositional formula (CH$_3$CH$_2$O)$_3$Si—(CH$_2$)$_3$—S—(CH$_2$)$_6$—S$_2$—(CH$_2$)$_6$—S—(CH$_2$)$_3$—Si(OCH$_2$CH$_3$)$_3$, an average compositional formula (CH$_3$CH$_2$O)$_3$Si—(CH$_2$)$_3$—S—(CH$_2$)$_6$—S$_{2.5}$—(CH$_2$)$_6$—S—(CH$_2$)$_3$—Si(OCH$_2$CH$_3$)$_3$, an average compositional formula (CH$_3$CH$_2$O)$_3$Si—(CH$_2$)$_3$—S—(CH$_2$)$_6$—S$_3$—(CH$_2$)$_6$—S—(CH$_2$)$_3$—Si(OCH$_2$CH$_3$)$_3$, an average compositional formula (CH$_3$CH$_2$O)$_3$Si—(CH$_2$)$_3$—S—(CH$_2$)$_6$—S$_4$—(CH$_2$)$_6$—S—(CH$_2$)$_3$—Si(OCH$_2$CH$_3$)$_3$, an average compositional formula (CH$_3$CH$_2$O)$_3$Si—(CH$_2$)$_3$—S—(CH$_2$)$_{10}$—S$_2$—(CH$_2$)$_{10}$—S—(CH$_2$)$_3$—Si(OCH$_2$CH$_3$)$_3$, an average compositional formula (CH$_3$CH$_2$O)$_3$Si—(CH$_2$)$_3$—S$_4$—(CH$_2$)$_6$—S$_4$—(CH$_2$)$_6$—S$_4$—(CH$_2$)$_3$—Si(OCH$_2$CH$_3$)$_3$, an average compositional formula (CH$_3$CH$_2$O)$_3$Si—(CH$_2$)$_3$—S$_2$—(CH$_2$)$_6$—S$_2$—(CH$_2$)$_6$—S$_2$—(CH$_2$)$_3$—Si(OCH$_2$CH$_3$)$_3$, an average compositional formula (CH$_3$CH$_2$O)$_3$Si—(CH$_2$)$_3$—S—(CH$_2$)$_6$—S$_2$—(CH$_2$)$_6$—S$_2$—(CH$_2$)$_6$—S—(CH$_2$)$_3$—Si(OCH$_2$CH$_3$)$_3$, etc.

[Chemical Formula 4]

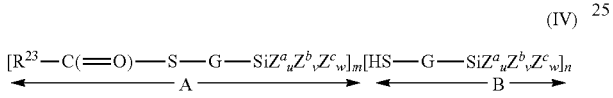

(IV)

wherein $R^{23}$ represents a linear, branched or cyclic alkyl group having from 1 to 20 carbon atoms; multiple G's may be the same or different, each representing an alkanediyl group or an alkenediyl group having from 1 to 9 carbon atoms; multiple $Z^a$'s may be the same or different, each representing a functional group capable of bonding to the two silicon atoms and selected from [—O—]$_{0.5}$, [—O-G-]$_{0.5}$ and [—O-G-O—]$_{0.5}$; multiple $Z^b$'s may be the same or different, each representing a functional group capable of bonding to the two silicon atoms and represented by [—O-G-O—]$_{0.5}$; multiple $Z^c$'s may be the same or different, each representing a functional group selected from —Cl, —Br, —OR$^a$, R$^a$C(=O)O—, R$^a$R$^b$C=NO—, R$^a$R$^b$N—, R$^a$— and HO-G-O— (where G is the same as above); R$^a$ and R$^b$ each represents a linear, branched or cyclic alkyl group having from 1 to 20 carbon atoms; m, n, u, v and w each is 1≤m≤20, 0≤n≤20, 0≤u≤3, 0≤v≤2, 0≤w≤1, and (u/2)+v+2w is 2 or 3; in case where the formula has multiple A's, then $Z^a_u$, $Z^b_v$ and $Z^c_w$ may be the same or different in those multiple A's; in case where the formula has multiple B's, then $Z^a_u$, $Z^b_v$ and $Z^c_w$ may be the same or different in those multiple B's.

Specific examples of the silane coupling agent (C) represented by the general formula (IV) include the following chemical formula (V), chemical formula (VI) and chemical formula (VII):

[Chemical Formula 5]

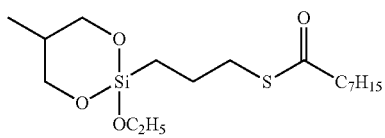

(V)

[Chemical Formula 6]

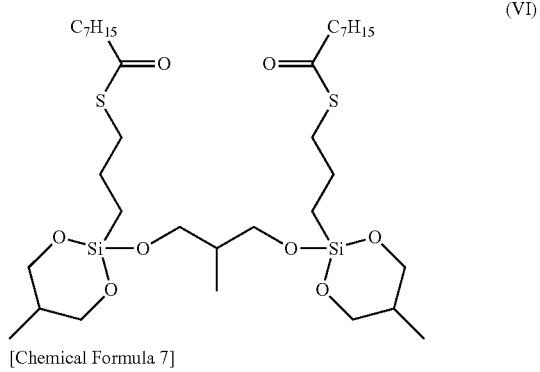

(VI)

[Chemical Formula 7]

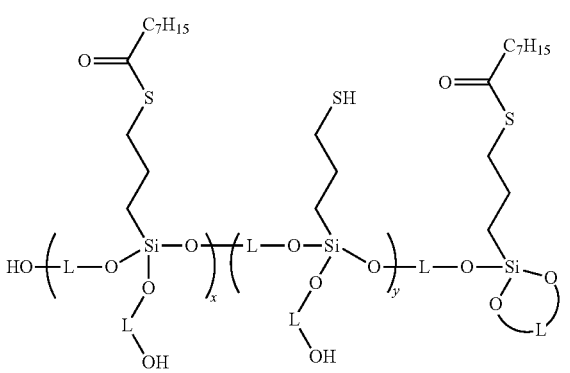

(VII)

In the formula, L each independently represents an alkanediyl group or an alkenediyl group having from 1 to 9 carbon atoms; and x=m and y=n.

As the silane coupling agent represented by the chemical formula (V), a commercial product is available as "NXT Low-V Silane", a trade name by Momentive Performance Materials.

As the silane coupling agent represented by the chemical formula (VI), a commercial product is available as "NXT Ultra Low-V Silane", a trade name by Momentive Performance Materials.

Further, as the silane coupling agent represented by the chemical formula (VII), there is mentioned a commercial product of "NXT-Z", a trade name by Momentive Performance Materials.

The silane coupling agent represented by the general formula (II), the chemical formula (V) or the chemical formula (VI) has a protected mercapto group, and is therefore effective for preventing initial scorching in the processing process before the vulcanization step, and accordingly, the processability thereof is good.

In the silane coupling agent represented by the general formula (V), (VI) or (VII), the carbon number of the alkoxysilane is large, and therefore the amount of the volatile compound VOC (especially alcohol) to be generated from the agent is small, and accordingly, the agent is favorable in point of working environment. Further, the silane coupling agent of the chemical formula (VII) provides a low-heat-generation property as tire performance, and is therefore more preferred.

Of the compounds represented by the general formulae (I) to (IV), those represented by the above-mentioned general formula (I) are especially preferred as the silane coupling agent (C) for use in the present invention. The vulcanization promoter (D) can readily activate the polysulfide bond that reacts with the rubber component (A).

In the present invention, one alone or two or more different types of the silane coupling agents (C) may be used either singly or as combined.

Regarding the amount of the silane coupling agent (C) to be in the rubber composition in the present invention, preferably, the ratio by mass of {silane coupling agent (C)/inorganic filler (B)} is from (1/100) to (20/100). When the ratio is at least (1/100), then the effect of enhancing the low-heat-generation property of the rubber composition can be more successfully exhibited; and when at most (20/100), the cost of the rubber composition is low and the economic potential thereof increases. Further, the ratio by mass is more preferably from (3/100) to (20/100), even more preferably from (4/100) to (10/100).

[Vulcanization Promoter (D)]

Guanidines, sulfenamides, thiazoles, thiurams, dithiocarbamate salts, thioureas and xanthate salts that are for the vulcanization promoter (D) for use in the rubber composition production method of the present invention are described in detail.

The guanidines for use in the rubber composition production method of the present invention include 1,3-diphenylguanidine, 1,3-di-o-tolylguanidine, 1-o-tolylbiguanide, dicatechol borate di-o-tolylguanidine salt, 1,3-di-o-cumenylguanidine, 1,3-di-o-biphenylguanidine, 1,3-di-o-cumenyl-2-propionylguanidine, etc. Preferred are 1,3-diphenylguanidine, 1,3-di-o-tolylguanidine and 1-o-tolylbiguanide as having high reactivity.

The sulfenamides for use in the rubber composition production method of the present invention include N-cyclohexyl-2-benzothiazolylsulfenamide, N,N-dicyclohexyl-2-benzothiazolylsulfenamide, N-tert-butyl-2-benzothiazolylsulfenamide, N-oxydiethylene-2-benzothiazolylsulfenamide, N-methyl-2-benzothiazolylsulfenamide, N-ethyl-2-benzothiazolylsulfenamide, N-propyl-2-benzothiazolylsulfenamide, N-butyl-2-benzothiazolylsulfenamide, N-pentyl-2-benzothiazolylsulfenamide, N-hexyl-2-benzothiazolylsulfenamide, N-pentyl-2-benzothiazolylsulfenamide, N-octyl-2-benzothiazolylsulfenamide, N-2-ethylhexyl-2-benzothiazolylsulfenamide, N-decyl-2-benzothiazolylsulfenamide, N-dodecyl-2-benzothiazolylsulfenamide, N-stearyl-2-benzothiazolylsulenamide, N,N-dimethyl-2-benzothiazolylsulenamide, N,N-diethyl-2-benzothiazolylsulenamide, N,N-dipropyl-2-benzothiazolylsulenamide, N,N-dibutyl-2-benzothiazolylsulenamide, N,N-dipentyl-2-benzothiazolylsulenamide, N,N-dihexyl-2-benzothiazolylsulenamide, N,N-dipentyl-2-benzothiazolylsulenamide, N,N-dioctyl-2-benzothiazolylsulenamide, N,N-di-2-ethylhexylbenzothiazolylsulfenamide, N-decyl-2-benzothiazolylsulenamide, N,N-didodecyl-2-benzothiazolylsulenamide, N,N-distearyl-2-benzothiazolylsulenamide, etc. Of those, preferred are N-cyclohexyl-2-benzothiazolylsulenamide and N-tert-butyl-2-benzothiazolylsulenamide, as having high reactivity.

The thiazoles for use in the rubber composition production method of the present invention include 2-mercaptobenzothiazole, di-2-benzothiazolyl disulfide, 2-mercaptobenzothiazole zinc salt, 2-mercaptobenzothiazole cyclohexylamine salt, 2-(N,N-diethylthiocarbamoylthio)benzothiazole, 2-(4'-morpholinodithio)benzothiazole, 4-methyl-2-mercaptobenzothiazole, di-(4-methyl-2-benzothiazolyl) disulfide, 5-chloro-2-mercaptobenzothiazole, 2-mercaptobenzothiazole sodium, 2-mercapto-6-nitrobenzothiazole, 2-mercapto-naphtho[1,2-d]thiazole, 2-mercapto-5-methoxybenzothiazole, 6-amino-2-mercaptobenzothiazole, etc. Of those, preferred are 2-mercaptobenzothiazole and di-2-benzothiazolyl disulfide, as having high reactivity.

The thiurams for use in the rubber composition production method of the present invention include tetramethylthiuram disulfide, tetraethylthiuram disulfide, tetrapropylthiuram disulfide, tetraisopropylthiuram disulfide, tetrabutylthiuram disulfide, tetrapentylthiuram disulfide, tetrahexylthiuram disulfide, tetraheptylthiuram disulfide, tetraoctylthiuram disulfide, tetranonylthiuram disulfide, tetradecylthiuram disulfide, tetradodecylthiuram disulfide, tetrastearylthiuram disulfide, tetrabenzylthiuram disulfide, tetrakis(2-ethylhexyl)thiuram disulfide, tetramethylthiuram monosulfide, tetraethylthiuram monosulfide, tetrapropylthiuram monosulfide, tetraisopropylthiuram monosulfide, tetrabutylthiuram monosulfide, tetrapentylthiuram monosulfide, tetrahexylthiuram monosulfide, tetraheptylthiuram monosulfide, tetraoctylthiurammonosulfide, tetranonylthiurammonosulfide, tetradecylthiuram monosulfide, tetradodecylthiuram monosulfide, tetrastearylthiuram monosulfide, tetrabenzylthiuram monosulfide, dipentamethylthiuram tetrasulfide, etc. Of those, preferred are tetrakis(2-ethylhexyl)thiuram disulfide and tetrabenzylthiuram disulfide, as having high reactivity.

The thioureas for use in the rubber composition production method of the present invention include N,N'-diphenylthiourea, trimethylthiourea, N,N'-diethylthiourea, N,N'-dimethylthiourea, N,N'-dibutylthiourea, ethylenethiourea, N,N'-diisopropylthiourea, N,N'-dicyclohexylthiourea, 1,3-di(o-tolyl)thiourea, 1,3-di(p-tolyl)thiourea, 1,1-diphenyl-2-thiourea, 2,5-dithiobiurea, guanylthiourea, 1-(1-naphthyl)-2-thiourea, 1-phenyl-2-thiourea, p-tolylthiourea, o-tolylthiourea, etc. Of those, preferred are N,N'-diethylthiourea, trimethylthiourea, N,N'-diphenylthiourea and N,N'-dimethylthiourea, as having high reactivity.

The dithiocarbamate salts for use in the rubber composition production method of the present invention include zinc dimethyldithiocarbamate, zinc diethyldithiocarbamate, zinc dipropyldithiocarbamate, zinc diisopropyldithiocarbamate, zinc dibutyldithiocarbamate, zinc dipentyldithiocarbamate, zinc dihexyldithiocarbamate, zinc diheptyldithiocarbamate, zinc dioctyldithiocarbamate, zinc di(2-ethylhexyl)dithiocarbamate, zinc didecyldithiocarbamate, zinc didodecyldithiocarbamate, zinc N-pentamethylenedithiocarbamate, zinc N-ethyl-N-phenyldithiocarbamate, zinc dibenzyldithiocarbamate, copper dimethyldithiocarbamate, copper diethyldithiocarbamate, copper dipropyldithiocarbamate, copper diisopropyldithiocarbamate, copper dibutyldithiocarbamate, copper dipentyldithiocarbamate, copper dihexyldithiocarbamate, copper diheptyldithiocarbamate, copper dioctyldithiocarbamate, copper di(2-ethylhexyl)dithiocarbamate, copper didecyldithiocarbamate, copper didodecyldithiocarbamate, copper N-pentamethylenedithiocarbamate, copper dibenzyldithiocarbamate, sodium dimethyldithiocarbamate, sodium diethyldithiocarbamate, sodium dipropyldithiocarbamate, sodium diisopropyldithiocarbamate, sodium dibutyldithiocarbamate, sodium dipentyldithiocarbamate, sodium dihexyldithiocarbamate, sodium diheptyldithiocarbamate, sodium dioctyldithiocarbamate, sodium di(2-ethylhexyl)dithiocarbamate, sodium didecyldithiocarbamate, sodium didodecyldithiocarbamate, sodium N-pentamethylenedithiocarbamate, sodium dibenzyldithiocarbamate, ferric dimethyldithiocarbamate, ferric diethyldithiocarbamate, ferric dipropyldithiocarbamate, ferric diisopropyldithiocarbamate, ferric dibutyldithiocarbamate, ferric dipentyldithiocarbamate, ferric dihexyldithiocarbamate, ferric diheptyldithiocarbamate, ferric dioctyldithiocarbamate, ferric di(2-ethylhexyl)dithiocarbamate, ferric didecyldithiocarbamate, ferric didodecyldithiocarbamate, ferric N-pentamethylenedithiocarbamate, ferric dibenzyldithiocarbamate, etc. Of those, preferred are zinc dibenzyldithiocarbamate, zinc N-ethyl-N-phenyldithiocarbamate, zinc dimethyldithiocarbamate and copper dimethyldithiocarbamate, as having high reactivity.

The xanthate salts for use in the rubber composition production method of the present invention include zinc methylxanthate, zinc ethylxanthate, zinc propylxanthate, zinc isopropylxanthate, zinc butylxanthate, zinc pentylxanthate, zinc hexylxanthate, zinc heptylxanthate, zinc octylxanthate, zinc 2-ethylhexylxanthate, zinc decylxanthate, zinc dodecylxanthate, potassium methylxanthate, potassium ethylxanthate, potassium propylxanthate, potassium isopropylxanthate, potassium butylxanthate, potassium pentylxanthate, potassium hexylxanthate, potassium heptylxanthate, potassium octylxanthate, potassium 2-ethylhexylxanthate, potassium decylxanthate, potassium dodecylxanthate, sodium methylxanthate, sodium ethylxanthate, sodium propylxanthate, sodium isopropylxanthate, sodium butylxanthate, sodium pentylxanthate, sodium hexylxanthate, sodium heptylxanthate, sodium octylxanthate, sodium 2-ethylhexylxanthate, sodium decylxanthate, sodium dodecylxanthate, etc. Of those, preferred is zinc isopropylxanthate, as having high reactivity.

In the stage (Y) of kneading in the present invention, preferably, the number of molecules (molar number) of the vulcanization promoter (D) in the rubber composition is from 0.1 to 1.0 time the number of molecules (molar number) of the silane coupling agent (C) therein. When the molar number is at least 0.1 times, then the silane coupling agent (C) can be fully activated; and when at most 1.0 time, then the agent would not have any significant influence on the vulcanization speed. More preferably, the number of molecules (molar number) of the vulcanization promoter (D) is from 0.2 to 0.6 times the number of molecules (molar number) of the silane coupling agent (C).

The vulcanization promoter (D) may act also as a promoter for sulfur vulcanization, and if desired, a suitable amount thereof may be incorporated also in the final stage of kneading. In case where a vulcanization promoter is incorporated in the final stage of kneading, the agent is not limited to the vulcanization promoter (D) of the present invention but may be any known vulcanization promoter.

[Rubber Component (A)]

As the synthetic dienic rubber of the rubber component (A) for use in the rubber composition production method of the present invention, usable here are styrene-butadiene copolymer rubber (SBR), polybutadiene rubber (BR), polyisoprene rubber (IR), butyl rubber (IIR), ethylene-propylene-diene tercopolymer rubber (EPDM), etc. One or more different types of natural rubbers and synthetic dienic rubbers may be used here either singly or as combined.

As the inorganic filler (B) for use in the rubber composition production method of the present invention, usable are silica and an inorganic compound represented by the following general formula (VIII):

 (VIII)

In the general formula (VIII), $M^2$ represents at least one selected from a metal selected from aluminium, magnesium, titanium, calcium and zirconium, and oxides or hydroxides of those metals, their hydrates, or carbonates of the metals; d, x, y and z each indicates an integer of from 1 to 5, an integer of from 0 to 10, an integer of from 2 to 5, and an integer of from 0 to 10, respectively.

In the general formula (VIII), when x and z are both 0, then the inorganic compound is at least one metal selected from aluminium, magnesium, titanium, calcium and zirconium, or a metal oxide or metal hydroxide thereof.

In the present invention, silica is preferred as the inorganic filler (B) from the viewpoint of satisfying both low rolling property and abrasion resistance. As silica, any commercially-available one is usable here; and above all, preferred is wet silica, dry silica or colloidal silica, and more preferred is wet silica. Preferably, the BET specific surface area (as measured according to ISO 5794/1) of silica for use herein is from 40 to 350 $m^2$/g. Silica of which the BET specific surface area falls within the range is advantageous in that it satisfies both rubber-reinforcing capability and dispersibility in rubber component. From this viewpoint, silica of which the BET specific surface area falls within a range of from 80 to 350 $m^2$/g is more preferred; silica of which the BET specific surface area falls within a range of more than 130 $m^2$/g to 350 $m^2$/g is even more preferred; and silica of which the BET specific surface area falls within a range of from 135 to 350 $m^2$/g is even more preferred. As silicas of those types, usable here are commercial products of Tosoh Silica's trade names "Nipseal AQ" (BET specific surface area=205 $m^2$/g) and "Nipseal KQ" (BET specific surface area=240 $m^2$/g); Degussa's trade name "Ultrasil VN3" (BET specific surface area=175 $m^2$/g), etc.

As the inorganic compound represented by the general formula (VIII), usable here are alumina ($Al_2O_3$) such as γ-alumina, α-alumina, etc.; alumina monohydrate ($Al_2O_3.H_2O$) such as boehmite, diaspore, etc.; aluminium hydroxide [$Al(OH)_3$] such as gypsite, bayerite, etc.; aluminium carbonate [$Al_2(CO_3)_2$], magnesium hydroxide [$Mg(OH)_2$], magnesium oxide (MgO), magnesium carbonate ($MgCO_3$), talc ($3MgO.4SiO_2.H_2O$), attapulgite ($5MgO.8SiO_2.9H_2O$), titanium white ($TiO_2$), titanium black ($TiO_{2n-1}$) calcium oxide (CaO), calcium hydroxide [$Ca(OH)_2$], aluminium magnesium oxide ($MgO.Al_2O_3$) clay ($Al_2O_3.2SiO_2$), kaolin ($Al_2O_3.2SiO_2.2H_2O$), pyrophyllite ($Al_2O_3.4SiO_2.H_2O$), bentonite ($Al_2O_3.4SiO_2.2H_2O$), aluminium silicate ($Al_2SiO_5$, $Al_4.3SiO_4.5H_2O$, etc.), magnesium silicate ($Mg_2SiO_4$, $MgSiO_3$, etc.), calcium silicate ($Ca_2.SiO_4$, etc.), aluminium calcium silicate ($Al_2O_3.CaO.2SiO_2$, etc.), magnesium calcium silicate ($CaMgSiO_4$), calcium carbonate ($CaCO_3$), zirconium oxide ($ZrO_2$), zirconium hydroxide [$ZrO(OH)_2.nH_2O$], zirconium carbonate [$Zr(CO_3)_2$]; as well as crystalline aluminosilicate salts containing a charge-correcting hydrogen, alkali metal or alkaline earth metal such as various types of zeolite. Preferably, $M^3$ in the general formula (5) is at least one selected from aluminium metal, aluminium oxide or hydroxide, and their hydrates, or aluminium carbonate.

One or more different types of the inorganic compounds of the general formula (VIII) may be used here either singly or as combined. The mean particle size of the inorganic compound is preferably within a range of from 0.01 to 10 μm from the viewpoint of the balance of kneading workability, abrasion resistance and wet grip performance, and more preferably within a range of from 0.05 to 5 μm.

As the inorganic filler (B) in the present invention, silica alone may be used, or silica as combined with at least one inorganic compound of the general formula (VIII) may be used.

If desired, the filler in the rubber composition in the present invention may contain carbon black in addition to the above-mentioned inorganic filler (B). Containing carbon black, the filler enjoys the effect of lowering the electric resistance of the rubber composition to thereby prevent static electrification thereof. Carbon black for use herein is not specifically defined. For example, preferred is use of high, middle or low-structure SAF, ISAF, IISAF, N339, HAF, FEF, GPF, SRF-grade carbon black; and more preferred is use of SAF, ISAF, IISAF, N339, HAF, FEF-grade carbon black. Preferably, the nitrogen adsorption specific surface area ($N_2SA$, as measured according to JIS K 6217-2:2001) of such carbon black is from 30 to 250 $m^2/g$. One alone or two or more different types of such carbon black may be used here either singly or as combined. In the present invention, the inorganic filler (B) does not contain carbon black.

The inorganic filler (B) in the rubber composition in the present invention is preferably in an amount of from 20 to 120 parts by mass relative to 100 parts by mass of the rubber component (A). When the amount is at least 20 parts by mass, then it is favorable from the viewpoint of securing wet performance; and when at most 120 parts by mass, then it is favorable from the viewpoint of reducing rolling resistance. Further, the amount is more preferably from 30 to 100 parts by mass.

Also preferably, the filler in the rubber composition in the present invention is in an amount of from 20 to 150 parts by mass relative to 100 parts by mass of the rubber component (A). When the amount is at least 20 parts by mass, then it is favorable from the viewpoint of enhancing rubber composition reinforcing capability; and when at most 150 parts by mass, then it is favorable from the viewpoint of reducing rolling resistance.

In the filler, preferably, the amount of the inorganic filler (B) is at least 30% by mass from the viewpoint of satisfying both wet performance and reduced rolling resistance, more preferably at least 40% by mass, and even more preferably at least 70% by mass.

In case where silica is used as the inorganic filler (B), it is desirable that silica accounts for at least 30% by mass of the filler, more preferably at least 35% by mass.

[Organic Acid Compound]

In the production method of the present invention, it is desirable that the number of molecules (molar number) of the organic acid compound in the rubber composition in the stage (Y) of kneading is not more than the number of molecules (molar number) of the vulcanization promoter (D) to be added in the stage (Y). This is for further increasing the effect of enhancing the activity of the coupling function by incorporation of the vulcanization promoter (D). This is because, when the number of molecules (molar number) of the organic acid compound is larger than the number of molecules (molar number) of the vulcanization promoter (D), then the activity enhancing effect may lower, and therefore according to the preferred mode, the disadvantage could be successfully prevented.

The organic acid compound to be incorporated in the rubber composition in the present invention includes organic acids, for example, saturated fatty acids and unsaturated fatty acids such as stearic acid, palmitic acid, myristic acid, lauric acid, arachidic acid, behenic acid, lignoceric acid, capric acid, pelargonic acid, caprylic acid, enanthic acid, caproic acid, oleic acid, vaccenic acid, linolic acid, linolenic acid, nervonic acid, etc.; as well as resin acids such as rosin acid, modified rosin acid, etc.; and esters of the above-mentioned saturated fatty acids, unsaturated fatty acids and resin acids, etc.

In the present invention, preferably, at least 50 mol % of the organic acid compound is stearic acid, in order that the compound must fully exhibit the function as a vulcanization promoter aid.

In case where an emulsion-polymerized styrene-butadiene copolymer is used as all or apart of the rubber component (A), it is desirable that at least 50 mol % of the organic acid compound is rosin acids (including modified rosin acids) and/or fatty acids contained the emulsion-polymerized styrene-butadiene copolymer, from the viewpoint of the emulsifying agent necessary for producing the styrene-butadiene copolymer through emulsion polymerization.

In the rubber composition production method of the present invention, various additives that are generally incorporated in a rubber composition, for example, a vulcanization activator such as zinc flower or the like, an antioxidant and others may be optionally added and kneaded in the first stage or the final stage of kneading, or in the intermediate stage between the first stage and the final stage.

As the kneading apparatus for the production method of the present invention, usable is any of a Banbury mixer, a roll, an intensive mixer, a kneader, a double-screw extruder, etc.

EXAMPLES

The present invention is described in more detail with reference to the following Examples; however, the present invention is not limited at all by the following Examples.

Low-heat-generating property (tan δ index) was evaluated according to the following method.

Low-Heat-Generation Property (tan δ Index)

Using a viscoelasticity measuring device (by Rheometric), tan δ of the rubber composition sample was measured at a temperature of 60° C., at a dynamic strain of 5% and at a frequency of 15 Hz. Based on the reciprocal of tan δ in Comparative Example 1, 10, 17, 44, 47, 50 or 53, as referred to 100, the data were expressed as index indication according to the following formula. The samples having a larger index value have a better low-heat-generation property and have a smaller hysteresis loss.

Low-Heat-Generation Index={(tan δ of vulcanized rubber composition of Comparative Example 1, 10, 17, 44, 47, 50 or 53)/(tan δ of vulcanized rubber composition tested)}×100

Production Example 1—Production of Silane Coupling Agent Represented by Average Compositional Formula $(CH_3CH_2O)_3Si-(CH_2)_3-S-(CH_2)_6-S_{2.5}-(CH_2)_6-S-(CH_2)_3-Si(OCH_2CH_3)_3$:

119 g (0.5 mol) of 3-mercaptopropyltriethoxysilane was put into a 2-liter separable flask equipped with a nitrogen-introducing duct, a thermometer, a Dimroth condenser and a dropping funnel, and with stirring, 151.2 g (0.45 mol) of an ethanol solution of sodium ethoxide having an effective ingredient concentration of 20% by mass was added thereto. Subsequently, this was heated up to 80° C. and stirred for 3 hours. Afterwards, this was cooled and transferred into a dropping funnel.

Next, 69.75 g (0.45 mol) of 1,6-dichlorohexane was put into the same separable flask as above, heated up to 80° C., and the reaction product of 3-mercaptopropyltriethoxysilane and sodium ethoxide was slowly and dropwise added thereto. After the addition, this was stirred for 5 hours at 80° C. Subsequently, this was cooled, and salt was separated from the obtained solution through filtration, and ethanol and excessive 1,6-dichlorohexane were removed therefrom through reduced-pressure distillation. The obtained solution was distilled under reduced pressure to give 137.7 g of a colorless transparent liquid having a boiling point of 148 to 150° C./0.005 Torr (0.67 Pa). As a result of IR analysis, $^1$H-NMR analysis and mass spectrometry analysis (MS analysis), the product was a compound represented by $(CH_3CH_2O)_3Si-(CH_2)_3S-(CH_2)_6-Cl$. Through gas chromatography analysis (GC analysis), the purity of the compound was 97.5%.

Next, 80 g of ethanol, 5.46 g (0.07 mol) of anhydrous sodium sulfide and 3.36 g (0.105 mol) of sulfur were put into a 0.5-liter separable flask similar to the above, and heated up to 80° C. With stirring the solution, 49.91 g (0.14 mol) of the above $(CH_3CH_2O)_3Si-(CH_2)_3-S-(CH_2)_6-Cl$ was gradually and dropwise added thereto. After the addition, this was stirred for 10 hours at 80° C. After the stirring, this was cooled, the formed salt was taken out through filtration, and then the solvent ethanol was evaporated away under reduced pressure.

The obtained, red-brown transparent solution was analyzed through IR analysis, $^1$H-NMR analysis and ultra-critical chromatography analysis, which confirmed that the product is a compound represented by an average compositional formula, $(CH_3CH_2O)_3Si-(CH_2)_3-S-(CH_2)_6-S_{2.5}-(CH_2)_6-S-(CH_2)_3-Si(OCH_2CH_3)_3$. In GPC analysis, the purity of the product was 85.2%.

Examples 1 to 6 and Comparative Examples 1 to 6

According to the compositional formulation and the kneading method shown in Table 1, the rubber component, silica and the silane coupling agent were kneaded in the first stage (X) of kneading while the highest temperature of the rubber composition was kept controlled as in Table 1, then in the second stage (Y) of kneading, 1,3-diphenylguanidine was added and kneaded while the highest temperature of the rubber composition was kept controlled as in Table 1, and the vulcanizing agent and others were added and kneaded in the final stage (Z) of kneading thereby preparing the rubber compositions of Examples 1 to 6. On the other hand, as in Table 1, the stage (Y) was omitted, or 1,3-diphenylguanidine was not added in the stage (Y) of kneading, in preparing the rubber compositions of Comparative Examples 1 to 6. In each stage of kneading, used was a Banbury mixer. The obtained 12 rubber compositions were evaluated in point of the low-heat-generation property (tan δ index) thereof according to the above-mentioned method. The results are shown in Table 1.

TABLE 1

| | | Part by mass | Example 1 | 2 | 3 | 4 | 5 | 6 | Comparative Example 1 | 2 | 3 | 4 | 5 | 6 |
|---|---|---|---|---|---|---|---|---|---|---|---|---|---|---|
| Formulation | First Stage of Kneading | Emulsion-Polymerized SBR-A *1 | 100 | 100 | 100 | 100 | 100 | 100 | 100 | 100 | 100 | 100 | 100 | 100 |
| | | Carbon Black N220 *2 | 10 | 10 | 10 | — | 10 | 10 | 10 | 10 | 10 | 10 | 10 | — |
| | | Silica *3 | 50 | 50 | 50 | 60 | 50 | 50 | 50 | 50 | 50 | 50 | 50 | 60 |
| | | Silane Coupling Agent Si75 *4 | 4.0 | 4.0 | 4.0 | 4.8 | 4.0 | 4.0 | 4.0 | — | 4.0 | 4.0 | 4.0 | 4.8 |
| | | Aromatic Oil | 30 | 30 | 30 | 30 | 30 | 30 | 30 | 30 | 30 | 30 | 30 | 30 |
| | | Stearic Acid | 2.0 | 2.0 | 2.0 | 2.0 | 2.0 | 2.0 | 2.0 | 2.0 | — | — | 2.0 | 2.0 |
| | | Antiaging Agent 6PPD *5 | 1.0 | 1.0 | 1.0 | 1.0 | 1.0 | 1.0 | 1.0 | 1.0 | — | — | 1.0 | 1.0 |
| | | 1,3-Diphenylguanidine *6 | — | — | — | — | — | — | — | — | — | 1.0 | 1.0 | — |
| | Second Stage of Kneading | 1,3-Diphenylguanidine *6 | 1.0 | 0.3 | 1.5 | 1.0 | 0.1 | 2.5 | — | — | — | — | — | — |
| | | Silane Coupling Agent Si75 *4 | — | — | — | — | — | — | — | 4.0 | — | — | — | — |
| | Final Stage of Kneading | Stearic Acid | — | — | — | — | — | — | — | — | 2.0 | 2.0 | — | — |
| | | Antiaging Agent 6PPD *5 | — | — | — | — | — | — | — | — | 1.0 | 1.0 | — | — |
| | | Antiaging Agent TMDQ *7 | 1.0 | 1.0 | 1.0 | 1.0 | 1.0 | 1.0 | 1.0 | 1.0 | 1.0 | 1.0 | 1.0 | 1.0 |
| | | Zinc Flower | 2.5 | 2.5 | 2.5 | 2.5 | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 | 0.6 | 0.6 | 0.6 | 0.6 |
| | | Vulcanization Promoter MBTS *8 | 1.0 | 1.0 | 1.0 | 1.0 | 1.0 | 1.0 | 1.0 | 1.0 | 1.0 | 1.0 | 1.0 | 1.0 |
| | | Vulcanization Promoter TBBS *9 | 0.6 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 | 1.5 |
| Highest Temperature of Rubber Composition in First Stage of Kneading (° C.) | | | 150 | 150 | 150 | 150 | 150 | 150 | 150 | 150 | 150 | 150 | 150 | 150 |
| Highest Temperature of Rubber Composition in Second Stage of Kneading (° C.) | | | 130 | 130 | 130 | 130 | 130 | 130 | — | 130 | — | — | — | — |

TABLE 1-continued

|  | Part by mass | Example | | | | | | Comparative Example | | | | | |
| --- | --- | --- | --- | --- | --- | --- | --- | --- | --- | --- | --- | --- | --- |
|  |  | 1 | 2 | 3 | 4 | 5 | 6 | 1 | 2 | 3 | 4 | 5 | 6 |
|  | Number of Total Stages of Kneading | 3 | 3 | 3 | 3 | 3 | 3 | 2 | 3 | 2 | 2 | 2 | 2 |
| Vulcanizate Physical Property | Low-Heat-Generation Property (tan δ index) | 135 | 132 | 138 | 141 | 118 | 125 | 100 | 101 | 104 | 105 | 112 | 102 |

[Notes]
*1: JSR's emulsion-polymerized styrene-butadiene copolymer rubber (SBR), trade name "#1500"
*2: N220 (ISAF), Asahi Carbon's trade name "#80"
*3: Tosoh Silica's trade name "Nipseal AQ", BET specific surface area 205 $m^2/g$
*4: Bis(3-triethoxysilylpropyl) disulfide (mean sulfur chain length: 2.35), Evonik's silane coupling agent, trade name "Si75" (registered trademark)
*5: N-(1,3-dimethylbutyl)-N'-phenyl-p-phenylenediamine, by Ouchi Shinko Chemical, trade name "Noclac 6C"
*6: 1,3-Diphenylguanidine, Sanshin Chemical's trade name "Sanceler D"
*7: 2,2,4-Trimethyl-1,2-dihydroquinoline polymer, Ouchi Shinko Chemical's trade name "Noclac 224"
*8: Di-2-benzothiazolyl disulfide, Sanshin Chemical's trade name "Sanceler DM"
*9: N-tert-butyl-2-benzothiazolylsulfenamide, Sanshin Chemical's trade name "Sanceler NS"

Examples 7 to 14, and Comparative Examples 7 and 8

Next, according to the compositional formulation and the kneading method shown in Table 2, the rubber component, silica and the silane coupling agent were kneaded in the first stage (X) of kneading while the highest temperature of the rubber composition was kept controlled as in Table 2, then in the second stage (Y) of kneading, 1,3-diphenylguanidine was added and kneaded while the highest temperature of the rubber composition was kept controlled as in Table 2, and the vulcanizing agent and others were added and kneaded in the final stage (Z) of kneading thereby preparing the rubber compositions of Examples 7 to 14. On the other hand, as in Table 2, the stage (Y) was omitted in preparing the rubber compositions of Comparative Examples 7 and 8. In each stage of kneading, used was a Banbury mixer. The obtained 10 rubber compositions were evaluated in point of the low-heat-generation property (tan δ index) thereof according to the above-mentioned method. For comparison, the data of Example 1 and Comparative Example 1 are again shown here. The results are shown in Table 2.

TABLE 2

|  |  | Part by mass | Example | | | | | | | | | Comparative Example | | |
| --- | --- | --- | --- | --- | --- | --- | --- | --- | --- | --- | --- | --- | --- | --- |
|  |  |  | 1 | 7 | 8 | 9 | 10 | 11 | 12 | 13 | 14 | 1 | 7 | 8 |
| Formulation | First Stage of Kneading | Emulsion-Polymerized SBR-A *1 | 100 | 100 | 100 | 100 | 100 | 100 | 100 | 100 | 100 | 100 | 100 | 100 |
|  |  | Carbon Black N220 *2 | 10 | 10 | 10 | 10 | 10 | 10 | 10 | 10 | 10 | 10 | 10 | 10 |
|  |  | Silica *3 | 50 | 50 | 50 | 50 | 50 | 50 | 50 | 50 | 50 | 50 | 50 | 50 |
|  |  | Silane Coupling Agent Si75 *4 | 4.0 | 4.0 | 4.0 | 4.0 | 4.0 | 4.0 | 4.0 | 4.0 | 4.0 | 4.0 | 4.0 | 4.0 |
|  |  | Aromatic Oil | 30 | 30 | 30 | 30 | 30 | 30 | 30 | 30 | 30 | 30 | 30 | 30 |
|  |  | Stearic Acid | 2.0 | 2.0 | 2.0 | 2.0 | 2.0 | 2.0 | — | — | — | 2.0 | 2.0 | 2.0 |
|  |  | Antiaging Agent 6PPD *5 | 1.0 | 1.0 | 1.0 | 1.0 | 1.0 | 1.0 | — | — | — | 1.0 | 1.0 | 1.0 |
|  |  | 1,3-Diphenylguanidine *6 | — | — | — | — | — | — | — | — | — | — | — | — |
|  | Second Stage of Kneading | 1,3-Diphenylguanidine *6 | 1.0 | 1.0 | 1.0 | 1.0 | 1.0 | 1.0 | 1.0 | 1.0 | 1.0 | — | — | — |
|  |  | Silane Coupling Agent Si75 *4 | — | — | — | — | — | — | — | — | — | — | — | — |
|  | Final Stage of Kneading | Stearic Acid | — | — | — | — | — | — | 2.0 | 2.0 | 2.0 | — | — | — |
|  |  | Antiaging Agent 6PPD *5 | — | — | — | — | — | — | 1.0 | 1.0 | 1.0 | — | — | — |
|  |  | Antiaging Agent TMDQ *7 | 1.0 | 1.0 | 1.0 | 1.0 | 1.0 | 1.0 | 1.0 | 1.0 | 1.0 | 1.0 | 1.0 | 1.0 |
|  |  | Zinc Flower | 2.5 | 2.5 | 2.5 | 2.5 | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 0.6 | 0.6 | 0.6 | 0.6 | 0.6 | 0.6 | 0.6 |
|  |  | Vulcanization Promoter MBTS *8 | 1.0 | 1.0 | 1.0 | 1.0 | 1.0 | 1.0 | 1.0 | 1.0 | 1.0 | 1.0 | 1.0 | 1.0 |
|  |  | Vulcanization Promoter TBBS *9 | 0.6 | 0.6 | 0.6 | 0.6 | 0.6 | 0.6 | 0.6 | 0.6 | 0.6 | 0.6 | 0.6 | 0.6 |
|  |  | Sulfur | 1.5 | 1.5 | 1.5 | 1.5 | 1.5 | 1.5 | 1.5 | 1.5 | 1.5 | 1.5 | 1.5 | 1.5 |
| Highest Temperature of Rubber Composition in First Stage of Kneading (° C.) | | | 150 | 160 | 170 | 160 | 170 | 170 | 160 | 170 | 170 | 150 | 160 | 170 |
| Highest Temperature of Rubber Composition in Second Stage of Kneading (° C.) | | | 130 | 130 | 130 | 150 | 150 | 170 | 130 | 130 | 150 | — | — | — |
| Number of Total Stages of Kneading | | | 3 | 3 | 3 | 3 | 3 | 3 | 3 | 3 | 3 | 2 | 2 | 2 |
| Vulcanizate Physical Property | Low-Heat-Generation Property (tan δ index) | | 135 | 138 | 144 | 145 | 150 | 153 | 142 | 147 | 154 | 100 | 104 | 107 |

[Notes]
*1 to *9 are all the same as in Table 1.

Examples 15 to 19, and Comparative Example 9

According to the compositional formulation and the kneading method shown in Table 3, the rubber component, silica and the silane coupling agent were kneaded in the first stage (X) of kneading while the highest temperature of the rubber composition was kept controlled as in Table 3, then in the second stage (Y) of kneading, 1,3-diphenylguanidine was added and kneaded while the highest temperature of the rubber composition was kept controlled as in Table 3, and the vulcanizing agent and others were added and kneaded in the final stage (Z) of kneading thereby preparing the rubber compositions of Examples 15 to 19. On the other hand, as in Table 3, the stage (Y) was omitted in preparing the rubber composition of Comparative Example 9. In each stage of kneading, used was a Banbury mixer. The obtained 6 rubber compositions were evaluated in point of the low-heat-generation property (tan δ index) thereof according to the above-mentioned method. For comparison, the data of Example 1 and Comparative Example 1 are again shown here. The results are shown in Table 3.

Examples 20 to 26, and Comparative Examples 10 to 16

According to the compositional formulation and the kneading method shown in Table 4, the rubber component, silica and the silane coupling agent were kneaded in the first stage (X) of kneading while the highest temperature of the rubber composition was kept controlled as in Table 4, then in the second stage (Y) of kneading, 1,3-diphenylguanidine was added and kneaded while the highest temperature of the rubber composition was kept controlled as in Table 4, and the vulcanizing agent and others were added and kneaded in the final stage (Z) of kneading thereby preparing the rubber compositions of Examples 20 to 26. On the other hand, as in Table 4, the stage (Y) was omitted in preparing the rubber compositions of Comparative Examples 10 to 16. In each stage of kneading, used was a Banbury mixer. The obtained 14 rubber compositions were evaluated in point of the low-heat-generation property (tan δ index) thereof according to the above-mentioned method. The results are shown in Table 4.

TABLE 3

| | | | Example | | | | | | Comparative Example | |
|---|---|---|---|---|---|---|---|---|---|---|
| | | Part by mass | 1 | 15 | 16 | 17 | 18 | 19 | 1 | 9 |
| Formulation | First Stage of Kneading | Emulsion-Polymerized SBR-A *1 | 100 | 100 | 100 | 100 | — | — | 100 | — |
| | | Solution-Polymerized SBR-B *10 | — | — | — | — | 100 | 100 | — | 100 |
| | | Carbon Black N220 *2 | 10 | 10 | 10 | 10 | 10 | 10 | 10 | 10 |
| | | Silica *3 | 50 | 50 | 50 | 50 | 50 | 50 | 50 | 50 |
| | | Silane Coupling Agent Si75 *4 | 4.0 | 4.0 | 4.0 | 4.0 | 4.0 | 4.0 | 4.0 | 4.0 |
| | | Aromatic Oil | 30 | 30 | 30 | 30 | 30 | 30 | 30 | 30 |
| | | Stearic Acid | 2.0 | 2.0 | 2.0 | 2.0 | 2.0 | 2.0 | 2.0 | 2.0 |
| | | Antiaging Agent 6PPD *5 | 1.0 | 1.0 | 1.0 | 1.0 | 1.0 | 1.0 | 1.0 | 1.0 |
| | Second Stage of Kneading | 1,3-Diphenylguanidine *6 | 1.0 | 1.0 | 1.0 | 1.0 | 1.0 | 1.0 | — | — |
| | Final Stage of Kneading | Antiaging Agent TMDQ *7 | 1.0 | 1.0 | 1.0 | 1.0 | 1.0 | 1.0 | 1.0 | 1.0 |
| | | Zinc Flower | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 |
| | | Vulcanization Promoter MBTS *8 | 1.0 | 1.0 | 1.0 | 1.0 | 1.0 | 1.0 | 1.0 | 1.0 |
| | | Vulcanization Promoter TBBS *9 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 |
| Highest Temperature of Rubber Composition in First Stage of Kneading (° C.) | | | 150 | 150 | 150 | 150 | 150 | 150 | 150 | 150 |
| Highest Temperature of Rubber Composition in Second Stage of Kneading (° C.) | | | 130 | 170 | 150 | 110 | 150 | 170 | — | — |
| Number of Total Stages of Kneading | | | 3 | 3 | 3 | 3 | 3 | 3 | 2 | 2 |
| Vulcanizate Physical Property | | Low-Heat-Generation Property (tanδ index) | 135 | 145 | 143 | 118 | 146 | 149 | 100 | 102 |

[Notes]
*1 to *9 are all the same as in Table 1.
*10: Asahi Kasei's solution-polymerized styrene-butadiene copolymer rubber (SBR), trade name "Toughden 2000"

TABLE 4

|  |  |  | Example |  |  |  |  |  |  | Comparative Example |  |  |  |  |  |  |
|---|---|---|---|---|---|---|---|---|---|---|---|---|---|---|---|---|
| | Part by mass | | 20 | 21 | 22 | 23 | 24 | 25 | 26 | 10 | 11 | 12 | 13 | 14 | 15 | 16 |
| Formulation | First Stage of Kneading | Emulsion-Polymerized SBR-A *1 | 75 | 50 | 25 | 80 | — | 80 | — | 75 | 50 | 25 | 80 | — | 80 | — |
| | | Solution-Polymerized SBR-B *10 | 25 | 50 | 75 | — | 80 | — | 80 | 25 | 50 | 75 | — | 80 | — | 80 |
| | | Natural Rubber *11 | — | — | — | 20 | 20 | — | — | — | — | — | 20 | 20 | — | — |
| | | Unmodified BR *12 | — | — | — | — | — | 20 | 20 | — | — | — | — | — | 20 | 20 |
| | | Carbon Black N220 *2 | 10 | 10 | 10 | 10 | 10 | 10 | 10 | 10 | 10 | 10 | 10 | 10 | 10 | 10 |
| | | Silica *3 | 50 | 50 | 50 | 50 | 50 | 50 | 50 | 50 | 50 | 50 | 50 | 50 | 50 | 50 |
| | | Silane Coupling Agent Si75 *4 | 4.0 | 4.0 | 4.0 | 4.0 | 4.0 | 4.0 | 4.0 | 4.0 | 4.0 | 4.0 | 4.0 | 4.0 | 4.0 | 4.0 |
| | | Aromatic Oil | 30 | 30 | 30 | 30 | 30 | 30 | 30 | 30 | 30 | 30 | 30 | 30 | 30 | 30 |
| | | Stearic Acid | 2.0 | 2.0 | 2.0 | 2.0 | 2.0 | 2.0 | 2.0 | 2.0 | 2.0 | 2.0 | 2.0 | 2.0 | 2.0 | 2.0 |
| | | Antiaging Agent 6PPD *5 | 1.0 | 1.0 | 1.0 | 1.0 | 1.0 | 1.0 | 1.0 | 1.0 | 1.0 | 1.0 | 1.0 | 1.0 | 1.0 | 1.0 |
| | Second Stage of Kneading | 1,3-Diphenylguanidine *6 | 1.0 | 1.0 | 1.0 | 1.0 | 1.0 | 1.0 | 1.0 | — | — | — | — | — | — | — |
| | Final Stage of Kneading | Antiaging Agent TMDQ *7 | 1.0 | 1.0 | 1.0 | 1.0 | 1.0 | 1.0 | 1.0 | 1.0 | 1.0 | 1.0 | 1.0 | 1.0 | 1.0 | 1.0 |
| | | Zinc Flower | 2.5 | 2.5 | 2.5 | 2.5 | 2.5 | 2.5 | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 | 0.6 | 0.6 | 0.6 | 0.6 | 0.6 | 0.6 |
| | | Vulcanization Promoter MBTS *8 | 1.0 | 1.0 | 1.0 | 1.0 | 1.0 | 1.0 | 1.0 | 1.0 | 1.0 | 1.0 | 1.0 | 1.0 | 1.0 | 1.0 |
| | | Vulcanization Promoter TBBS *9 | 0.6 | 0.6 | 0.6 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 | 1.5 | 1.5 | 1.5 |
| Highest Temperature of Rubber Composition in First Stage of Kneading (° C.) | | | 150 | 150 | 150 | 150 | 150 | 150 | 150 | 150 | 150 | 150 | 150 | 150 | 150 | 150 |
| Highest Temperature of Rubber Composition in Second Stage of Kneading (° C.) | | | 130 | 130 | 130 | 130 | 130 | 130 | 130 | — | — | — | — | — | — | — |
| Number of Total Stages of Kneading | | | 3 | 3 | 3 | 3 | 3 | 3 | 3 | 2 | 2 | 2 | 2 | 2 | 2 | 2 |
| Vulcanizate Physical Property | | Low-Heat-Generation Property (tanδ index) | 131 | 128 | 124 | 138 | 145 | 142 | 149 | 100 | 100 | 100 | 110 | 111 | 114 | 114 |

[Notes]
*1 to *10 are all the same as in Table 1 and Table 3.
*11: RSS#3
*12: JSR's polybutadiene rubber, trade name "BR-01"

Examples 27 to 34, and Comparative Examples 17 to 21

According to the compositional formulation and the kneading method shown in Table 5, the rubber component, silica and the silane coupling agent were kneaded in the first stage (X) of kneading while the highest temperature of the rubber composition was kept controlled as in Table 5, then in the second stage (Y) of kneading, 1,3-diphenylguanidine was added and kneaded while the highest temperature of the rubber composition was kept controlled as in Table 5, and the vulcanizing agent and others were added and kneaded in the final stage (Z) of kneading thereby preparing the rubber compositions of Examples 27 to 34. On the other hand, as in Table 5, the stage (Y) was omitted in preparing the rubber compositions of Comparative Examples 17 to 21. In each stage of kneading, used was a Banbury mixer. The obtained 13 rubber compositions were evaluated in point of the low-heat-generation property (tan δ index) thereof according to the above-mentioned method. The results are shown in Table 5.

TABLE 5

|  |  |  | Example |  |  |  |  |  |  |  |
|---|---|---|---|---|---|---|---|---|---|---|
| | Part by mass | | 27 | 28 | 29 | 30 | 31 | 32 | 33 | 34 |
| Formulation | First Stage of Kneading | Emulsion-Polymerized SBR-C *13 | 68.75 | 68.75 | 68.75 | 68.75 | 68.75 | 68.75 | 68.75 | 68.75 |
| | | Solution-Polymerized SBR-D *14 | 68.75 | 68.75 | 68.75 | 68.75 | 68.75 | 68.75 | 68.75 | 68.75 |
| | | Carbon Black N220 *2 | 10 | 10 | 10 | 10 | 10 | 10 | 10 | 10 |
| | | Silica *3 | 80 | 80 | 80 | 80 | 80 | 80 | 80 | 80 |
| | | Silane Coupling Agent Si75 *4 | 6.5 | — | — | — | 6.5 | — | — | — |
| | | Silane Coupling Agent NXT *15 | — | 6.5 | — | — | — | 6.5 | — | — |
| | | Silane Coupling Agent NXT-Z *16 | — | — | 6.5 | — | — | — | 6.5 | — |
| | | Silane Coupling Agent *17 | — | — | — | 6.5 | — | — | — | 6.5 |
| | | Aromatic Oil | 5.0 | 5.0 | 5.0 | 5.0 | 5.0 | 5.0 | 5.0 | 5.0 |
| | | Stearic Acid | 2.0 | 2.0 | 2.0 | 2.0 | — | — | — | — |
| | | Antiaging Agent 6PPD *5 | 1.0 | 1.0 | 1.0 | 1.0 | — | — | — | — |

TABLE 5-continued

|  |  |  |  |  |  |  |  |  |  |  |
|---|---|---|---|---|---|---|---|---|---|---|
| Second Stage of Kneading | 1,3-Diphenylguanidine *6 | 1.0 | 1.0 | 1.0 | 1.0 | 1.0 | 1.0 | 1.0 | 1.0 |
| Final Stage of Kneading | Stearic Acid | — | — | — | — | 2.0 | 2.0 | 2.0 | 2.0 |
|  | Antiaging Agent 6PPD *5 | — | — | — | — | 1.0 | 1.0 | 1.0 | 1.0 |
|  | Zinc Flower | 3.0 | 3.0 | 3.0 | 3.0 | 3.0 | 3.0 | 3.0 | 3.0 |
|  | 1,3-Diphenylguanidine *6 | 1.0 | 1.0 | 1.0 | 1.0 | 1.0 | 1.0 | 1.0 | 1.0 |
|  | Vulcanization Promoter MBTS *8 | 0.8 | 0.8 | 0.8 | 0.8 | 0.8 | 0.8 | 0.8 | 0.8 |
|  | Vulcanization Promoter CBS *18 | 1.5 | 1.5 | 1.5 | 1.5 | 1.5 | 1.5 | 1.5 | 1.5 |
|  | Sulfur | 1.5 | 1.5 | 1.5 | 1.5 | 1.5 | 1.5 | 1.5 | 1.5 |
| Highest Temperature of Rubber Composition in First Stage of Kneading (° C.) | | 150 | 150 | 150 | 150 | 150 | 150 | 150 | 150 |
| Highest Temperature of Rubber Composition in Second Stage of Kneading (° C.) | | 130 | 130 | 130 | 130 | 130 | 130 | 130 | 130 |
| Number of Total Stages of Kneading | | 3 | 3 | 3 | 3 | 3 | 3 | 3 | 3 |
| Vulcanizate Physical Property | Low-Heat-Generation Property (tanδ index) | 123 | 128 | 121 | 135 | 125 | 129 | 122 | 139 |

|  |  |  | Comparative Example | | | | |
|---|---|---|---|---|---|---|---|
|  |  | Part by mass | 17 | 18 | 19 | 20 | 21 |
| Formulation | First Stage of Kneading | Emulsion-Polymerized SBR-C *13 | 68.75 | 68.75 | 68.75 | 68.75 | 68.75 |
|  |  | Solution-Polymerized SBR-D *14 | 68.75 | 68.75 | 68.75 | 68.75 | 68.75 |
|  |  | Carbon Black N220 *2 | 10 | 10 | 10 | 10 | 10 |
|  |  | Silica *3 | 80 | 80 | 80 | 80 | 80 |
|  |  | Silane Coupling Agent Si75 *4 | 6.5 | 6.5 | — | — | — |
|  |  | Silane Coupling Agent NXT *15 | — | — | 6.5 | — | — |
|  |  | Silane Coupling Agent NXT-Z *16 | — | — | — | 6.5 | — |
|  |  | Silane Coupling Agent *17 | — | — | — | — | 6.5 |
|  |  | Aromatic Oil | 5.0 | 5.0 | 5.0 | 5.0 | 5.0 |
|  |  | Stearic Acid | 2.0 | — | — | — | — |
|  |  | Antiaging Agent 6PPD *5 | 1.0 | — | — | — | — |
|  | Second Stage of Kneading | 1,3-Diphenylguanidine *6 | — | — | — | — | — |
|  | Final Stage of Kneading | Stearic Acid | — | 2.0 | 2.0 | 2.0 | 2.0 |
|  |  | Antiaging Agent 6PPD *5 | — | 1.0 | 1.0 | 1.0 | 1.0 |
|  |  | Zinc Flower | 3.0 | 3.0 | 3.0 | 3.0 | 3.0 |
|  |  | 1,3-Diphenylguanidine *6 | 1.0 | 1.0 | 1.0 | 1.0 | 1.0 |
|  |  | Vulcanization Promoter MBTS *8 | 0.8 | 0.8 | 0.8 | 0.8 | 0.8 |
|  |  | Vulcanization Promoter CBS *18 | 1.5 | 1.5 | 1.5 | 1.5 | 1.5 |
|  |  | Sulfur | 1.5 | 1.5 | 1.5 | 1.5 | 1.5 |
| Highest Temperature of Rubber Composition in First Stage of Kneading (° C.) | | | 150 | 150 | 150 | 150 | 150 |
| Highest Temperature of Rubber Composition in Second Stage of Kneading (° C.) | | | — | — | — | — | — |
| Number of Total Stages of Kneading | | | 2 | 2 | 2 | 2 | 2 |
| Vulcanizate Physical Property | Low-Heat-Generation Property (tanδ index) | | 100 | 100 | 115 | 110 | 112 |

[Notes]
*2 to *8 are all the same as in Table 1.
*13: JSR's emulsion-polymerized styrene-butadiene copolymer rubber (SBR), trade name "#1712"
*14: Asahi Kasei's solution-polymerized styrene-butadiene copolymer rubber (SBR), trade name "Toughden 3835"
*15: 3-Octanoylthiopropyltriethoxysilane, Momentive Performance Materials' trade name "NXT Silane" (registered trademark)
*16: Silane coupling agent represented by the chemical formula (VII), Momentive Performance Materials' trade name "NXT-Z" (registered trademark)
*17: Silane coupling agent represented by the following average compositional formula and obtained in Production Example 1: $(CH_3CH_2O)_3Si—(CH_2)_3—S—(CH_2)_6—S_{2.5}—(CH_2)_6—S—(CH_2)_3—Si(OCH_2CH_3)_3$
*18: N-cyclohexyl-2-benzothiazolylsulfenamide, Ouchi Shinko Chemical's trade name "Nocceler CZ"

Examples 35 and 36, and Comparative Examples 22 to 24

According to the compositional formulation and the kneading method shown in Table 6, the rubber component, silica and the silane coupling agent were kneaded in the first stage (X) of kneading while the highest temperature of the rubber composition was kept controlled as in Table 6, then in the second stage (Y) of kneading, guanidines were added and kneaded while the highest temperature of the rubber composition was kept controlled as in Table 6, and the vulcanizing agent and others were added and kneaded in the final stage (Z) of kneading thereby preparing the rubber compositions of Examples 35 and 36. On the other hand, as in Table 6, the stage (Y) was omitted in preparing the rubber compositions of Comparative Examples 22 to 24. In each stage of kneading, used was a Banbury mixer. The obtained 5 rubber compositions were evaluated in point of the low-heat-generation property (tan δ index) thereof according to the above-mentioned method. For comparison, the data of Example 29 and Comparative Example 19 are again shown here. The results are shown in Table 6.

TABLE 6

|  |  | Part by mass | Example | | | Comparative Example | | | |
|---|---|---|---|---|---|---|---|---|---|
|  |  |  | 27 | 35 | 36 | 17 | 22 | 23 | 24 |
| Formulation | First Stage of Kneading | Emulsion-Polymerized SBR-C *13 | 68.75 | 68.75 | 68.75 | 68.75 | 68.75 | 68.75 | 68.75 |
|  |  | Solution-Polymerized SBR-D *14 | 68.75 | 68.75 | 68.75 | 68.75 | 68.75 | 68.75 | 68.75 |
|  |  | Carbon Black N220 *2 | 10 | 10 | 10 | 10 | 10 | 10 | 10 |
|  |  | Silica *3 | 80 | 80 | 80 | 80 | 80 | 80 | 80 |
|  |  | Silane Coupling Agent Si75 *4 | 6.5 | 6.5 | 6.5 | 6.5 | 6.5 | 6.5 | 6.5 |
|  |  | Aromatic Oil | 5.0 | 5.0 | 5.0 | 5.0 | 5.0 | 5.0 | 5.0 |
|  |  | Stearic Acid | 2.0 | 2.0 | 2.0 | 2.0 | 2.0 | 2.0 | 2.0 |
|  |  | Antiaging Agent 6PPD *5 | 1.0 | 1.0 | 1.0 | 1.0 | 1.0 | 1.0 | 1.0 |
|  |  | 1,3-Diphenylguanidine *6 | — | — | — | — | 1.0 | — | — |
|  |  | 1,3-Di-o-tolylguanidine *19 | — | — | — | — | — | 1.0 | — |
|  |  | 1-O-tolylbiguanide *20 | — | — | — | — | — | — | 1.0 |
|  | Second Stage of Kneading | 1,3-Diphenylguanidine *6 | 1.0 | — | — | — | — | — | — |
|  |  | 1,3-Di-o-tolylguanidine *19 | — | 1.0 | — | — | — | — | — |
|  |  | 1-O-tolylbiguanide *20 | — | — | 1.0 | — | — | — | — |
|  | Final Stage of Kneading | Zinc Flower | 3.0 | 3.0 | 3.0 | 3.0 | 3.0 | 3.0 | 3.0 |
|  |  | 1,3-Diphenylguanidine *6 | 1.0 | 1.0 | 1.0 | 1.0 | 1.0 | 1.0 | 1.0 |
|  |  | Vulcanization Promoter MBTS *8 | 0.8 | 0.8 | 0.8 | 0.8 | 0.8 | 0.8 | 0.8 |
|  |  | Vulcanization Promoter CBS *18 | 1.5 | 1.5 | 1.5 | 1.5 | 1.5 | 1.5 | 1.5 |
|  |  | Sulfur | 1.5 | 1.5 | 1.5 | 1.5 | 1.5 | 1.5 | 1.5 |
| Highest Temperature of Rubber Composition in First Stage of Kneading (° C.) | | | 150 | 150 | 150 | 150 | 150 | 150 | 150 |
| Highest Temperature of Rubber Composition in Second Stage of Kneading (° C.) | | | 130 | 130 | 130 | — | — | — | — |
| Number of Total Stages of Kneading | | | 3 | 3 | 3 | 2 | 2 | 2 | 2 |
| Vulcanizate Physical Property | Low-Heat-Generation Property (tanδ index) | | 123 | 122 | 117 | 100 | 103 | 104 | 102 |

[Notes]
*2 to *8 are all the same as in Table 1.
*13, *14 and *18 are the same as in Table 5.
*19: Ouchi Shinko Chemical's trade name "Nocceler DT"
*20: Ouchi Shinko Chemical's trade name "Nocceler BG"

Examples 37 to 284, and Comparative Examples 25 to 55

According to the compositional formulation and the kneading method shown in Table 7 to Table 45, the rubber component, silica and the silane coupling agent were kneaded in the first stage (X) of kneading while the highest temperature of the rubber composition was kept controlled as in Table 7 to Table 45, then in the second stage (Y) of kneading, the vulcanization promoter (D) was added and kneaded while the highest temperature of the rubber composition was kept controlled as in Table 7 to Table 45, and the vulcanizing agent and others were added and kneaded in the final stage (Z) of kneading thereby preparing the rubber compositions of Examples 37 and 284. On the other hand, as in Table 7 to Table 45, the stage (Y) was omitted or the vulcanization promoter (D) was not added in the stage (Y), thereby preparing the rubber compositions of Comparative Examples 25 to 55. In each stage of kneading, used was a Banbury mixer. The obtained 279 rubber compositions were evaluated in point of the low-heat-generation property (tan δ index) thereof according to the above-mentioned method. The results are shown in Table 7 to Table 45.

TABLE 7

|  |  | Part by mass | Example | | | | | | Comparative Example | | |
|---|---|---|---|---|---|---|---|---|---|---|---|
|  |  |  | 37 | 38 | 39 | 40 | 41 | 42 | 1 | 25 | 6 |
| Formulation | First Stage of Kneading | Emulsion-Polymerized SBR-A *1 | 100 | 100 | 100 | 100 | 100 | 100 | 100 | 100 | 100 |
|  |  | Carbon Black N220 *2 | 10 | 10 | 10 | — | 10 | 10 | 10 | 10 | — |
|  |  | Silica *3 | 50 | 50 | 50 | 60 | 50 | 50 | 50 | 50 | 60 |
|  |  | Silane Coupling Agent Si75 *4 | 4.0 | 4.0 | 4.0 | 4.8 | 4.0 | 4.0 | 4.0 | 4.0 | 4.8 |
|  |  | Aromatic Oil | 30 | 30 | 30 | 30 | 30 | 30 | 30 | 30 | 30 |
|  |  | Stearic Acid | 2.0 | 2.0 | 2.0 | 2.0 | 2.0 | 2.0 | 2.0 | 2.0 | 2.0 |
|  |  | Antiaging Agent 6PPD *5 | 1.0 | 1.0 | 1.0 | 1.0 | 1.0 | 1.0 | 1.0 | 1.0 | 1.0 |
|  |  | N-cyclohexyl-2-benzothiazolylsulfenamide *18 | — | — | — | — | — | — | — | 1.0 | — |
|  | Second Stage of Kneading | N-cyclohexyl-2-benzothiazolylsulfenamide *18 | 1.0 | 0.3 | 1.5 | 1.0 | 0.1 | 2.5 | — | — | — |
|  | Final Stage of Kneading | Stearic Acid | — | — | — | — | — | — | — | — | — |
|  |  | Antiaging Agent 6PPD *5 | — | — | — | — | — | — | — | — | — |
|  |  | Antiaging Agent TMDQ *7 | 1.0 | 1.0 | 1.0 | 1.0 | 1.0 | 1.0 | 1.0 | 1.0 | 1.0 |
|  |  | Zinc Flower | 2.5 | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 0.6 | 0.6 | 0.6 | 0.6 |
|  |  | Vulcanization Promoter MBTS *8 | 1.0 | 1.0 | 1.0 | 1.0 | 1.0 | 1.0 | 1.0 | 1.0 | 1.0 |
|  |  | Vulcanization Promoter TBBS *9 | 0.6 | 0.6 | 0.6 | 0.6 | 0.6 | 0.6 | 0.6 | 0.6 | 0.6 |
|  |  | Sulfur | 1.5 | 1.5 | 1.5 | 1.5 | 1.5 | 1.5 | 1.5 | 1.5 | 1.5 |

TABLE 7-continued

|  | | Example | | | | | | Comparative Example | | |
|---|---|---|---|---|---|---|---|---|---|---|
| Part by mass | | 37 | 38 | 39 | 40 | 41 | 42 | 1 | 25 | 6 |
| Highest Temperature of Rubber Composition in First Stage of Kneading (° C.) | | 150 | 150 | 150 | 150 | 150 | 150 | 150 | 150 | 150 |
| Highest Temperature of Rubber Composition in Second Stage of Kneading (° C.) | | 130 | 130 | 130 | 130 | 130 | 130 | — | — | — |
| Number of Total Stages of Kneading | | 3 | 3 | 3 | 3 | 3 | 3 | 2 | 2 | 2 |
| Vulcanizate Physical Property | Low-Heat-Generation Property (tanδ index) | 121 | 120 | 122 | 128 | 117 | 122 | 100 | 104 | 102 |

[Note]
*1 to *18 are all the same as in Table 1 to Table 5.

TABLE 8

| | | | Example | | | | | | | | | Comparative Example | |
|---|---|---|---|---|---|---|---|---|---|---|---|---|---|
| | | Part by mass | 37 | 43 | 44 | 45 | 46 | 47 | 48 | 49 | 50 | 1 | 8 |
| Formulation | First Stage of Kneading | Emulsion-Polymerized SBR-A *1 | 100 | 100 | 100 | 100 | 100 | 100 | 100 | 100 | 100 | 100 | 100 |
| | | Carbon Black N220 *2 | 10 | 10 | 10 | 10 | 10 | 10 | 10 | 10 | 10 | 10 | 10 |
| | | Silica *3 | 50 | 50 | 50 | 50 | 50 | 50 | 50 | 50 | 50 | 50 | 50 |
| | | Silane Coupling Agent Si75 *4 | 4.0 | 4.0 | 4.0 | 4.0 | 4.0 | 4.0 | 4.0 | 4.0 | 4.0 | 4.0 | 4.0 |
| | | Aromatic Oil | 30 | 30 | 30 | 30 | 30 | 30 | 30 | 30 | 30 | 30 | 30 |
| | | Stearic Acid | 2.0 | 2.0 | 2.0 | 2.0 | 2.0 | 2.0 | — | — | — | 2.0 | 2.0 |
| | | Antiaging Agent 6PPD *5 | 1.0 | 1.0 | 1.0 | 1.0 | 1.0 | 1.0 | — | — | — | 1.0 | 1.0 |
| | | N-cyclohexyl-2-benzothiazolylsulfenamide *18 | — | — | — | — | — | — | — | — | — | — | — |
| | Second Stage of Kneading | N-cyclohexyl-2-benzothiazolylsulfenamide *18 | 1.0 | 1.0 | 1.0 | 1.0 | 1.0 | 1.0 | 1.0 | 1.0 | 1.0 | — | — |
| | Final Stage of Kneading | Stearic Acid | — | — | — | — | — | — | 2.0 | 2.0 | 2.0 | — | — |
| | | Antiaging Agent 6PPD *5 | — | — | — | — | — | — | 1.0 | 1.0 | 1.0 | — | — |
| | | Antiaging Agent TMDQ *7 | 1.0 | 1.0 | 1.0 | 1.0 | 1.0 | 1.0 | 1.0 | 1.0 | 1.0 | 1.0 | 1.0 |
| | | Zinc Flower | 2.5 | 2.5 | 2.5 | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 | 0.6 | 0.6 | 0.6 |
| | | Vulcanization Promoter MBTS *8 | 1.0 | 1.0 | 1.0 | 1.0 | 1.0 | 1.0 | 1.0 | 1.0 | 1.0 | 1.0 | 1.0 |
| | | Vulcanization Promoter TBBS *9 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 |
| Highest Temperature of Rubber Composition in First Stage of Kneading (° C.) | | | 150 | 160 | 170 | 160 | 170 | 170 | 160 | 170 | 170 | 150 | 170 |
| Highest Temperature of Rubber Composition in Second Stage of Kneading (° C.) | | | 130 | 130 | 130 | 150 | 150 | 170 | 130 | 130 | 150 | — | — |
| Number of Total Stages of Kneading | | | 3 | 3 | 3 | 3 | 3 | 3 | 3 | 3 | 3 | 2 | 2 |
| Vulcanizate Physical Property | Low-Heat-Generation Property (tanδ index) | | 121 | 122 | 125 | 121 | 125 | 127 | 123 | 125 | 125 | 100 | 107 |

[Notes]
*1 to *18 are all the same as in Table 1 to Table 5.

TABLE 9

| | | | Example | | | | | | Comparative Example | |
|---|---|---|---|---|---|---|---|---|---|---|
| | | Part by mass | 37 | 51 | 52 | 53 | 54 | 55 | 1 | 9 |
| Formulation | First Stage of Kneading | Emulsion-Polymerized SBR-A *1 | 100 | 100 | 100 | 100 | — | — | 100 | — |
| | | Solution-Polymerized SBR-B *10 | — | — | — | — | 100 | 100 | — | 100 |
| | | Carbon Black N220 *2 | 10 | 10 | 10 | 10 | 10 | 10 | 10 | 10 |
| | | Silica *3 | 50 | 50 | 50 | 50 | 50 | 50 | 50 | 50 |
| | | Silane Coupling Agent Si75 *4 | 4.0 | 4.0 | 4.0 | 4.0 | 4.0 | 4.0 | 4.0 | 4.0 |
| | | Aromatic Oil | 30 | 30 | 30 | 30 | 30 | 30 | 30 | 30 |
| | | Stearic Acid | 2.0 | 2.0 | 2.0 | 2.0 | 2.0 | 2.0 | 2.0 | 2.0 |
| | | Antiaging Agent 6PPD *5 | 1.0 | 1.0 | 1.0 | 1.0 | 1.0 | 1.0 | 1.0 | 1.0 |
| | Second Stage of Kneading | N-cyclohexyl-2-benzothiazolylsulfenamide *18 | 1.0 | 1.0 | 1.0 | 1.0 | 1.0 | 1.0 | — | — |
| | Final Stage of Kneading | Antiaging Agent TMDQ *7 | 1.0 | 1.0 | 1.0 | 1.0 | 1.0 | 1.0 | 1.0 | 1.0 |
| | | Zinc Flower | 2.5 | 2.5 | 2.5 | 2.5 | 2.5 | 2.5 | 2.5 | 2.5 |

TABLE 9-continued

|  | Part by mass | Example 37 | Example 51 | Example 52 | Example 53 | Example 54 | Example 55 | Comparative Example 1 | Comparative Example 9 |
|---|---|---|---|---|---|---|---|---|---|
|  | 1,3-Diphenylguanidine *6 | 0.6 | 0.6 | 0.6 | 0.6 | 0.6 | 0.6 | 0.6 | 0.6 |
|  | Vulcanization Promoter MBTS *8 | 1.0 | 1.0 | 1.0 | 1.0 | 1.0 | 1.0 | 1.0 | 1.0 |
|  | Vulcanization Promoter TBBS *9 | 0.6 | 0.6 | 0.6 | 0.6 | 0.6 | 0.6 | 0.6 | 0.6 |
|  | Sulfur | 1.5 | 1.5 | 1.5 | 1.5 | 1.5 | 1.5 | 1.5 | 1.5 |
| Highest Temperature of Rubber Composition in First Stage of Kneading (° C.) | | 150 | 150 | 150 | 150 | 150 | 150 | 150 | 150 |
| Highest Temperature of Rubber Composition in Second Stage of Kneading (° C.) | | 130 | 170 | 150 | 110 | 150 | 170 | — | — |
| Number of Total Stages of Kneading | | 3 | 3 | 3 | 3 | 3 | 3 | 2 | 2 |
| Vulcanizate Physical Property | Low-Heat-Generation Property (tanδ index) | 121 | 126 | 125 | 112 | 127 | 129 | 100 | 102 |

[Notes]
*1 to *18 are all the same as in Table 1 to Table 5.

TABLE 10

|  |  | part by mass | Example 56 | Example 57 | Example 58 | Example 59 | Example 60 | Example 61 | Example 62 | Comparative Example 10 | Comparative Example 16 |
|---|---|---|---|---|---|---|---|---|---|---|---|
| Formulation | First Stage of Kneading | Emulsion-Polymerized SBR-A *1 | 75 | 50 | 25 | 80 | — | 80 | — | 75 | — |
|  |  | Solution-Polymerized SBR-B *10 | 25 | 50 | 75 | — | 80 | — | 80 | 25 | 80 |
|  |  | Natural Rubber *11 | — | — | — | 20 | 20 | — | — | — | — |
|  |  | Unmodified BR *12 | — | — | — | — | — | 20 | 20 | — | 20 |
|  |  | Carbon Black N220 *2 | 10 | 10 | 10 | 10 | 10 | 10 | 10 | 10 | 10 |
|  |  | Silica *3 | 50 | 50 | 50 | 50 | 50 | 50 | 50 | 50 | 50 |
|  |  | Silane Coupling Agent Si75 *4 | 4.0 | 4.0 | 4.0 | 4.0 | 4.0 | 4.0 | 4.0 | 4.0 | 4.0 |
|  |  | Aromatic Oil | 30 | 30 | 30 | 30 | 30 | 30 | 30 | 30 | 30 |
|  |  | Stearic Acid | 2.0 | 2.0 | 2.0 | 2.0 | 2.0 | 2.0 | 2.0 | 2.0 | 2.0 |
|  |  | Antiaging Agent 6PPD *5 | 1.0 | 1.0 | 1.0 | 1.0 | 1.0 | 1.0 | 1.0 | 1.0 | 1.0 |
|  | Second Stage of Kneading | N-cyclohexyl-2-benzothiazolylsulfenamide *18 | 1.0 | 1.0 | 1.0 | 1.0 | 1.0 | 1.0 | 1.0 | — | — |
|  | Final Stage of Kneading | Antiaging Agent TMDQ *7 | 1.0 | 1.0 | 1.0 | 1.0 | 1.0 | 1.0 | 1.0 | 1.0 | 1.0 |
|  |  | Zinc Flower | 2.5 | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 0.6 | 0.6 | 0.6 | 0.6 |
|  |  | Vulcanization Promoter MBTS *8 | 1.0 | 1.0 | 1.0 | 1.0 | 1.0 | 1.0 | 1.0 | 1.0 | 1.0 |
|  |  | Vulcanization Promoter TBBS *9 | 0.6 | 0.6 | 0.6 | 0.6 | 0.6 | 0.6 | 0.6 | 0.6 | 0.6 |
|  |  | Sulfur | 1.5 | 1.5 | 1.5 | 1.5 | 1.5 | 1.5 | 1.5 | 1.5 | 1.5 |
| Highest Temperature of Rubber Composition in First Stage of Kneading (° C.) | | | 150 | 150 | 150 | 150 | 150 | 150 | 150 | 150 | 150 |
| Highest Temperature of Rubber Composition in Second Stage of Kneading (° C.) | | | 130 | 130 | 130 | 130 | 130 | 130 | 130 | — | — |
| Number of Total Stages of Kneading | | | 3 | 3 | 3 | 3 | 3 | 3 | 3 | 2 | 2 |
| Vulcanizate Physical Property | Low-Heat-Generation Property (tanδ index) | | 121 | 120 | 120 | 128 | 129 | 132 | 134 | 100 | 114 |

[Notes]
*1 to *18 are all the same as in Table 1 to Table 5.

TABLE 11

|  |  | Part by mass | Example 63 | Example 64 | Example 65 | Example 66 | Example 67 | Example 68 | Example 69 | Example 70 | Comparative Example 17 | Comparative Example 18 |
|---|---|---|---|---|---|---|---|---|---|---|---|---|
| Formulation | First Stage of Kneading | Emulsion-Polymerized SBR-C *13 | 68.75 | 68.75 | 68.75 | 68.75 | 68.75 | 68.75 | 68.75 | 68.75 | 68.75 | 68.75 |
|  |  | Solution-Polymerized SBR-D *14 | 68.75 | 68.75 | 68.75 | 68.75 | 68.75 | 68.75 | 68.75 | 68.75 | 68.75 | 68.75 |
|  |  | Carbon Black N220 *2 | 10 | 10 | 10 | 10 | 10 | 10 | 10 | 10 | 10 | 10 |
|  |  | Silica *3 | 80 | 80 | 80 | 80 | 80 | 80 | 80 | 80 | 80 | 80 |
|  |  | Silane Coupling Agent Si75 *4 | 6.5 | — | — | — | 6.5 | — | — | — | 6.5 | 6.5 |
|  |  | Silane Coupling Agent NXT *15 | — | 6.5 | — | — | — | 6.5 | — | — | — | — |
|  |  | Silane Coupling Agent NXT-Z *16 | — | — | 6.5 | — | — | — | 6.5 | — | — | — |

TABLE 11-continued

|  |  | Part by mass | Example | | | | | | | | Comparative Example | |
|---|---|---|---|---|---|---|---|---|---|---|---|---|
|  |  |  | 63 | 64 | 65 | 66 | 67 | 68 | 69 | 70 | 17 | 18 |
|  |  | Silane Coupling Agent *17 | — | — | — | 6.5 | — | — | — | 6.5 | — | — |
|  |  | Aromatic Oil | 5.0 | 5.0 | 5.0 | 5.0 | 5.0 | 5.0 | 5.0 | 5.0 | 5.0 | 5.0 |
|  |  | Stearic Acid | 2.0 | 2.0 | 2.0 | 2.0 | — | — | — | — | 2.0 | — |
|  |  | Antiaging Agent 6PPD *5 | 1.0 | 1.0 | 1.0 | 1.0 | — | — | — | — | 1.0 | — |
| Second Stage of Kneading | | N-cyclohexyl-2-benzo-thiazolylsulfenamide *18 | 1.0 | 1.0 | 1.0 | 1.0 | 1.0 | 1.0 | 1.0 | 1.0 | — | — |
| Final Stage of Kneading | | Stearic Acid | — | — | — | — | 2.0 | 2.0 | 2.0 | 2.0 | — | 2.0 |
|  | | Antiaging Agent 6PPD *5 | — | — | — | — | 1.0 | 1.0 | 1.0 | 1.0 | — | 1.0 |
|  | | Zinc Flower | 3.0 | 3.0 | 3.0 | 3.0 | 3.0 | 3.0 | 3.0 | 3.0 | 3.0 | 3.0 |
|  | | 1,3-Diphenylguanidine *6 | 1.0 | 1.0 | 1.0 | 1.0 | 1.0 | 1.0 | 1.0 | 1.0 | 1.0 | 1.0 |
|  | | Vulcanization Promoter MBTS *8 | 0.8 | 0.8 | 0.8 | 0.8 | 0.8 | 0.8 | 0.8 | 0.8 | 0.8 | 0.8 |
|  | | Vulcanization Promoter CBS *18 | 1.5 | 1.5 | 1.5 | 1.5 | 1.5 | 1.5 | 1.5 | 1.5 | 1.5 | 1.5 |
|  | | Sulfur | 1.5 | 1.5 | 1.5 | 1.5 | 1.5 | 1.5 | 1.5 | 1.5 | 1.5 | 1.5 |
| Highest Temperature of Rubber Composition in First Stage of Kneading (° C.) | | | 150 | 150 | 150 | 150 | 150 | 150 | 150 | 150 | 150 | 150 |
| Highest Temperature of Rubber Composition in Second Stage of Kneading (° C.) | | | 130 | 130 | 130 | 130 | 130 | 130 | 130 | 130 | — | — |
| Number of Total Stages of Kneading | | | 3 | 3 | 3 | 3 | 3 | 3 | 3 | 3 | 2 | 2 |
| Vulcanizate Physical Property | Low-Heat-Generation Property (tanδ index) | | 120 | 118 | 117 | 126 | 122 | 119 | 119 | 127 | 100 | 100 |

[Notes]
*1 to *18 are all the same as in Table 1 to Table 5.

TABLE 12

|  |  | Part by mass | Example | | Comparative Example | | |
|---|---|---|---|---|---|---|---|
|  |  |  | 63 | 71 | 17 | 26 | 27 |
| Formulation | First Stage of Kneading | Emulsion-Polymerized SBR-C *13 | 68.75 | 68.75 | 68.75 | 68.75 | 68.75 |
|  |  | Solution-Polymerized SBR-D *14 | 68.75 | 68.75 | 68.75 | 68.75 | 68.75 |
|  |  | Carbon Black N220 *2 | 10 | 10 | 10 | 10 | 10 |
|  |  | Silica *3 | 80 | 80 | 80 | 80 | 80 |
|  |  | Silane Coupling Agent Si75 *4 | 6.5 | 6.5 | 6.5 | 6.5 | 6.5 |
|  |  | Aromatic Oil | 5.0 | 5.0 | 5.0 | 5.0 | 5.0 |
|  |  | Stearic Acid | 2.0 | 2.0 | 2.0 | 2.0 | 2.0 |
|  |  | Antiaging Agent 6PPD *5 | 1.0 | 1.0 | 1.0 | 1.0 | 1.0 |
|  |  | N-cyclohexyl-2-benzothiazolylsulfenamide *18 | — | — | — | 1.0 | — |
|  |  | N-tert-butyl-2-benzothiazolylsulfenamide *9 | — | — | — | — | 1.0 |
|  | Second Stage of Kneading | N-cyclohexyl-2-benzothiazolylsulfenamide *18 | 1.0 | — | — | — | — |
|  |  | N-tert-butyl-2-benzothiazolylsulfenamide *9 | — | 1.0 | — | — | — |
|  | Final Stage of Kneading | Zinc Flower | 3.0 | 3.0 | 3.0 | 3.0 | 3.0 |
|  |  | 1,3-Diphenylguanidine *6 | 1.0 | 1.0 | 1.0 | 1.0 | 1.0 |
|  |  | Vulcanization Promoter MBTS *8 | 0.8 | 0.8 | 0.8 | 0.8 | 0.8 |
|  |  | Vulcanization Promoter CBS *18 | 1.5 | 1.5 | 1.5 | 1.5 | 1.5 |
|  |  | Sulfur | 1.5 | 1.5 | 1.5 | 1.5 | 1.5 |
| Highest Temperature of Rubber Composition in First Stage of Kneading (° C.) | | | 150 | 150 | 150 | 150 | 150 |
| Highest Temperature of Rubber Composition in Second Stage of Kneading (° C.) | | | 130 | 130 | — | — | — |
| Number of Total Stages of Kneading | | | 3 | 3 | 2 | 2 | 2 |
| Vulcanizate Physical Property | Low-Heat-Generation Property (tanδ index) | | 120 | 119 | 100 | 103 | 104 |

[Notes]
*1 to *18 are all the same as in Table 1 to Table 5.

TABLE 13

|  |  | Part by mass | Example | | | | | | Comparative Example | | |
|---|---|---|---|---|---|---|---|---|---|---|---|
|  |  |  | 72 | 73 | 74 | 75 | 76 | 77 | 1 | 28 | 6 |
| Formulation | First Stage of Kneading | Emulsion-Polymerized SBR-A *1 | 100 | 100 | 100 | 100 | 100 | 100 | 100 | 100 | 100 |
|  |  | Carbon Black N220 *2 | 10 | 10 | 10 | — | 10 | 10 | 10 | 10 | — |
|  |  | Silica *3 | 50 | 50 | 50 | 60 | 50 | 50 | 50 | 50 | 60 |
|  |  | Silane Coupling Agent Si75 *4 | 4.0 | 4.0 | 4.0 | 4.8 | 4.0 | 4.0 | 4.0 | 4.0 | 4.8 |
|  |  | Aromatic Oil | 30 | 30 | 30 | 30 | 30 | 30 | 30 | 30 | 30 |

TABLE 13-continued

| | Part by mass | | Example 72 | Example 73 | Example 74 | Example 75 | Example 76 | Example 77 | Comparative Example 1 | Comparative Example 28 | Comparative Example 6 |
|---|---|---|---|---|---|---|---|---|---|---|---|
| | | Stearic Acid | 2.0 | 2.0 | 2.0 | 2.0 | 2.0 | 2.0 | 2.0 | 2.0 | 2.0 |
| | | Antiaging Agent 6PPD *5 | 1.0 | 1.0 | 1.0 | 1.0 | 1.0 | 1.0 | 1.0 | 1.0 | 1.0 |
| | | 2-Mercaptobenzothiazole *21 | — | — | — | — | — | — | — | 0.6 | — |
| | Second Stage of Kneading | 2-Mercaptobenzothiazole *21 | 0.6 | 0.3 | 1.1 | 0.6 | 0.1 | 2.0 | — | — | — |
| | Final Stage of Kneading | Stearic Acid | — | — | — | — | — | — | — | — | — |
| | | Antiaging Agent 6PPD *5 | — | — | — | — | — | — | — | — | — |
| | | Antiaging Agent TMDQ *7 | 1.0 | 1.0 | 1.0 | 1.0 | 1.0 | 1.0 | 1.0 | 1.0 | 1.0 |
| | | Zinc Flower | 2.5 | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 | 0.6 |
| | | Vulcanization Promoter MBTS *8 | 1.0 | 1.0 | 1.0 | 1.0 | 1.0 | 1.0 | 1.0 | 1.0 | 1.0 |
| | | Vulcanization Promoter TBBS *9 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 |
| Highest Temperature of Rubber Composition in First Stage of Kneading (° C.) | | | 150 | 150 | 150 | 150 | 150 | 150 | 150 | 150 | 150 |
| Highest Temperature of Rubber Composition in Second Stage of Kneading (° C.) | | | 130 | 130 | 130 | 130 | 130 | 130 | — | — | — |
| Number of Total Stages of Kneading | | | 3 | 3 | 3 | 3 | 3 | 3 | 2 | 2 | 2 |
| Vulcanizate Physical Property | Low-Heat-Generation Property (tanδ index) | | 130 | 128 | 130 | 135 | 124 | 128 | 100 | 104 | 102 |

[Notes]
*1 to *18 are all the same as in Table 1 to Table 5.
*21: Ouchi Shinko Chemical's trade name "Nocceler M-P"

TABLE 14

| | | Part by mass | Example 72 | Example 78 | Example 79 | Example 80 | Example 81 | Example 82 | Example 83 | Example 84 | Example 85 | Comparative Example 1 | Comparative Example 8 |
|---|---|---|---|---|---|---|---|---|---|---|---|---|---|
| Formulation | First Stage of Kneading | Emulsion-Polymerized SBR-A *1 | 100 | 100 | 100 | 100 | 100 | 100 | 100 | 100 | 100 | 100 | 100 |
| | | Carbon Black N220 *2 | 10 | 10 | 10 | 10 | 10 | 10 | 10 | 10 | 10 | 10 | 10 |
| | | Silica *3 | 50 | 50 | 50 | 50 | 50 | 50 | 50 | 50 | 50 | 50 | 50 |
| | | Silane Coupling Agent Si75 *4 | 4.0 | 4.0 | 4.0 | 4.0 | 4.0 | 4.0 | 4.0 | 4.0 | 4.0 | 4.0 | 4.0 |
| | | Aromatic Oil | 30 | 30 | 30 | 30 | 30 | 30 | 30 | 30 | 30 | 30 | 30 |
| | | Stearic Acid | 2.0 | 2.0 | 2.0 | 2.0 | 2.0 | 2.0 | — | — | — | 2.0 | 2.0 |
| | | Antiaging Agent 6PPD *5 | 1.0 | 1.0 | 1.0 | 1.0 | 1.0 | 1.0 | — | — | — | 1.0 | 1.0 |
| | | 2-Mercaptobenzothiazole *21 | — | — | — | — | — | — | — | — | — | — | — |
| | Second Stage of Kneading | 2-Mercaptobenzothiazole *21 | 0.6 | 0.6 | 0.6 | 0.6 | 0.6 | 0.6 | 0.6 | 0.6 | 0.6 | — | — |
| | Final Stage of Kneading | Stearic Acid | — | — | — | — | — | — | 2.0 | 2.0 | 2.0 | — | — |
| | | Antiaging Agent 6PPD *5 | — | — | — | — | — | — | 1.0 | 1.0 | 1.0 | — | — |
| | | Antiaging Agent TMDQ *7 | 1.0 | 1.0 | 1.0 | 1.0 | 1.0 | 1.0 | 1.0 | 1.0 | 1.0 | 1.0 | 1.0 |
| | | Zinc Flower | 2.5 | 2.5 | 2.5 | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 | 0.6 | 0.6 | 0.6 |
| | | Vulcanization Promoter MBTS *8 | 1.0 | 1.0 | 1.0 | 1.0 | 1.0 | 1.0 | 1.0 | 1.0 | 1.0 | 1.0 | 1.0 |
| | | Vulcanization Promoter TBBS *9 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 |
| Highest Temperature of Rubber Composition in First Stage of Kneading (° C.) | | | 150 | 160 | 170 | 160 | 170 | 170 | 160 | 170 | 170 | 150 | 170 |
| Highest Temperature of Rubber Composition in Second Stage of Kneading (° C.) | | | 130 | 130 | 130 | 150 | 150 | 170 | 130 | 130 | 150 | — | — |
| Number of Total Stages of Kneading | | | 3 | 3 | 3 | 3 | 3 | 3 | 3 | 3 | 3 | 2 | 2 |
| Vulcanizate Physical Property | Low-Heat-Generation Property (tanδ index) | | 130 | 131 | 134 | 131 | 134 | 135 | 132 | 136 | 137 | 100 | 107 |

[Notes]
*1 to *18 are all the same as in Table 1 to Table 5, and *21 is the same as in Table 10.

TABLE 15

| | | Part by mass | Example 72 | Example 86 | Example 87 | Example 88 | Example 89 | Example 90 | Comparative Example 1 | Comparative Example 9 |
|---|---|---|---|---|---|---|---|---|---|---|
| Formulation | First Stage of Kneading | Emulsion-Polymerized SBR-A *1 | 100 | 100 | 100 | 100 | — | — | 100 | — |
| | | Solution-Polymerized SBR-B *10 | — | — | — | — | 100 | 100 | — | 100 |
| | | Carbon Black N220 *2 | 10 | 10 | 10 | 10 | 10 | 10 | 10 | 10 |
| | | Silica *3 | 50 | 50 | 50 | 50 | 50 | 50 | 50 | 50 |

TABLE 15-continued

|  |  |  | Example |  |  |  |  |  | Comparative Example |  |
|---|---|---|---|---|---|---|---|---|---|---|
|  |  | Part by mass | 72 | 86 | 87 | 88 | 89 | 90 | 1 | 9 |
|  |  | Silane Coupling Agent Si75 *4 | 4.0 | 4.0 | 4.0 | 4.0 | 4.0 | 4.0 | 4.0 | 4.0 |
|  |  | Aromatic Oil | 30 | 30 | 30 | 30 | 30 | 30 | 30 | 30 |
|  |  | Stearic Acid | 2.0 | 2.0 | 2.0 | 2.0 | 2.0 | 2.0 | 2.0 | 2.0 |
|  |  | Antiaging Agent 6PPD *5 | 1.0 | 1.0 | 1.0 | 1.0 | 1.0 | 1.0 | 1.0 | 1.0 |
|  | Second Stage of Kneading | 2-Mercaptobenzothiazole *21 | 0.6 | 0.6 | 0.6 | 0.6 | 0.6 | 0.6 | — | — |
|  | Final Stage of Kneading | Antiaging Agent TMDQ *7 | 1.0 | 1.0 | 1.0 | 1.0 | 1.0 | 1.0 | 1.0 | 1.0 |
|  |  | Zinc Flower | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 0.6 | 0.6 | 0.6 |
|  |  | Vulcanization Promoter MBTS *8 | 1.0 | 1.0 | 1.0 | 1.0 | 1.0 | 1.0 | 1.0 | 1.0 |
|  |  | Vulcanization Promoter TBBS *9 | 0.6 | 0.6 | 0.6 | 0.6 | 0.6 | 0.6 | 0.6 | 0.6 |
|  |  | Sulfur | 1.5 | 1.5 | 1.5 | 1.5 | 1.5 | 1.5 | 1.5 | 1.5 |
| Highest Temperature of Rubber Composition in First Stage of Kneading (° C.) |  |  | 150 | 150 | 150 | 150 | 150 | 150 | 150 | 150 |
| Highest Temperature of Rubber Composition in Second Stage of Kneading (° C.) |  |  | 130 | 170 | 150 | 110 | 150 | 170 | — | — |
| Number of Total Stages of Kneading |  |  | 3 | 3 | 3 | 3 | 3 | 3 | 2 | 2 |
| Vulcanizate Physical Property | Low-Heat-Generation Property (tanδ index) |  | 130 | 133 | 132 | 120 | 133 | 133 | 100 | 102 |

[Notes]
*1 to *18 are all the same as in Table 1 to Table 5, and *21 is the same as in Table 10.

TABLE 16

|  |  |  | Example |  |  |  |  |  |  | Comparative Example |  |
|---|---|---|---|---|---|---|---|---|---|---|---|
|  |  | part by mass | 91 | 92 | 93 | 94 | 95 | 96 | 97 | 10 | 16 |
| Formulation | First Stage of Kneading | Emulsion-Polymerized SBR-A *1 | 75 | 50 | 25 | 80 | — | 80 | — | 75 | — |
|  |  | Solution-Polymerized SBR-B *10 | 25 | 50 | 75 | — | 80 | — | 80 | 25 | 80 |
|  |  | Natural Rubber *11 | — | — | — | 20 | 20 | — | — | — | — |
|  |  | Unmodified BR *12 | — | — | — | — | — | 20 | 20 | — | 20 |
|  |  | Carbon Black N220 *2 | 10 | 10 | 10 | 10 | 10 | 10 | 10 | 10 | 10 |
|  |  | Silica *3 | 50 | 50 | 50 | 50 | 50 | 50 | 50 | 50 | 50 |
|  |  | Silane Coupling Agent Si75 *4 | 4.0 | 4.0 | 4.0 | 4.0 | 4.0 | 4.0 | 4.0 | 4.0 | 4.0 |
|  |  | Aromatic Oil | 30 | 30 | 30 | 30 | 30 | 30 | 30 | 30 | 30 |
|  |  | Stearic Acid | 2.0 | 2.0 | 2.0 | 2.0 | 2.0 | 2.0 | 2.0 | 2.0 | 2.0 |
|  |  | Antiaging Agent 6PPD *5 | 1.0 | 1.0 | 1.0 | 1.0 | 1.0 | 1.0 | 1.0 | 1.0 | 1.0 |
|  | Second Stage of Kneading | 2-Mercaptobenzothiazole *21 | 0.6 | 0.6 | 0.6 | 0.6 | 0.6 | 0.6 | 0.6 | — | — |
|  | Final Stage of Kneading | Antiaging Agent TMDQ *7 | 1.0 | 1.0 | 1.0 | 1.0 | 1.0 | 1.0 | 1.0 | 1.0 | 1.0 |
|  |  | Zinc Flower | 2.5 | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 0.6 | 0.6 | 0.6 | 0.6 |
|  |  | Vulcanization Promoter MBTS *8 | 1.0 | 1.0 | 1.0 | 1.0 | 1.0 | 1.0 | 1.0 | 1.0 | 1.0 |
|  |  | Vulcanization Promoter TBBS *9 | 0.6 | 0.6 | 0.6 | 0.6 | 0.6 | 0.6 | 0.6 | 0.6 | 0.6 |
|  |  | Sulfur | 1.5 | 1.5 | 1.5 | 1.5 | 1.5 | 1.5 | 1.5 | 1.5 | 1.5 |
| Highest Temperature of Rubber Composition in First Stage of Kneading (° C.) |  |  | 150 | 150 | 150 | 150 | 150 | 150 | 150 | 150 | 150 |
| Highest Temperature of Rubber Composition in Second Stage of Kneading (° C.) |  |  | 130 | 130 | 130 | 130 | 130 | 130 | 130 | — | — |
| Number of Total Stages of Kneading |  |  | 3 | 3 | 3 | 3 | 3 | 3 | 3 | 2 | 2 |
| Vulcanizate Physical Property | Low-Heat-Generation Property (tanδ index) |  | 128 | 127 | 127 | 134 | 137 | 140 | 141 | 100 | 114 |

[Notes]
*1 to *18 are all the same as in Table 1 to Table 5, and *21 is the same as in Table 10.

TABLE 17

|  |  |  | Example |  |  |  |  |  |  |  | Comparative Example |  |
|---|---|---|---|---|---|---|---|---|---|---|---|---|
|  |  | Part by mass | 98 | 99 | 100 | 101 | 102 | 103 | 104 | 105 | 17 | 18 |
| Formulation | First Stage of Kneading | Emulsion-Polymerized SBR-C *13 | 68.75 | 68.75 | 68.75 | 68.75 | 68.75 | 68.75 | 68.75 | 68.75 | 68.75 | 68.75 |
|  |  | Solution-Polymerized SBR-D *14 | 68.75 | 68.75 | 68.75 | 68.75 | 68.75 | 68.75 | 68.75 | 68.75 | 68.75 | 68.75 |
|  |  | Carbon Black N220 *2 | 10 | 10 | 10 | 10 | 10 | 10 | 10 | 10 | 10 | 10 |
|  |  | Silica *3 | 80 | 80 | 80 | 80 | 80 | 80 | 80 | 80 | 80 | 80 |
|  |  | Silane Coupling Agent Si75 *4 | 6.5 | — | — | — | 6.5 | — | — | — | 6.5 | 6.5 |

TABLE 17-continued

|  |  | Example |  |  |  |  |  |  |  | Comparative Example |  |
|---|---|---|---|---|---|---|---|---|---|---|---|
| Part by mass |  | 98 | 99 | 100 | 101 | 102 | 103 | 104 | 105 | 17 | 18 |
|  | Silane Coupling Agent NXT *15 | — | 6.5 | — | — | — | 6.5 | — | — | — | — |
|  | Silane Coupling Agent NXT-Z *16 | — | — | 6.5 | — | — | — | 6.5 | — | — | — |
|  | Silane Coupling Agent *17 | — | — | — | 6.5 | — | — | — | 6.5 | — | — |
|  | Aromatic Oil | 5.0 | 5.0 | 5.0 | 5.0 | 5.0 | 5.0 | 5.0 | 5.0 | 5.0 | 5.0 |
|  | Stearic Acid | 2.0 | 2.0 | 2.0 | 2.0 | — | — | — | — | 2.0 | — |
|  | Antiaging Agent 6PPD *5 | 1.0 | 1.0 | 1.0 | 1.0 | — | — | — | — | 1.0 | — |
| Second Stage of Kneading | 2-Mercaptobenzothiazole *21 | 0.6 | 0.6 | 0.6 | 0.6 | 0.6 | 0.6 | 0.6 | 0.6 | — | — |
| Final Stage of Kneading | Stearic Acid | — | — | — | — | 2.0 | 2.0 | 2.0 | 2.0 | — | 2.0 |
|  | Antiaging Agent 6PPD *5 | — | — | — | — | 1.0 | 1.0 | 1.0 | 1.0 | — | 1.0 |
|  | Zinc Flower | 3.0 | 3.0 | 3.0 | 3.0 | 3.0 | 3.0 | 3.0 | 3.0 | 3.0 | 3.0 |
|  | 1,3-Diphenylguanidine *6 | 1.0 | 1.0 | 1.0 | 1.0 | 1.0 | 1.0 | 1.0 | 1.0 | 1.0 | 1.0 |
|  | Vulcanization Promoter MBTS *8 | 0.8 | 0.8 | 0.8 | 0.8 | 0.8 | 0.8 | 0.8 | 0.8 | 0.8 | 0.8 |
|  | Vulcanization Promoter CBS *18 | 1.5 | 1.5 | 1.5 | 1.5 | 1.5 | 1.5 | 1.5 | 1.5 | 1.5 | 1.5 |
|  | Sulfur | 1.5 | 1.5 | 1.5 | 1.5 | 1.5 | 1.5 | 1.5 | 1.5 | 1.5 | 1.5 |
| Highest Temperature of Rubber Composition in First Stage of Kneading (° C.) |  | 150 | 150 | 150 | 150 | 150 | 150 | 150 | 150 | 150 | 150 |
| Highest Temperature of Rubber Composition in Second Stage of Kneading (° C.) |  | 130 | 130 | 130 | 130 | 130 | 130 | 130 | 130 | — | — |
| Number of Total Stages of Kneading |  | 3 | 3 | 3 | 3 | 3 | 3 | 3 | 3 | 2 | 2 |
| Vulcanizate Physical Property | Low-Heat-Generation Property (tanδ index) | 127 | 124 | 121 | 135 | 126 | 124 | 122 | 136 | 100 | 100 |

[Notes]
*1 to *18 are all the same as in Table 1 to Table 5, and *21 is the same as in Table 10.

TABLE 18

|  |  |  | Example |  | Comparative Example |  |  |
|---|---|---|---|---|---|---|---|
| Part by mass |  |  | 98 | 106 | 17 | 29 | 30 |
| Formulation | First Stage of Kneading | Emulsion-Polymerized SBR-C *13 | 68.75 | 68.75 | 68.75 | 68.75 | 68.75 |
|  |  | Solution-Polymerized SBR-D *14 | 68.75 | 68.75 | 68.75 | 68.75 | 68.75 |
|  |  | Carbon Black N220 *2 | 10 | 10 | 10 | 10 | 10 |
|  |  | Silica *3 | 80 | 80 | 80 | 80 | 80 |
|  |  | Silane Coupling Agent Si75 *4 | 6.5 | 6.5 | 6.5 | 6.5 | 6.5 |
|  |  | Aromatic Oil | 5.0 | 5.0 | 5.0 | 5.0 | 5.0 |
|  |  | Stearic Acid | 2.0 | 2.0 | 2.0 | 2.0 | 2.0 |
|  |  | Antiaging Agent 6PPD *5 | 1.0 | 1.0 | 1.0 | 1.0 | 1.0 |
|  |  | 2-Mercaptobenzothiazole *21 | — | — | — | 0.6 | — |
|  |  | Di-2-benzothiazolyl disulfide *8 | — | — | — | — | 1.0 |
| | Second Stage of Kneading | 2-Mercaptobenzothiazole *21 | 0.6 | — | — | — | — |
|  |  | Di-2-benzothiazolyl disulfide *8 | — | 1.0 | — | — | — |
|  | Final Stage of Kneading | Zinc Flower | 3.0 | 3.0 | 3.0 | 3.0 | 3.0 |
|  |  | 1,3-Diphenylguanidine *6 | 1.0 | 1.0 | 1.0 | 1.0 | 1.0 |
|  |  | Vulcanization Promoter MBTS *8 | 0.8 | 0.8 | 0.8 | 0.8 | 0.8 |
|  |  | Vulcanization Promoter CBS *18 | 1.5 | 1.5 | 1.5 | 1.5 | 1.5 |
|  |  | Sulfur | 1.5 | 1.5 | 1.5 | 1.5 | 1.5 |
| Highest Temperature of Rubber Composition in First Stage of Kneading (° C.) |  |  | 150 | 150 | 150 | 150 | 150 |
| Highest Temperature of Rubber Composition in Second Stage of Kneading (° C.) |  |  | 130 | 130 | — | — | — |
| Number of Total Stages of Kneading |  |  | 3 | 3 | 2 | 2 | 2 |
| Vulcanizate Physical Property | Low-Heat-Generation Property (tanδ index) |  | 127 | 126 | 100 | 105 | 103 |

[Notes]
*1 to *18 are all the same as in Table 1 to Table 5, and *21 is the same as in Table 10.

TABLE 19

| | Part by mass | Example 107 | 108 | 109 | 110 | 111 | 112 | Comparative Example 1 | 31 | 6 |
|---|---|---|---|---|---|---|---|---|---|---|
| Formulation First Stage of Kneading | Emulsion-Polymerized SBR-A *1 | 100 | 100 | 100 | 100 | 100 | 100 | 100 | 100 | 100 |
| | Carbon Black N220 *2 | 10 | 10 | 10 | — | 10 | 10 | 10 | 10 | — |
| | Silica *3 | 50 | 50 | 50 | 60 | 50 | 50 | 50 | 50 | 60 |
| | Silane Coupling Agent Si75 *4 | 4.0 | 4.0 | 4.0 | 4.8 | 4.0 | 4.0 | 4.0 | 4.0 | 4.8 |
| | Aromatic Oil | 30 | 30 | 30 | 30 | 30 | 30 | 30 | 30 | 30 |
| | Stearic Acid | 2.0 | 2.0 | 2.0 | 2.0 | 2.0 | 2.0 | 2.0 | 2.0 | 2.0 |
| | Antiaging Agent 6PPD *5 | 1.0 | 1.0 | 1.0 | 1.0 | 1.0 | 1.0 | 1.0 | 1.0 | 1.0 |
| | Tetrakis(2-ethylhexyl)thiuram Disulfide *22 | — | — | — | — | — | — | — | 1.0 | — |
| Second Stage of Kneading | Tetrakis(2-ethylhexyl)thiuram Disulfide *22 | 1.0 | 0.5 | 2.0 | 1.0 | 0.1 | 3.0 | — | — | — |
| Final Stage of Kneading | Stearic Acid | — | — | — | — | — | — | — | — | — |
| | Antiaging Agent 6PPD *5 | — | — | — | — | — | — | — | — | — |
| | Antiaging Agent TMDQ *7 | 1.0 | 1.0 | 1.0 | 1.0 | 1.0 | 1.0 | 1.0 | 1.0 | 1.0 |
| | Zinc Flower | 2.5 | 2.5 | 2.5 | 2.5 | 2.5 | 2.5 | 2.5 | 2.5 | 2.5 |
| | 1,3-Diphenylguanidine *6 | 0.6 | 0.6 | 0.6 | 0.6 | 0.6 | 0.6 | 0.6 | 0.6 | 0.6 |
| | Vulcanization Promoter MBTS *8 | 1.0 | 1.0 | 1.0 | 1.0 | 1.0 | 1.0 | 1.0 | 1.0 | 1.0 |
| | Vulcanization Promoter TBBS *9 | 0.6 | 0.6 | 0.6 | 0.6 | 0.6 | 0.6 | 0.6 | 0.6 | 0.6 |
| | Sulfur | 1.5 | 1.5 | 1.5 | 1.5 | 1.5 | 1.5 | 1.5 | 1.5 | 1.5 |
| Highest Temperature of Rubber Composition in First Stage of Kneading (° C.) | | 150 | 150 | 150 | 150 | 150 | 150 | 150 | 150 | 150 |
| Highest Temperature of Rubber Composition in Second Stage of Kneading (° C.) | | 130 | 130 | 130 | 130 | 130 | 130 | — | — | — |
| Number of Total Stages of Kneading | | 3 | 3 | 3 | 3 | 3 | 3 | 2 | 2 | 2 |
| Vulcanizate Physical Property | Low-Heat-Generation Property (tanδ index) | 129 | 127 | 129 | 133 | 124 | 129 | 100 | 104 | 102 |

[Notes]
*1 to *18 are all the same as in Table 1 to Table 5.
*22: Ouchi Shinko Chemical's trade name "Nocceler TOT-N"

TABLE 20

| | part by mass | Example 107 | 113 | 114 | 115 | 116 | 117 | 118 | 119 | 120 | Comparative Example 1 | 8 |
|---|---|---|---|---|---|---|---|---|---|---|---|---|
| Formulation First Stage of Kneading | Emulsion-Polymerized SBR-A *1 | 100 | 100 | 100 | 100 | 100 | 100 | 100 | 100 | 100 | 100 | 100 |
| | Carbon Black N220 *2 | 10 | 10 | 10 | 10 | 10 | 10 | 10 | 10 | 10 | 10 | 10 |
| | Silica *3 | 50 | 50 | 50 | 50 | 50 | 50 | 50 | 50 | 50 | 50 | 50 |
| | Silane Coupling Agent Si75 *4 | 4.0 | 4.0 | 4.0 | 4.0 | 4.0 | 4.0 | 4.0 | 4.0 | 4.0 | 4.0 | 4.0 |
| | Aromatic Oil | 30 | 30 | 30 | 30 | 30 | 30 | 30 | 30 | 30 | 30 | 30 |
| | Stearic Acid | 2.0 | 2.0 | 2.0 | 2.0 | 2.0 | 2.0 | — | — | — | 2.0 | 2.0 |
| | Antiaging Agent 6PPD *5 | 1.0 | 1.0 | 1.0 | 1.0 | 1.0 | 1.0 | — | — | — | 1.0 | 1.0 |
| | Tetrakis(2-ethylhexyl)thiuram Disulfide *22 | — | — | — | — | — | — | — | — | — | — | — |
| Second Stage of Kneading | Tetrakis(2-ethylhexyl)thiuram Disulfide *22 | 1.0 | 1.0 | 1.0 | 1.0 | 1.0 | 1.0 | 1.0 | 1.0 | 1.0 | — | — |
| Final Stage of Kneading | Stearic Acid | — | — | — | — | — | — | 2.0 | 2.0 | 2.0 | — | — |
| | Antiaging Agent 6PPD *5 | — | — | — | — | — | — | 1.0 | 1.0 | 1.0 | — | — |
| | Antiaging Agent TMDQ *7 | 1.0 | 1.0 | 1.0 | 1.0 | 1.0 | 1.0 | 1.0 | 1.0 | 1.0 | 1.0 | 1.0 |
| | Zinc Flower | 2.5 | 2.5 | 2.5 | 2.5 | 2.5 | 2.5 | 2.5 | 2.5 | 2.5 | 2.5 | 2.5 |
| | 1,3-Diphenylguanidine *6 | 0.6 | 0.6 | 0.6 | 0.6 | 0.6 | 0.6 | 0.6 | 0.6 | 0.6 | 0.6 | 0.6 |
| | Vulcanization Promoter MBTS *8 | 1.0 | 1.0 | 1.0 | 1.0 | 1.0 | 1.0 | 1.0 | 1.0 | 1.0 | 1.0 | 1.0 |
| | Vulcanization Promoter TBBS *9 | 0.6 | 0.6 | 0.6 | 0.6 | 0.6 | 0.6 | 0.6 | 0.6 | 0.6 | 0.6 | 0.6 |
| | Sulfur | 1.5 | 1.5 | 1.5 | 1.5 | 1.5 | 1.5 | 1.5 | 1.5 | 1.5 | 1.5 | 1.5 |
| Highest Temperature of Rubber Composition in First Stage of Kneading (° C.) | | 150 | 160 | 170 | 160 | 170 | 170 | 160 | 170 | 170 | 150 | 170 |
| Highest Temperature of Rubber Composition in Second Stage of Kneading (° C.) | | 130 | 130 | 130 | 150 | 150 | 170 | 130 | 130 | 150 | — | — |
| Number of Total Stages of Kneading | | 3 | 3 | 3 | 3 | 3 | 3 | 3 | 3 | 3 | 2 | 2 |
| Vulcanizate Physical Property | Low-Heat-Generation Property (tanδ index) | 129 | 131 | 132 | 131 | 132 | 133 | 132 | 134 | 134 | 100 | 107 |

[Notes]
*1 to *18 are all the same as in Table 1 to Table 5, and *22 is the same as in Table 19.

TABLE 21

| | | Part by mass | Example 107 | Example 121 | Example 122 | Example 123 | Example 124 | Example 125 | Comparative Example 1 | Comparative Example 9 |
|---|---|---|---|---|---|---|---|---|---|---|
| Formulation | First Stage of Kneading | Emulsion-Polymerized SBR-A *1 | 100 | 100 | 100 | 100 | — | — | 100 | — |
| | | Solution-Polymerized SBR-B *10 | — | — | — | — | 100 | 100 | — | 100 |
| | | Carbon Black N220 *2 | 10 | 10 | 10 | 10 | 10 | 10 | 10 | 10 |
| | | Silica *3 | 50 | 50 | 50 | 50 | 50 | 50 | 50 | 50 |
| | | Silane Coupling Agent Si75 *4 | 4.0 | 4.0 | 4.0 | 4.0 | 4.0 | 4.0 | 4.0 | 4.0 |
| | | Aromatic Oil | 30 | 30 | 30 | 30 | 30 | 30 | 30 | 30 |
| | | Stearic Acid | 2.0 | 2.0 | 2.0 | 2.0 | 2.0 | 2.0 | 2.0 | 2.0 |
| | | Antiaging Agent 6PPD *5 | 1.0 | 1.0 | 1.0 | 1.0 | 1.0 | 1.0 | 1.0 | 1.0 |
| | Second Stage of Kneading | Tetrakis(2-ethylhexyl)thiuram Disulfide *22 | 1.0 | 1.0 | 1.0 | 1.0 | 1.0 | 1.0 | — | — |
| | Final Stage of Kneading | Antiaging Agent TMDQ *7 | 1.0 | 1.0 | 1.0 | 1.0 | 1.0 | 1.0 | 1.0 | 1.0 |
| | | Zinc Flower | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 |
| | | Vulcanization Promoter MBTS *8 | 1.0 | 1.0 | 1.0 | 1.0 | 1.0 | 1.0 | 1.0 | 1.0 |
| | | Vulcanization Promoter TBBS *9 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 |
| Highest Temperature of Rubber Composition in First Stage of Kneading (° C.) | | | 150 | 150 | 150 | 150 | 150 | 150 | 150 | 150 |
| Highest Temperature of Rubber Composition in Second Stage of Kneading (° C.) | | | 130 | 170 | 150 | 110 | 150 | 170 | — | — |
| Number of Total Stages of Kneading | | | 3 | 3 | 3 | 3 | 3 | 3 | 2 | 2 |
| Vulcanizate Physical Property | Low-Heat-Generation Property (tanδ index) | | 129 | 132 | 131 | 118 | 132 | 132 | 100 | 102 |

[Notes]
*1 to *18 are all the same as in Table 1 to Table 5, and *22 is the same as in Table 19.

TABLE 22

| | | Part by mass | Example 126 | Example 127 | Example 128 | Example 129 | Example 130 | Example 131 | Example 132 | Comparative Example 10 | Comparative Example 16 |
|---|---|---|---|---|---|---|---|---|---|---|---|
| Formulation | First Stage of Kneading | Emulsion-Polymerized SBR-A *1 | 75 | 50 | 25 | 80 | — | 80 | — | 75 | — |
| | | Solution-Polymerized SBR-B *10 | 25 | 50 | 75 | — | 80 | — | 80 | 25 | 80 |
| | | Natural Rubber *11 | — | — | — | 20 | 20 | — | — | — | — |
| | | Unmodified BR *12 | — | — | — | — | — | 20 | 20 | — | 20 |
| | | Carbon Black N220 *2 | 10 | 10 | 10 | 10 | 10 | 10 | 10 | 10 | 10 |
| | | Silica *3 | 50 | 50 | 50 | 50 | 50 | 50 | 50 | 50 | 50 |
| | | Silane Coupling Agent Si75 *4 | 4.0 | 4.0 | 4.0 | 4.0 | 4.0 | 4.0 | 4.0 | 4.0 | 4.0 |
| | | Aromatic Oil | 30 | 30 | 30 | 30 | 30 | 30 | 30 | 30 | 30 |
| | | Stearic Acid | 2.0 | 2.0 | 2.0 | 2.0 | 2.0 | 2.0 | 2.0 | 2.0 | 2.0 |
| | | Antiaging Agent 6PPD *5 | 1.0 | 1.0 | 1.0 | 1.0 | 1.0 | 1.0 | 1.0 | 1.0 | 1.0 |
| | Second Stage of Kneading | Tetrakis(2-ethylhexyl)thiuram Disulfide *22 | 1.0 | 1.0 | 1.0 | 1.0 | 1.0 | 1.0 | 1.0 | — | — |
| | Final Stage of Kneading | Antiaging Agent TMDQ *7 | 1.0 | 1.0 | 1.0 | 1.0 | 1.0 | 1.0 | 1.0 | 1.0 | 1.0 |
| | | Zinc Flower | 2.5 | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 | 0.6 |
| | | Vulcanization Promoter MBTS *8 | 1.0 | 1.0 | 1.0 | 1.0 | 1.0 | 1.0 | 1.0 | 1.0 | 1.0 |
| | | Vulcanization Promoter TBBS *9 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 |
| Highest Temperature of Rubber Composition in First Stage of Kneading (° C.) | | | 150 | 150 | 150 | 150 | 150 | 150 | 150 | 150 | 150 |
| Highest Temperature of Rubber Composition in Second Stage of Kneading (° C.) | | | 130 | 130 | 130 | 130 | 130 | 130 | 130 | — | — |
| Number of Total Stages of Kneading | | | 3 | 3 | 3 | 3 | 3 | 3 | 3 | 2 | 2 |
| Vulcanizate Physical Property | Low-Heat-Generation Property (tanδ index) | | 129 | 128 | 128 | 136 | 140 | 142 | 144 | 100 | 114 |

[Notes]
*1 to *18 are all the same as in Table 1 to Table 5, and *22 is the same as in Table 19.

TABLE 23

| | | Part by mass | Example 133 | 134 | 135 | 136 | 137 | 138 | 139 | 140 | Comparative Example 17 | 18 |
|---|---|---|---|---|---|---|---|---|---|---|---|---|
| Formulation | First Stage of Kneading | Emulsion-Polymerized SBR-C *13 | 68.75 | 68.75 | 68.75 | 68.75 | 68.75 | 68.75 | 68.75 | 68.75 | 68.75 | 68.75 |
| | | Solution-Polymerized SBR-D *14 | 68.75 | 68.75 | 68.75 | 68.75 | 68.75 | 68.75 | 68.75 | 68.75 | 68.75 | 68.75 |
| | | Carbon Black N220 *2 | 10 | 10 | 10 | 10 | 10 | 10 | 10 | 10 | 10 | 10 |
| | | Silica *3 | 80 | 80 | 80 | 80 | 80 | 80 | 80 | 80 | 80 | 80 |
| | | Silane Coupling Agent Si75 *4 | 6.5 | — | — | — | 6.5 | — | — | — | 6.5 | 6.5 |
| | | Silane Coupling Agent NXT *15 | — | 6.5 | — | — | — | 6.5 | — | — | — | — |
| | | Silane Coupling Agent NXT-Z *16 | — | — | 6.5 | — | — | — | 6.5 | — | — | — |
| | | Silane Coupling Agent *17 | — | — | — | 6.5 | — | — | — | 6.5 | — | — |
| | | Aromatic Oil | 5.0 | 5.0 | 5.0 | 5.0 | 5.0 | 5.0 | 5.0 | 5.0 | 5.0 | 5.0 |
| | | Stearic Acid | 2.0 | 2.0 | 2.0 | 2.0 | — | — | — | — | 2.0 | — |
| | | Antiaging Agent 6PPD *5 | 1.0 | 1.0 | 1.0 | 1.0 | — | — | — | — | 1.0 | — |
| | Second Stage of Kneading | Tetrakis(2-ethylhexyl)thiuram Disulfide *22 | 1.0 | 1.0 | 1.0 | 1.0 | 1.0 | 1.0 | 1.0 | 1.0 | — | — |
| | Final Stage of Kneading | Stearic Acid | — | — | — | — | 2.0 | 2.0 | 2.0 | 2.0 | — | 2.0 |
| | | Antiaging Agent 6PPD *5 | — | — | — | — | 1.0 | 1.0 | 1.0 | 1.0 | — | 1.0 |
| | | Zinc Flower | 3.0 | 3.0 | 3.0 | 3.0 | 3.0 | 3.0 | 3.0 | 3.0 | 3.0 | 3.0 |
| | | 1,3-Diphenylguanidine *6 | 1.0 | 1.0 | 1.0 | 1.0 | 1.0 | 1.0 | 1.0 | 1.0 | 1.0 | 1.0 |
| | | Vulcanization Promoter MBTS *8 | 0.8 | 0.8 | 0.8 | 0.8 | 0.8 | 0.8 | 0.8 | 0.8 | 0.8 | 0.8 |
| | | Vulcanization Promoter CBS *18 | 1.5 | 1.5 | 1.5 | 1.5 | 1.5 | 1.5 | 1.5 | 1.5 | 1.5 | 1.5 |
| | | Sulfur | 1.5 | 1.5 | 1.5 | 1.5 | 1.5 | 1.5 | 1.5 | 1.5 | 1.5 | 1.5 |
| Highest Temperature of Rubber Composition in First Stage of Kneading (° C.) | | | 150 | 150 | 150 | 150 | 150 | 150 | 150 | 150 | 150 | 150 |
| Highest Temperature of Rubber Composition in Second Stage of Kneading (° C.) | | | 130 | 130 | 130 | 130 | 130 | 130 | 130 | 130 | — | — |
| Number of Total Stages of Kneading | | | 3 | 3 | 3 | 3 | 3 | 3 | 3 | 3 | 2 | 2 |
| Vulcanizate Physical Property | Low-Heat-Generation Property (tanδ index) | | 128 | 129 | 126 | 137 | 132 | 129 | 126 | 140 | 100 | 100 |

[Notes]
*1 to *18 are all the same as in Table 1 to Table 5, and *22 is the same as in Table 19.

TABLE 24

| | | Part by mass | Example 133 | 141 | Comparative Example 17 | 32 | 33 |
|---|---|---|---|---|---|---|---|
| Formulation | First Stage of Kneading | Emulsion-Polymerized SBR-C *13 | 68.75 | 68.75 | 68.75 | 68.75 | 68.75 |
| | | Solution-Polymerized SBR-D *14 | 68.75 | 68.75 | 68.75 | 68.75 | 68.75 |
| | | Carbon Black N220 *2 | 10 | 10 | 10 | 10 | 10 |
| | | Silica *3 | 80 | 80 | 80 | 80 | 80 |
| | | Silane Coupling Agent Si75 *4 | 6.5 | 6.5 | 6.5 | 6.5 | 6.5 |
| | | Aromatic Oil | 5.0 | 5.0 | 5.0 | 5.0 | 5.0 |
| | | Stearic Acid | 2.0 | 2.0 | 2.0 | 2.0 | 2.0 |
| | | Antiaging Agent 6PPD *5 | 1.0 | 1.0 | 1.0 | 1.0 | 1.0 |
| | | Tetrakis(2-ethylhexyl)thiuram Disulfide *22 | — | — | — | 1.0 | — |
| | | Tetrabenzylthiuram Disulfide *23 | — | — | — | — | 1.0 |
| | Second Stage of Kneading | Tetrakis(2-ethylhexyl)thiuram Disulfide *22 | 1.0 | — | — | — | — |
| | | Tetrabenzylthiuram Disulfide *23 | — | 1.0 | — | — | — |
| | Final Stage of Kneading | Zinc Flower | 3.0 | 3.0 | 3.0 | 3.0 | 3.0 |
| | | 1,3-Diphenylguanidine *6 | 1.0 | 1.0 | 1.0 | 1.0 | 1.0 |
| | | Vulcanization Promoter MBTS *8 | 0.8 | 0.8 | 0.8 | 0.8 | 0.8 |
| | | Vulcanization Promoter CBS *18 | 1.5 | 1.5 | 1.5 | 1.5 | 1.5 |
| | | Sulfur | 1.5 | 1.5 | 1.5 | 1.5 | 1.5 |
| Highest Temperature of Rubber Composition in First Stage of Kneading (° C.) | | | 150 | 150 | 150 | 150 | 150 |
| Highest Temperature of Rubber Composition in Second Stage of Kneading (° C.) | | | 130 | 130 | — | — | — |
| Number of Total Stages of Kneading | | | 3 | 3 | 2 | 2 | 2 |
| Vulcanizate Physical Property | Low-Heat-Generation Property (tanδ index) | | 128 | 132 | 100 | 105 | 103 |

[Notes]
*1 to *18 are all the same as in Table 1 to Table 5, and *22 is the same as in Table 19.
*23: Sanshin Chemical's trade name "Sanceler TBZTD"

TABLE 25

|  |  |  | Example | | | | | | Comparative Example | | |
|---|---|---|---|---|---|---|---|---|---|---|---|
|  |  | Part by mass | 142 | 143 | 144 | 145 | 146 | 147 | 1 | 34 | 6 |
| Formulation | First Stage of Kneading | Emulsion-Polymerized SBR-A *1 | 100 | 100 | 100 | 100 | 100 | 100 | 100 | 100 | 100 |
|  |  | Carbon Black N220 *2 | 10 | 10 | 10 | — | 10 | 10 | 10 | 10 | — |
|  |  | Silica *3 | 50 | 50 | 50 | 60 | 50 | 50 | 50 | 50 | 60 |
|  |  | Silane Coupling Agent Si75 *4 | 4.0 | 4.0 | 4.0 | 4.8 | 4.0 | 4.0 | 4.0 | 4.0 | 4.8 |
|  |  | Aromatic Oil | 30 | 30 | 30 | 30 | 30 | 30 | 30 | 30 | 30 |
|  |  | Stearic Acid | 2.0 | 2.0 | 2.0 | 2.0 | 2.0 | 2.0 | 2.0 | 2.0 | 2.0 |
|  |  | Antiaging Agent 6PPD *5 | 1.0 | 1.0 | 1.0 | 1.0 | 1.0 | 1.0 | 1.0 | 1.0 | 1.0 |
|  |  | N,N'-diethylthiourea *24 | — | — | — | — | — | — | — | 1.0 | — |
|  | Second Stage of Kneading | N,N'-diethylthiourea *24 | 1.0 | 0.5 | 2.0 | 1.0 | 0.1 | 3.0 | — | — | — |
|  | Final Stage of Kneading | Stearic Acid | — | — | — | — | — | — | — | — | — |
|  |  | Antiaging Agent 6PPD *5 | — | — | — | — | — | — | — | — | — |
|  |  | Antiaging Agent TMDQ *7 | 1.0 | 1.0 | 1.0 | 1.0 | 1.0 | 1.0 | 1.0 | 1.0 | 1.0 |
|  |  | Zinc Flower | 2.5 | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 0.6 | 0.6 | 0.6 | 0.6 |
|  |  | Vulcanization Promoter MBTS *8 | 1.0 | 1.0 | 1.0 | 1.0 | 1.0 | 1.0 | 1.0 | 1.0 | 1.0 |
|  |  | Vulcanization Promoter TBBS *9 | 0.6 | 0.6 | 0.6 | 0.6 | 0.6 | 0.6 | 0.6 | 0.6 | 0.6 |
|  |  | Sulfur | 1.5 | 1.5 | 1.5 | 1.5 | 1.5 | 1.5 | 1.5 | 1.5 | 1.5 |
| Highest Temperature of Rubber Composition in First Stage of Kneading (° C.) | | | 150 | 150 | 150 | 150 | 150 | 150 | 150 | 150 | 150 |
| Highest Temperature of Rubber Composition in Second Stage of Kneading (° C.) | | | 130 | 130 | 130 | 130 | 130 | 130 | — | — | — |
| Number of Total Stages of Kneading | | | 3 | 3 | 3 | 3 | 3 | 3 | 2 | 2 | 2 |
| Vulcanizate Physical Property | Low-Heat-Generation Property (tanδ index) | | 120 | 120 | 120 | 124 | 116 | 119 | 100 | 102 | 102 |

[Notes]
*1 to *18 are all the same as in Table 1 to Table 5.
*24: Ouchi Shinko Chemical's trade name "Nocceler EUR"

TABLE 26

|  |  |  | Example | | | | | | | | | Comparative Example | |
|---|---|---|---|---|---|---|---|---|---|---|---|---|---|
|  |  | Part by mass | 142 | 148 | 149 | 150 | 151 | 152 | 153 | 154 | 155 | 1 | 8 |
| Formulation | First Stage of Kneading | Emulsion-Polymerized SBR-A *1 | 100 | 100 | 100 | 100 | 100 | 100 | 100 | 100 | 100 | 100 | 100 |
|  |  | Carbon Black N220 *2 | 10 | 10 | 10 | 10 | 10 | 10 | 10 | 10 | 10 | 10 | 10 |
|  |  | Silica *3 | 50 | 50 | 50 | 50 | 50 | 50 | 50 | 50 | 50 | 50 | 50 |
|  |  | Silane Coupling Agent Si75 *4 | 4.0 | 4.0 | 4.0 | 4.0 | 4.0 | 4.0 | 4.0 | 4.0 | 4.0 | 4.0 | 4.0 |
|  |  | Aromatic Oil | 30 | 30 | 30 | 30 | 30 | 30 | 30 | 30 | 30 | 30 | 30 |
|  |  | Stearic Acid | 2.0 | 2.0 | 2.0 | 2.0 | 2.0 | 2.0 | — | — | — | 2.0 | 2.0 |
|  |  | Antiaging Agent 6PPD *5 | 1.0 | 1.0 | 1.0 | 1.0 | 1.0 | 1.0 | — | — | — | 1.0 | 1.0 |
|  |  | N,N-diethylthiourea *24 | — | — | — | — | — | — | — | — | — | — | — |
|  | Second Stage of Kneading | N,N-diethylthiourea *24 | 1.0 | 1.0 | 1.0 | 1.0 | 1.0 | 1.0 | 1.0 | 1.0 | 1.0 | — | — |
|  | Final Stage of Kneading | Stearic Acid | — | — | — | — | — | — | 2.0 | 2.0 | 2.0 | — | — |
|  |  | Antiaging Agent 6PPD *5 | — | — | — | — | — | — | 1.0 | 1.0 | 1.0 | — | — |
|  |  | Antiaging Agent TMDQ *7 | 1.0 | 1.0 | 1.0 | 1.0 | 1.0 | 1.0 | 1.0 | 1.0 | 1.0 | 1.0 | 1.0 |
|  |  | Zinc Flower | 2.5 | 2.5 | 2.5 | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 0.6 | 0.6 | 0.6 | 0.6 | 0.6 | 0.6 |
|  |  | Vulcanization Promoter MBTS *8 | 1.0 | 1.0 | 1.0 | 1.0 | 1.0 | 1.0 | 1.0 | 1.0 | 1.0 | 1.0 | 1.0 |
|  |  | Vulcanization Promoter TBBS *9 | 0.6 | 0.6 | 0.6 | 0.6 | 0.6 | 0.6 | 0.6 | 0.6 | 0.6 | 0.6 | 0.6 |
|  |  | Sulfur | 1.5 | 1.5 | 1.5 | 1.5 | 1.5 | 1.5 | 1.5 | 1.5 | 1.5 | 1.5 | 1.5 |
| Highest Temperature of Rubber Composition in First Stage of Kneading (° C.) | | | 150 | 160 | 170 | 160 | 170 | 170 | 160 | 170 | 170 | 150 | 170 |
| Highest Temperature of Rubber Composition in Second Stage of Kneading (° C.) | | | 130 | 130 | 130 | 150 | 150 | 170 | 130 | 130 | 150 | — | — |
| Number of Total Stages of Kneading | | | 3 | 3 | 3 | 3 | 3 | 3 | 3 | 3 | 3 | 2 | 2 |
| Vulcanizate Physical Property | Low-Heat-Generation Property (tanδ index) | | 120 | 121 | 121 | 122 | 123 | 124 | 122 | 123 | 123 | 100 | 107 |

[Notes]
*1 to *18 are all the same as in Table 1 to Table 5, and *24 is the same as in Table 25.

TABLE 27

|  |  |  | Example | | | | | | Comparative Example | |
|---|---|---|---|---|---|---|---|---|---|---|
|  | Part by mass |  | 142 | 156 | 157 | 158 | 159 | 160 | 1 | 9 |
| Formulation | First Stage of Kneading | Emulsion-Polymerized SBR-A *1 | 100 | 100 | 100 | 100 | — | — | 100 | — |
|  |  | Solution-Polymerized SBR-B *10 | — | — | — | — | 100 | 100 | — | 100 |
|  |  | Carbon Black N220 *2 | 10 | 10 | 10 | 10 | 10 | 10 | 10 | 10 |
|  |  | Silica *3 | 50 | 50 | 50 | 50 | 50 | 50 | 50 | 50 |
|  |  | Silane Coupling Agent Si75 *4 | 4.0 | 4.0 | 4.0 | 4.0 | 4.0 | 4.0 | 4.0 | 4.0 |
|  |  | Aromatic Oil | 30 | 30 | 30 | 30 | 30 | 30 | 30 | 30 |
|  |  | Stearic Acid | 2.0 | 2.0 | 2.0 | 2.0 | 2.0 | 2.0 | 2.0 | 2.0 |
|  |  | Antiaging Agent 6PPD *5 | 1.0 | 1.0 | 1.0 | 1.0 | 1.0 | 1.0 | 1.0 | 1.0 |
|  | Second Stage of Kneading | N,N'-diethylthiourea *24 | 1.0 | 1.0 | 1.0 | 1.0 | 1.0 | 1.0 | — | — |
|  | Final Stage of Kneading | Antiaging Agent TMDQ *7 | 1.0 | 1.0 | 1.0 | 1.0 | 1.0 | 1.0 | 1.0 | 1.0 |
|  |  | Zinc Flower | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 0.6 | 0.6 | 0.6 |
|  |  | Vulcanization Promoter MBTS *8 | 1.0 | 1.0 | 1.0 | 1.0 | 1.0 | 1.0 | 1.0 | 1.0 |
|  |  | Vulcanization Promoter TBBS *9 | 0.6 | 0.6 | 0.6 | 0.6 | 0.6 | 0.6 | 0.6 | 0.6 |
|  |  | Sulfur | 1.5 | 1.5 | 1.5 | 1.5 | 1.5 | 1.5 | 1.5 | 1.5 |
| Highest Temperature of Rubber Composition in First Stage of Kneading (° C.) | | | 150 | 150 | 150 | 150 | 150 | 150 | 150 | 150 |
| Highest Temperature of Rubber Composition in Second Stage of Kneading (° C.) | | | 130 | 170 | 150 | 110 | 150 | 170 | — | — |
| Number of Total Stages of Kneading | | | 3 | 3 | 3 | 3 | 3 | 3 | 2 | 2 |
| Vulcanizate Physical Property | Low-Heat-Generation Property (tanδ index) | | 120 | 123 | 121 | 111 | 122 | 123 | 100 | 102 |

[Notes]
*1 to *18 are all the same as in Table 1 to Table 5, and *24 is the same as in Table 25.

TABLE 28

|  |  |  | Example | | | | | | | Comparative Example | |
|---|---|---|---|---|---|---|---|---|---|---|---|
|  | Part by mass |  | 161 | 162 | 163 | 164 | 165 | 166 | 167 | 10 | 16 |
| Formulation | First Stage of Kneading | Emulsion-Polymerized SBR-A *1 | 75 | 50 | 25 | 80 | — | 80 | — | 75 | — |
|  |  | Solution-Polymerized SBR-B *10 | 25 | 50 | 75 | — | 80 | — | 80 | 25 | 80 |
|  |  | Natural Rubber *11 | — | — | — | 20 | 20 | — | — | — | — |
|  |  | Unmodified BR *12 | — | — | — | — | — | 20 | 20 | — | 20 |
|  |  | Carbon Black N220 *2 | 10 | 10 | 10 | 10 | 10 | 10 | 10 | 10 | 10 |
|  |  | Silica *3 | 50 | 50 | 50 | 50 | 50 | 50 | 50 | 50 | 50 |
|  |  | Silane Coupling Agent Si75 *4 | 4.0 | 4.0 | 4.0 | 4.0 | 4.0 | 4.0 | 4.0 | 4.0 | 4.0 |
|  |  | Aromatic Oil | 30 | 30 | 30 | 30 | 30 | 30 | 30 | 30 | 30 |
|  |  | Stearic Acid | 2.0 | 2.0 | 2.0 | 2.0 | 2.0 | 2.0 | 2.0 | 2.0 | 2.0 |
|  |  | Antiaging Agent 6PPD *5 | 1.0 | 1.0 | 1.0 | 1.0 | 1.0 | 1.0 | 1.0 | 1.0 | 1.0 |
|  | Second Stage of Kneading | N,N'-diethylthiourea *24 | 1.0 | 1.0 | 1.0 | 1.0 | 1.0 | 1.0 | 1.0 | — | — |
|  | Final Stage of Kneading | Antiaging Agent TMDQ *7 | 1.0 | 1.0 | 1.0 | 1.0 | 1.0 | 1.0 | 1.0 | 1.0 | 1.0 |
|  |  | Zinc Flower | 2.5 | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 0.6 | 0.6 | 0.6 | 0.6 |
|  |  | Vulcanization Promoter MBTS *8 | 1.0 | 1.0 | 1.0 | 1.0 | 1.0 | 1.0 | 1.0 | 1.0 | 1.0 |
|  |  | Vulcanization Promoter TBBS *9 | 0.6 | 0.6 | 0.6 | 0.6 | 0.6 | 0.6 | 0.6 | 0.6 | 0.6 |
|  |  | Sulfur | 1.5 | 1.5 | 1.5 | 1.5 | 1.5 | 1.5 | 1.5 | 1.5 | 1.5 |
| Highest Temperature of Rubber Composition in First Stage of Kneading (° C.) | | | 150 | 150 | 150 | 150 | 150 | 150 | 150 | 150 | 150 |
| Highest Temperature of Rubber Composition in Second Stage of Kneading (° C.) | | | 130 | 130 | 130 | 130 | 130 | 130 | 130 | — | — |
| Number of Total Stages of Kneading | | | 3 | 3 | 3 | 3 | 3 | 3 | 3 | 2 | 2 |
| Vulcanizate Physical Property | Low-Heat-Generation Property (tanδ index) | | 120 | 120 | 120 | 128 | 129 | 133 | 134 | 100 | 114 |

[Notes]
*1 to *18 are all the same as in Table 1 to Table 5, and *24 is the same as in Table 25.

TABLE 29

| | Part by mass | | Example | | | | | | | | Comparative Example | |
|---|---|---|---|---|---|---|---|---|---|---|---|---|---|
| | | | 168 | 179 | 180 | 181 | 182 | 183 | 184 | 175 | 17 | 18 |
| Formulation | First Stage of Kneading | Emulsion-Polymerized SBR-C *13 | 68.75 | 68.75 | 68.75 | 68.75 | 68.75 | 68.75 | 68.75 | 68.75 | 68.75 | 68.75 |
| | | Solution-Polymerized SBR-D *14 | 68.75 | 68.75 | 68.75 | 68.75 | 68.75 | 68.75 | 68.75 | 68.75 | 68.75 | 68.75 |
| | | Carbon Black N220 *2 | 10 | 10 | 10 | 10 | 10 | 10 | 10 | 10 | 10 | 10 |
| | | Silica *3 | 80 | 80 | 80 | 80 | 80 | 80 | 80 | 80 | 80 | 80 |
| | | Silane Coupling Agent Si75 *4 | 6.5 | — | — | — | 6.5 | — | — | — | 6.5 | 6.5 |
| | | Silane Coupling Agent NXT *15 | — | 6.5 | — | — | — | 6.5 | — | — | — | — |
| | | Silane Coupling Agent NXT-Z *16 | — | — | 6.5 | — | — | — | 6.5 | — | — | — |
| | | Silane Coupling Agent *17 | — | — | — | 6.5 | — | — | — | 6.5 | — | — |
| | | Aromatic Oil | 5.0 | 5.0 | 5.0 | 5.0 | 5.0 | 5.0 | 5.0 | 5.0 | 5.0 | 5.0 |
| | | Stearic Acid | 2.0 | 2.0 | 2.0 | 2.0 | — | — | — | — | 2.0 | — |
| | | Antiaging Agent 6PPD *5 | 1.0 | 1.0 | 1.0 | 1.0 | — | — | — | — | 1.0 | — |
| | Second Stage of Kneading | N,N'-diethylthiourea *24 | 1.0 | 1.0 | 1.0 | 1.0 | 1.0 | 1.0 | 1.0 | 1.0 | — | — |
| | Final Stage of Kneading | Stearic Acid | — | — | — | — | 2.0 | 2.0 | 2.0 | 2.0 | — | 2.0 |
| | | Antiaging Agent 6PPD *5 | — | — | — | — | 1.0 | 1.0 | 1.0 | 1.0 | — | 1.0 |
| | | Zinc Flower | 3.0 | 3.0 | 3.0 | 3.0 | 3.0 | 3.0 | 3.0 | 3.0 | 3.0 | 3.0 |
| | | 1,3-Diphenylguanidine *6 | 1.0 | 1.0 | 1.0 | 1.0 | 1.0 | 1.0 | 1.0 | 1.0 | 1.0 | 1.0 |
| | | Vulcanization Promoter MBTS *8 | 0.8 | 0.8 | 0.8 | 0.8 | 0.8 | 0.8 | 0.8 | 0.8 | 0.8 | 0.8 |
| | | Vulcanization Promoter CBS *18 | 1.5 | 1.5 | 1.5 | 1.5 | 1.5 | 1.5 | 1.5 | 1.5 | 1.5 | 1.5 |
| | | Sulfur | 1.5 | 1.5 | 1.5 | 1.5 | 1.5 | 1.5 | 1.5 | 1.5 | 1.5 | 1.5 |
| | Highest Temperature of Rubber Composition in First Stage of Kneading (° C.) | | 150 | 150 | 150 | 150 | 150 | 150 | 150 | 150 | 150 | 150 |
| | Highest Temperature of Rubber Composition in Second Stage of Kneading (° C.) | | 130 | 130 | 130 | 130 | 130 | 130 | 130 | 130 | — | — |
| | Number of Total Stages of Kneading | | 3 | 3 | 3 | 3 | 3 | 3 | 3 | 3 | 2 | 2 |
| Vulcanizate Physical Property | Low-Heat-Generation Property (tanδ index) | | 119 | 121 | 119 | 124 | 120 | 121 | 119 | 127 | 100 | 100 |

[Notes]
*1 to *18 are all the same as in Table 1 to Table 5, and *24 is the same as in Table 25.

TABLE 30

| | | Part by mass | Example | | | Comparative Example | | | |
|---|---|---|---|---|---|---|---|---|---|
| | | | 168 | 176 | 177 | 17 | 35 | 36 | 37 |
| Formulation | First Stage of Kneading | Emulsion-Polymerized SBR-C *13 | 68.75 | 68.75 | 68.75 | 68.75 | 68.75 | 68.75 | 68.75 |
| | | Solution-Polymerized SBR-D *14 | 68.75 | 68.75 | 68.75 | 68.75 | 68.75 | 68.75 | 68.75 |
| | | Carbon Black N220 *2 | 10 | 10 | 10 | 10 | 10 | 10 | 10 |
| | | Silica *3 | 80 | 80 | 80 | 80 | 80 | 80 | 80 |
| | | Silane Coupling Agent Si75 *4 | 6.5 | 6.5 | 6.5 | 6.5 | 6.5 | 6.5 | 6.5 |
| | | Aromatic Oil | 5.0 | 5.0 | 5.0 | 5.0 | 5.0 | 5.0 | 5.0 |
| | | Stearic Acid | 2.0 | 2.0 | 2.0 | 2.0 | 2.0 | 2.0 | 2.0 |
| | | Antiaging Agent 6PPD *5 | 1.0 | 1.0 | 1.0 | 1.0 | 1.0 | 1.0 | 1.0 |
| | | N,N'-diethylthiourea *24 | — | — | — | — | 1.0 | — | — |
| | | Trimethylthiourea *25 | — | — | — | — | — | 1.0 | — |
| | | N,N'-diphenylthiourea 26 | — | — | — | — | — | — | 1.0 |
| | Second Stage of Kneading | N,N'-diethylthiourea *24 | 1.0 | — | — | — | — | — | — |
| | | Trimethylthiourea *25 | — | 1.0 | — | — | — | — | — |
| | | N,N'-diphenylthiourea 26 | — | — | 1.0 | — | — | — | — |
| | Final Stage of Kneading | Zinc Flower | 3.0 | 3.0 | 3.0 | 3.0 | 3.0 | 3.0 | 3.0 |
| | | 1,3-Diphenylguanidine *6 | 1.0 | 1.0 | 1.0 | 1.0 | 1.0 | 1.0 | 1.0 |
| | | Vulcanization Promoter MBTS *8 | 0.8 | 0.8 | 0.8 | 0.8 | 0.8 | 0.8 | 0.8 |
| | | Vulcanization Promoter CBS *18 | 1.5 | 1.5 | 1.5 | 1.5 | 1.5 | 1.5 | 1.5 |
| | | Sulfur | 1.5 | 1.5 | 1.5 | 1.5 | 1.5 | 1.5 | 1.5 |
| | Highest Temperature of Rubber Composition in First Stage of Kneading (° C.) | | 150 | 150 | 150 | 150 | 150 | 150 | 150 |
| | Highest Temperature of Rubber Composition in Second Stage of Kneading (° C.) | | 130 | 130 | 130 | — | — | — | — |

TABLE 30-continued

|  | Part by mass | Example | | | Comparative Example | | | |
|---|---|---|---|---|---|---|---|---|
|  |  | 168 | 176 | 177 | 17 | 35 | 36 | 37 |
|  | Number of Total Stages of Kneading | 3 | 3 | 3 | 2 | 2 | 2 | 2 |
| Vulcanizate Physical Property | Low-Heat-Generation Property (tanδ index) | 119 | 118 | 118 | 100 | 105 | 103 | 103 |

[Notes]
*1 to *18 are all the same as in Table 1 to Table 5, and *24 is the same as in Table 25.
*25: Sanshin Chemical's trade name "Sanceler TMU"
*26: Ouchi Shinko Chemical's trade name "Nocceler C"

TABLE 31

|  |  | Part by mass | Example | | | | | | Comparative Example | | |
|---|---|---|---|---|---|---|---|---|---|---|---|
|  |  |  | 178 | 179 | 180 | 181 | 182 | 183 | 1 | 38 | 6 |
| Formulation | First Stage of Kneading | Emulsion-Polymerized SBR-A *1 | 100 | 100 | 100 | 100 | 100 | 100 | 100 | 100 | 100 |
|  |  | Carbon Black N220 *2 | 10 | 10 | 10 | — | 10 | 10 | 10 | 10 | — |
|  |  | Silica *3 | 50 | 50 | 50 | 60 | 50 | 50 | 50 | 50 | 60 |
|  |  | Silane Coupling Agent Si75 *4 | 4.0 | 4.0 | 4.0 | 4.8 | 4.0 | 4.0 | 4.0 | 4.0 | 4.8 |
|  |  | Aromatic Oil | 30 | 30 | 30 | 30 | 30 | 30 | 30 | 30 | 30 |
|  |  | Stearic Acid | 2.0 | 2.0 | 2.0 | 2.0 | 2.0 | 2.0 | 2.0 | 2.0 | 2.0 |
|  |  | Antiaging Agent 6PPD *5 | 1.0 | 1.0 | 1.0 | 1.0 | 1.0 | 1.0 | 1.0 | 1.0 | 1.0 |
|  |  | Zinc Dibenzyldithiocarbamate *27 | — | — | — | — | — | — | — | 1.0 | — |
|  | Second Stage of Kneading | Zinc Dibenzyldithiocarbamate *27 | 1.0 | 0.5 | 2.0 | 1.0 | 0.1 | 3.0 | — | — | — |
|  | Final Stage of Kneading | Stearic Acid | — | — | — | — | — | — | — | — | — |
|  |  | Antiaging Agent 6PPD *5 | — | — | — | — | — | — | — | — | — |
|  |  | Antiaging Agent TMDQ *7 | 1.0 | 1.0 | 1.0 | 1.0 | 1.0 | 1.0 | 1.0 | 1.0 | 1.0 |
|  |  | Zinc Flower | 2.5 | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 0.6 | 0.6 | 0.6 | 0.6 |
|  |  | Vulcanization Promoter MBTS *8 | 1.0 | 1.0 | 1.0 | 1.0 | 1.0 | 1.0 | 1.0 | 1.0 | 1.0 |
|  |  | Vulcanization Promoter TBBS *9 | 0.6 | 0.6 | 0.6 | 0.6 | 0.6 | 0.6 | 0.6 | 0.6 | 0.6 |
|  |  | Sulfur | 1.5 | 1.5 | 1.5 | 1.5 | 1.5 | 1.5 | 1.5 | 1.5 | 1.5 |
| Highest Temperature of Rubber Composition in First Stage of Kneading (° C.) | | | 150 | 150 | 150 | 150 | 150 | 150 | 150 | 150 | 150 |
| Highest Temperature of Rubber Composition in Second Stage of Kneading (° C.) | | | 130 | 130 | 130 | 130 | 130 | 130 | — | — | — |
| Number of Total Stages of Kneading | | | 3 | 3 | 3 | 3 | 3 | 3 | 2 | 2 | 2 |
| Vulcanizate Physical Property | Low-Heat-Generation Property (tanδ index) | | 137 | 137 | 137 | 142 | 132 | 137 | 100 | 105 | 102 |

[Notes]
*1 to *18 are all the same as in Table 1 to Table 5.
*27: Ouchi Shinko Chemical's trade name "Nocceler ZTC"

TABLE 32

|  |  | Part by mass | Example | | | | | | | | | Comparative Example | |
|---|---|---|---|---|---|---|---|---|---|---|---|---|---|
|  |  |  | 178 | 184 | 185 | 186 | 187 | 188 | 189 | 190 | 191 | 1 | 8 |
| Formulation | First Stage of Kneading | Emulsion-Polymerized SBR-A *1 | 100 | 100 | 100 | 100 | 100 | 100 | 100 | 100 | 100 | 100 | 100 |
|  |  | Carbon Black N220 *2 | 10 | 10 | 10 | 10 | 10 | 10 | 10 | 10 | 10 | 10 | 10 |
|  |  | Silica *3 | 50 | 50 | 50 | 50 | 50 | 50 | 50 | 50 | 50 | 50 | 50 |
|  |  | Silane Coupling Agent Si75 *4 | 4.0 | 4.0 | 4.0 | 4.0 | 4.0 | 4.0 | 4.0 | 4.0 | 4.0 | 4.0 | 4.0 |
|  |  | Aromatic Oil | 30 | 30 | 30 | 30 | 30 | 30 | 30 | 30 | 30 | 30 | 30 |
|  |  | Stearic Acid | 2.0 | 2.0 | 2.0 | 2.0 | 2.0 | 2.0 | — | — | — | 2.0 | 2.0 |
|  |  | Antiaging Agent 6PPD *5 | 1.0 | 1.0 | 1.0 | 1.0 | 1.0 | 1.0 | — | — | — | 1.0 | 1.0 |
|  |  | Zinc Dibenzyldithiocarbamate *27 | — | — | — | — | — | — | — | — | — | — | — |
|  | Second Stage of Kneading | Zinc Dibenzyldithiocarbamate *27 | 1.0 | 1.0 | 1.0 | 1.0 | 1.0 | 1.0 | 1.0 | 1.0 | 1.0 | — | — |
|  | Final Stage of Kneading | Stearic Acid | — | — | — | — | — | — | 2.0 | 2.0 | 2.0 | — | — |
|  |  | Antiaging Agent 6PPD *5 | — | — | — | — | — | — | 1.0 | 1.0 | 1.0 | — | — |
|  |  | Antiaging Agent TMDQ *7 | 1.0 | 1.0 | 1.0 | 1.0 | 1.0 | 1.0 | 1.0 | 1.0 | 1.0 | 1.0 | 1.0 |
|  |  | Zinc Flower | 2.5 | 2.5 | 2.5 | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 0.6 | 0.6 | 0.6 | 0.6 | 0.6 | 0.6 |

TABLE 32-continued

|  |  | | Example | | | | | | | | | Comparative Example | |
| --- | --- | --- | --- | --- | --- | --- | --- | --- | --- | --- | --- | --- | --- |
| | Part by mass | 178 | 184 | 185 | 186 | 187 | 188 | 189 | 190 | 191 | 1 | 8 |
| | Vulcanization Promoter MBTS *8 | 1.0 | 1.0 | 1.0 | 1.0 | 1.0 | 1.0 | 1.0 | 1.0 | 1.0 | 1.0 | 1.0 |
| | Vulcanization Promoter TBBS *9 | 0.6 | 0.6 | 0.6 | 0.6 | 0.6 | 0.6 | 0.6 | 0.6 | 0.6 | 0.6 | 0.6 |
| | Sulfur | 1.5 | 1.5 | 1.5 | 1.5 | 1.5 | 1.5 | 1.5 | 1.5 | 1.5 | 1.5 | 1.5 |
| Highest Temperature of Rubber Composition in First Stage of Kneading (° C.) | | 150 | 160 | 170 | 160 | 170 | 170 | 160 | 170 | 170 | 150 | 170 |
| Highest Temperature of Rubber Composition in Second Stage of Kneading (° C.) | | 130 | 130 | 130 | 150 | 150 | 170 | 130 | 130 | 150 | — | — |
| Number of Total Stages of Kneading | | 3 | 3 | 3 | 3 | 3 | 3 | 3 | 3 | 3 | 2 | 2 |
| Vulcanizate Physical Property | Low-Heat-Generation Property (tanδ index) | 137 | 138 | 138 | 138 | 139 | 139 | 138 | 138 | 139 | 100 | 107 |

[Notes]
*1 to *18 are all the same as in Table 1 to Table 5, and *27 is the same as in Table 31

TABLE 33

|  |  |  | Example | | | | | | Comparative Example | |
| --- | --- | --- | --- | --- | --- | --- | --- | --- | --- | --- |
| | | Part by mass | 178 | 192 | 193 | 194 | 195 | 196 | 1 | 9 |
| Formulation | First Stage of Kneading | Emulsion-Polymerized SBR-A *1 | 100 | 100 | 100 | 100 | — | — | 100 | — |
| | | Solution-Polymerized SBR-B *10 | — | — | — | — | 100 | 100 | — | 100 |
| | | Carbon Black N220 *2 | 10 | 10 | 10 | 10 | 10 | 10 | 10 | 10 |
| | | Silica *3 | 50 | 50 | 50 | 50 | 50 | 50 | 50 | 50 |
| | | Silane Coupling Agent Si75 *4 | 4.0 | 4.0 | 4.0 | 4.0 | 4.0 | 4.0 | 4.0 | 4.0 |
| | | Aromatic Oil | 30 | 30 | 30 | 30 | 30 | 30 | 30 | 30 |
| | | Stearic Acid | 2.0 | 2.0 | 2.0 | 2.0 | 2.0 | 2.0 | 2.0 | 2.0 |
| | | Antiaging Agent 6PPD *5 | 1.0 | 1.0 | 1.0 | 1.0 | 1.0 | 1.0 | 1.0 | 1.0 |
| | Second Stage of Kneading | Zinc Dibenzyldithiocarbamate *27 | 1.0 | 1.0 | 1.0 | 1.0 | 1.0 | 1.0 | — | — |
| | Final Stage of Kneading | Antiaging Agent TMDQ *7 | 1.0 | 1.0 | 1.0 | 1.0 | 1.0 | 1.0 | 1.0 | 1.0 |
| | | Zinc Flower | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 |
| | | Vulcanization Promoter MBTS *8 | 1.0 | 1.0 | 1.0 | 1.0 | 1.0 | 1.0 | 1.0 | 1.0 |
| | | Vulcanization Promoter TBBS *9 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 |
| Highest Temperature of Rubber Composition in First Stage of Kneading (° C.) | | | 150 | 150 | 150 | 150 | 150 | 150 | 150 | 150 |
| Highest Temperature of Rubber Composition in Second Stage of Kneading (° C.) | | | 130 | 170 | 150 | 110 | 150 | 170 | — | — |
| Number of Total Stages of Kneading | | | 3 | 3 | 3 | 3 | 3 | 3 | 2 | 2 |
| Vulcanizate Physical Property | Low-Heat-Generation Property (tanδ index) | | 137 | 138 | 137 | 125 | 138 | 138 | 100 | 102 |

[Notes]
*1 to *18 are all the same as in Table 1 to Table 5, and *27 is the same as in Table 31

TABLE 34

|  |  |  | Example | | | | | | | Comparative Example | |
| --- | --- | --- | --- | --- | --- | --- | --- | --- | --- | --- | --- |
| | | Part by mass | 197 | 198 | 199 | 200 | 201 | 202 | 203 | 10 | 16 |
| Formulation | First Stage of Kneading | Emulsion-Polymerized SBR-A *1 | 75 | 50 | 25 | 80 | — | 80 | — | 75 | — |
| | | Solution-Polymerized SBR-B *10 | 25 | 50 | 75 | — | 80 | — | 80 | 25 | 80 |
| | | Natural Rubber *11 | — | — | — | 20 | 20 | — | — | — | — |
| | | Unmodified BR *12 | — | — | — | — | — | 20 | 20 | — | 20 |
| | | Carbon Black N220 *2 | 10 | 10 | 10 | 10 | 10 | 10 | 10 | 10 | 10 |
| | | Silica *3 | 50 | 50 | 50 | 50 | 50 | 50 | 50 | 50 | 50 |
| | | Silane Coupling Agent Si75 *4 | 4.0 | 4.0 | 4.0 | 4.0 | 4.0 | 4.0 | 4.0 | 4.0 | 4.0 |
| | | Aromatic Oil | 30 | 30 | 30 | 30 | 30 | 30 | 30 | 30 | 30 |
| | | Stearic Acid | 2.0 | 2.0 | 2.0 | 2.0 | 2.0 | 2.0 | 2.0 | 2.0 | 2.0 |
| | | Antiaging Agent 6PPD *5 | 1.0 | 1.0 | 1.0 | 1.0 | 1.0 | 1.0 | 1.0 | 1.0 | 1.0 |
| | Second Stage of Kneading | Zinc Dibenzyldithiocarbamate *27 | 1.0 | 1.0 | 1.0 | 1.0 | 1.0 | 1.0 | 1.0 | — | — |
| | Final Stage of Kneading | Antiaging Agent TMDQ *7 | 1.0 | 1.0 | 1.0 | 1.0 | 1.0 | 1.0 | 1.0 | 1.0 | 1.0 |
| | | Zinc Flower | 2.5 | 2.5 | 2.5 | 2.5 | 2.5 | 2.5 | 2.5 | 2.5 | 2.5 |

TABLE 34-continued

|  | Part by mass | Example 197 | 198 | 199 | 200 | 201 | 202 | 203 | Comparative Example 10 | 16 |
|---|---|---|---|---|---|---|---|---|---|---|
|  | 1,3-Diphenylguanidine *6 | 0.6 | 0.6 | 0.6 | 0.6 | 0.6 | 0.6 | 0.6 | 0.6 | 0.6 |
|  | Vulcanization Promoter MBTS *8 | 1.0 | 1.0 | 1.0 | 1.0 | 1.0 | 1.0 | 1.0 | 1.0 | 1.0 |
|  | Vulcanization Promoter TBBS *9 | 0.6 | 0.6 | 0.6 | 0.6 | 0.6 | 0.6 | 0.6 | 0.6 | 0.6 |
|  | Sulfur | 1.5 | 1.5 | 1.5 | 1.5 | 1.5 | 1.5 | 1.5 | 1.5 | 1.5 |
| Highest Temperature of Rubber Composition in First Stage of Kneading (° C.) | | 150 | 150 | 150 | 150 | 150 | 150 | 150 | 150 | 150 |
| Highest Temperature of Rubber Composition in Second Stage of Kneading (° C.) | | 130 | 130 | 130 | 130 | 130 | 130 | 130 | — | — |
| Number of Total Stages of Kneading | | 3 | 3 | 3 | 3 | 3 | 3 | 3 | 2 | 2 |
| Vulcanizate Physical Property | Low-Heat-Generation Property (tanδ index) | 136 | 136 | 135 | 142 | 143 | 146 | 147 | 100 | 114 |

[Notes]
*1 to *18 are all the same as in Table 1 to Table 5, and *27 is the same as in Table 31

TABLE 35

|  |  | Part by mass | Example 204 | 205 | 206 | 207 | 208 | 209 | 210 | 211 | Comparative Example 17 | 18 |
|---|---|---|---|---|---|---|---|---|---|---|---|---|
| Formulation | First Stage of Kneading | Emulsion-Polymerized SBR-C *13 | 68.75 | 68.75 | 68.75 | 68.75 | 68.75 | 68.75 | 68.75 | 68.75 | 68.75 | 68.75 |
|  |  | Solution-Polymerized SBR-D *14 | 68.75 | 68.75 | 68.75 | 68.75 | 68.75 | 68.75 | 68.75 | 68.75 | 68.75 | 68.75 |
|  |  | Carbon Black N220 *2 | 10 | 10 | 10 | 10 | 10 | 10 | 10 | 10 | 10 | 10 |
|  |  | Silica *3 | 80 | 80 | 80 | 80 | 80 | 80 | 80 | 80 | 80 | 80 |
|  |  | Silane Coupling Agent Si75 *4 | 6.5 | — | — | — | 6.5 | — | — | — | 6.5 | 6.5 |
|  |  | Silane Coupling Agent NXT *15 | — | 6.5 | — | — | — | 6.5 | — | — | — | — |
|  |  | Silane Coupling Agent NXT-Z *16 | — | — | 6.5 | — | — | — | 6.5 | — | — | — |
|  |  | Silane Coupling Agent *17 | — | — | — | 6.5 | — | — | — | 6.5 | — | — |
|  |  | Aromatic Oil | 5.0 | 5.0 | 5.0 | 5.0 | 5.0 | 5.0 | 5.0 | 5.0 | 5.0 | 5.0 |
|  |  | Stearic Acid | 2.0 | 2.0 | 2.0 | 2.0 | — | — | — | — | 2.0 | — |
|  |  | Antiaging Agent 6PPD *5 | 1.0 | 1.0 | 1.0 | 1.0 | — | — | — | — | 1.0 | — |
|  | Second Stage of Kneading | Zinc Dibenzyldithio-carbamate *27 | 1.0 | 1.0 | 1.0 | 1.0 | 1.0 | 1.0 | 1.0 | 1.0 | — | — |
|  | Final Stage of Kneading | Stearic Acid | — | — | — | — | 2.0 | 2.0 | 2.0 | 2.0 | — | 2.0 |
|  |  | Antiaging Agent 6PPD *5 | — | — | — | — | 1.0 | 1.0 | 1.0 | 1.0 | — | 1.0 |
|  |  | Zinc Flower | 3.0 | 3.0 | 3.0 | 3.0 | 3.0 | 3.0 | 3.0 | 3.0 | 3.0 | 3.0 |
|  |  | 1,3-Diphenylguanidine *6 | 1.0 | 1.0 | 1.0 | 1.0 | 1.0 | 1.0 | 1.0 | 1.0 | 1.0 | 1.0 |
|  |  | Vulcanization Promoter MBTS *8 | 0.8 | 0.8 | 0.8 | 0.8 | 0.8 | 0.8 | 0.8 | 0.8 | 0.8 | 0.8 |
|  |  | Vulcanization Promoter CBS *18 | 1.5 | 1.5 | 1.5 | 1.5 | 1.5 | 1.5 | 1.5 | 1.5 | 1.5 | 1.5 |
|  |  | Sulfur | 1.5 | 1.5 | 1.5 | 1.5 | 1.5 | 1.5 | 1.5 | 1.5 | 1.5 | 1.5 |
| Highest Temperature of Rubber Composition in First Stage of Kneading (° C.) | | | 150 | 150 | 150 | 150 | 150 | 150 | 150 | 150 | 150 | 150 |
| Highest Temperature of Rubber Composition in Second Stage of Kneading (° C.) | | | 130 | 130 | 130 | 130 | 130 | 130 | 130 | 130 | — | — |
| Number of Total Stages of Kneading | | | 3 | 3 | 3 | 3 | 3 | 3 | 3 | 3 | 2 | 2 |
| Vulcanizate Physical Property | Low-Heat-Generation Property (tanδ index) | | 135 | 132 | 129 | 140 | 136 | 132 | 129 | 142 | 100 | 100 |

[Notes]
*1 to *18 are all the same as in Table 1 to Table 5, and *27 is the same as in Table 31

TABLE 36

|  |  |  | Example | | | | Comparative Example | | | | |
| --- | --- | --- | --- | --- | --- | --- | --- | --- | --- | --- | --- |
|  |  | Part by mass | 204 | 212 | 213 | 214 | 17 | 39 | 40 | 41 | 42 |
| Formulation | First Stage of Kneading | Emulsion-Polymerized SBR-C *13 | 68.75 | 68.75 | 68.75 | 68.75 | 68.75 | 68.75 | 68.75 | 68.75 | 68.75 |
|  |  | Solution-Polymerized SBR-D *14 | 68.75 | 68.75 | 68.75 | 68.75 | 68.75 | 68.75 | 68.75 | 68.75 | 68.75 |
|  |  | Carbon Black N220 *2 | 10 | 10 | 10 | 10 | 10 | 10 | 10 | 10 | 10 |
|  |  | Silica *3 | 80 | 80 | 80 | 80 | 80 | 80 | 80 | 80 | 80 |
|  |  | Silane Coupling Agent Si75 *4 | 6.5 | 6.5 | 6.5 | 6.5 | 6.5 | 6.5 | 6.5 | 6.5 | 6.5 |
|  |  | Aromatic Oil | 5.0 | 5.0 | 5.0 | 5.0 | 5.0 | 5.0 | 5.0 | 5.0 | 5.0 |
|  |  | Stearic Acid | 2.0 | 2.0 | 2.0 | 2.0 | 2.0 | 2.0 | 2.0 | 2.0 | 2.0 |
|  |  | Antiaging Agent 6PPD *5 | 1.0 | 1.0 | 1.0 | 1.0 | 1.0 | 1.0 | 1.0 | 1.0 | 1.0 |
|  |  | Zinc Dibenzyldithiocarbamate *27 | — | — | — | — | — | 1.0 | — | — | — |
|  |  | Zinc N-ethyl-N-phenyldithiocarbamate *28 | — | — | — | — | — | — | 1.0 | — | — |
|  |  | Zinc Dimethyldithiocarbamate *29 | — | — | — | — | — | — | — | 1.0 | — |
|  |  | Copper Dimethyldithiocarbamate *30 | — | — | — | — | — | — | — | — | 1.0 |
|  | Second Stage of Kneading | Zinc Dibenzyldithiocarbamate *27 | 1.0 | — | — | — | — | — | — | — | — |
|  |  | Zinc N-ethyl-N-phenyldithiocarbamate *28 | — | 1.0 | — | — | — | — | — | — | — |
|  |  | Zinc Dimethyldithiocarbamate *29 | — | — | 1.0 | — | — | — | — | — | — |
|  |  | Copper Dimethyldithiocarbamate *30 | — | — | — | 1.0 | — | — | — | — | — |
|  | Final Stage of Kneading | Zinc Flower | 3.0 | 3.0 | 3.0 | 3.0 | 3.0 | 3.0 | 3.0 | 3.0 | 3.0 |
|  |  | 1,3-Diphenylguanidine *6 | 1.0 | 1.0 | 1.0 | 1.0 | 1.0 | 1.0 | 1.0 | 1.0 | 1.0 |
|  |  | Vulcanization Promoter MBTS *8 | 0.8 | 0.8 | 0.8 | 0.8 | 0.8 | 0.8 | 0.8 | 0.8 | 0.8 |
|  |  | Vulcanization Promoter CBS *18 | 1.5 | 1.5 | 1.5 | 1.5 | 1.5 | 1.5 | 1.5 | 1.5 | 1.5 |
|  |  | Sulfur | 1.5 | 1.5 | 1.5 | 1.5 | 1.5 | 1.5 | 1.5 | 1.5 | 1.5 |
| Highest Temperature of Rubber Composition in First Stage of Kneading (° C.) | | | 150 | 150 | 150 | 150 | 150 | 150 | 150 | 150 | 150 |
| Highest Temperature of Rubber Composition in Second Stage of Kneading (° C.) | | | 130 | 130 | 130 | 130 | — | — | — | — | — |
| Number of Total Stages of Kneading | | | 3 | 3 | 3 | 3 | 2 | 2 | 2 | 2 | 2 |
| Vulcanizate Physical Property | Low-Heat-Generation Property (tanδ index) | | 135 | 136 | 138 | 130 | 100 | 105 | 105 | 106 | 103 |

[Notes]
*1 to *18 are all the same as in Table 1 to Table 5, and *27 is the same as in Table 31
*28: Sanshin Chemical's trade name "Sanceler PX"
*29: Sanshin Chemical's trade name "Sanceler PZ"
*30: Sanshin Chemical's trade name "Sanceler TT-CU"

TABLE 37

|  |  |  | Example | | | | | | Comparative Example | | |
| --- | --- | --- | --- | --- | --- | --- | --- | --- | --- | --- | --- |
|  |  | Part by mass | 215 | 216 | 217 | 218 | 219 | 220 | 1 | 43 | 6 |
| Formulation | First Stage of Kneading | Emulsion-Polymerized SBR-A *1 | 100 | 100 | 100 | 100 | 100 | 100 | 100 | 100 | 100 |
|  |  | Carbon Black N220 *2 | 10 | 10 | 10 | — | 10 | 10 | 10 | 10 | — |
|  |  | Silica *3 | 50 | 50 | 50 | 60 | 50 | 50 | 50 | 50 | 60 |
|  |  | Silane Coupling Agent Si75 *4 | 4.0 | 4.0 | 4.0 | 4.8 | 4.0 | 4.0 | 4.0 | 4.0 | 4.8 |
|  |  | Aromatic Oil | 30 | 30 | 30 | 30 | 30 | 30 | 30 | 30 | 30 |
|  |  | Stearic Acid | 2.0 | 2.0 | 2.0 | 2.0 | 2.0 | 2.0 | 2.0 | 2.0 | 2.0 |
|  |  | Antiaging Agent 6PPD *5 | 1.0 | 1.0 | 1.0 | 1.0 | 1.0 | 1.0 | 1.0 | 1.0 | 1.0 |
|  |  | Zinc Isopropylxanthate *31 | — | — | — | — | — | — | — | 1.0 | — |
|  | Second Stage of Kneading | Zinc Isopropylxanthate *31 | 1.0 | 0.5 | 2.0 | 1.0 | 0.1 | 3.0 | — | — | — |
|  | Final Stage of Kneading | Stearic Acid | — | — | — | — | — | — | — | — | — |
|  |  | Antiaging Agent 6PPD *5 | — | — | — | — | — | — | — | — | — |
|  |  | Antiaging Agent TMDQ *7 | 1.0 | 1.0 | 1.0 | 1.0 | 1.0 | 1.0 | 1.0 | 1.0 | 1.0 |
|  |  | Zinc Flower | 2.5 | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 0.6 | 0.6 | 0.6 | 0.6 |
|  |  | Vulcanization Promoter MBTS *8 | 1.0 | 1.0 | 1.0 | 1.0 | 1.0 | 1.0 | 1.0 | 1.0 | 1.0 |
|  |  | Vulcanization Promoter TBBS *9 | 0.6 | 0.6 | 0.6 | 0.6 | 0.6 | 0.6 | 0.6 | 0.6 | 0.6 |
|  |  | Sulfur | 1.5 | 1.5 | 1.5 | 1.5 | 1.5 | 1.5 | 1.5 | 1.5 | 1.5 |
| Highest Temperature of Rubber Composition in First Stage of Kneading (° C.) | | | 150 | 150 | 150 | 150 | 150 | 150 | 150 | 150 | 150 |
| Highest Temperature of Rubber Composition in Second Stage of Kneading (° C.) | | | 130 | 130 | 130 | 130 | 130 | 130 | — | — | — |
| Number of Total Stages of Kneading | | | 3 | 3 | 3 | 3 | 3 | 3 | 2 | 2 | 2 |
| Vulcanizate Physical Property | Low-Heat-Generation Property (tanδ index) | | 124 | 124 | 124 | 126 | 118 | 123 | 100 | 103 | 102 |

[Notes]
*1 to *18 are all the same as in Table 1 to Table 5
*31: Ouchi Shinko Chemical's trade name "Nocceler ZIX-O"

TABLE 38

| | | Part by mass | Example | | | | | | | | | Comparative Example | |
|---|---|---|---|---|---|---|---|---|---|---|---|---|---|
| | | | 215 | 221 | 222 | 223 | 224 | 225 | 226 | 227 | 228 | 1 | 8 |
| Formulation | First Stage of Kneading | Emulsion-Polymerized SBR-A *1 | 100 | 100 | 100 | 100 | 100 | 100 | 100 | 100 | 100 | 100 | 100 |
| | | Carbon Black N220 *2 | 10 | 10 | 10 | 10 | 10 | 10 | 10 | 10 | 10 | 10 | 10 |
| | | Silica *3 | 50 | 50 | 50 | 50 | 50 | 50 | 50 | 50 | 50 | 50 | 50 |
| | | Silane Coupling Agent Si75 *4 | 4.0 | 4.0 | 4.0 | 4.0 | 4.0 | 4.0 | 4.0 | 4.0 | 4.0 | 4.0 | 4.0 |
| | | Aromatic Oil | 30 | 30 | 30 | 30 | 30 | 30 | 30 | 30 | 30 | 30 | 30 |
| | | Stearic Acid | 2.0 | 2.0 | 2.0 | 2.0 | 2.0 | 2.0 | — | — | — | 2.0 | 2.0 |
| | | Antiaging Agent 6PPD *5 | 1.0 | 1.0 | 1.0 | 1.0 | 1.0 | 1.0 | — | — | — | 1.0 | 1.0 |
| | | Zinc Isopropylxanthate *31 | — | — | — | — | — | — | — | — | — | — | — |
| | Second Stage of Kneading | Zinc Isopropylxanthate *31 | 1.0 | 1.0 | 1.0 | 1.0 | 1.0 | 1.0 | 1.0 | 1.0 | 1.0 | — | — |
| | Final Stage of Kneading | Stearic Acid | — | — | — | — | — | — | 2.0 | 2.0 | 2.0 | — | — |
| | | Antiaging Agent 6PPD *5 | — | — | — | — | — | — | 1.0 | 1.0 | 1.0 | — | — |
| | | Antiaging Agent TMDQ *7 | 1.0 | 1.0 | 1.0 | 1.0 | 1.0 | 1.0 | 1.0 | 1.0 | 1.0 | 1.0 | 1.0 |
| | | Zinc Flower | 2.5 | 2.5 | 2.5 | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 | 0.6 | 0.6 | 0.6 |
| | | Vulcanization Promoter MBTS *8 | 1.0 | 1.0 | 1.0 | 1.0 | 1.0 | 1.0 | 1.0 | 1.0 | 1.0 | 1.0 | 1.0 |
| | | Vulcanization Promoter TBBS *9 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 |
| | Highest Temperature of Rubber Composition in First Stage of Kneading (° C.) | | 150 | 160 | 170 | 160 | 170 | 170 | 160 | 170 | 170 | 150 | 170 |
| | Highest Temperature of Rubber Composition in Second Stage of Kneading (° C.) | | 130 | 130 | 130 | 150 | 150 | 170 | 130 | 130 | 150 | — | — |
| | Number of Total Stages of Kneading | | 3 | 3 | 3 | 3 | 3 | 3 | 3 | 3 | 3 | 2 | 2 |
| Vulcanizate Physical Property | | Low-Heat-Generation Property (tanδ index) | 124 | 124 | 125 | 125 | 126 | 126 | 125 | 125 | 127 | 100 | 107 |

[Notes]
*1 to *18 are all the same as in Table 1 to Table 5, and *31 is the same as in Table 37

TABLE 39

| | | Part by mass | Example | | | | | | Comparative Example | |
|---|---|---|---|---|---|---|---|---|---|---|
| | | | 215 | 229 | 230 | 231 | 232 | 233 | 1 | 9 |
| Formulation | First Stage of Kneading | Emulsion-Polymerized SBR-A *1 | 100 | 100 | 100 | 100 | — | — | 100 | — |
| | | Solution-Polymerized SBR-B *10 | — | — | — | — | 100 | 100 | — | 100 |
| | | Carbon Black N220 *2 | 10 | 10 | 10 | 10 | 10 | 10 | 10 | 10 |
| | | Silica *3 | 50 | 50 | 50 | 50 | 50 | 50 | 50 | 50 |
| | | Silane Coupling Agent Si75 *4 | 4.0 | 4.0 | 4.0 | 4.0 | 4.0 | 4.0 | 4.0 | 4.0 |
| | | Aromatic Oil | 30 | 30 | 30 | 30 | 30 | 30 | 30 | 30 |
| | | Stearic Acid | 2.0 | 2.0 | 2.0 | 2.0 | 2.0 | 2.0 | 2.0 | 2.0 |
| | | Antiaging Agent 6PPD *5 | 1.0 | 1.0 | 1.0 | 1.0 | 1.0 | 1.0 | 1.0 | 1.0 |
| | Second Stage of Kneading | Zinc Isopropylxanthate *31 | 1.0 | 1.0 | 1.0 | 1.0 | 1.0 | 1.0 | — | — |
| | Final Stage of Kneading | Antiaging Agent TMDQ *7 | 1.0 | 1.0 | 1.0 | 1.0 | 1.0 | 1.0 | 1.0 | 1.0 |
| | | Zinc Flower | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 |
| | | Vulcanization Promoter MBTS *8 | 1.0 | 1.0 | 1.0 | 1.0 | 1.0 | 1.0 | 1.0 | 1.0 |
| | | Vulcanization Promoter TBBS *9 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 |
| | Highest Temperature of Rubber Composition in First Stage of Kneading (° C.) | | 150 | 150 | 150 | 150 | 150 | 150 | 150 | 150 |
| | Highest Temperature of Rubber Composition in Second Stage of Kneading (° C.) | | 150 | 170 | 130 | 110 | 150 | 170 | — | — |
| | Number of Total Stages of Kneading | | 3 | 3 | 3 | 3 | 3 | 3 | 2 | 2 |
| Vulcanizate Physical Property | | Low-Heat-Generation Property (tanδ index) | 125 | 126 | 125 | 114 | 125 | 126 | 100 | 102 |

[Notes]
*1 to *18 are all the same as in Table 1 to Table 5, and *31 is the same as in Table 37

TABLE 40

|  |  | Part by mass | Example | | | | | | | Comparative Example | |
|---|---|---|---|---|---|---|---|---|---|---|---|
|  |  |  | 234 | 235 | 236 | 237 | 238 | 239 | 240 | 10 | 16 |
| Formulation | First Stage of Kneading | Emulsion-Polymerized SBR-A *1 | 75 | 50 | 25 | 80 | — | 80 | — | 75 | — |
|  |  | Solution-Polymerized SBR-B *10 | 25 | 50 | 75 | — | 80 | — | 80 | 25 | 80 |
|  |  | Natural Rubber *11 | — | — | — | 20 | 20 | — | — | — | — |
|  |  | Unmodified BR *12 | — | — | — | — | — | 20 | 20 | — | 20 |
|  |  | Silane Coupling Agent Si75 *4 | 10 | 10 | 10 | 10 | 10 | 10 | 10 | 10 | 10 |
|  |  | Silica *3 | 50 | 50 | 50 | 50 | 50 | 50 | 50 | 50 | 50 |
|  |  | Silane Coupling Agent Si69 *4 | 4.0 | 4.0 | 4.0 | 4.0 | 4.0 | 4.0 | 4.0 | 4.0 | 4.0 |
|  |  | Aromatic Oil | 30 | 30 | 30 | 30 | 30 | 30 | 30 | 30 | 30 |
|  |  | Stearic Acid | 2.0 | 2.0 | 2.0 | 2.0 | 2.0 | 2.0 | 2.0 | 2.0 | 2.0 |
|  |  | Antiaging Agent 6PPD *5 | 1.0 | 1.0 | 1.0 | 1.0 | 1.0 | 1.0 | 1.0 | 1.0 | 1.0 |
|  | Second Stage of Kneading | Zinc Isopropylxanthate *31 | 1.0 | 1.0 | 1.0 | 1.0 | 1.0 | 1.0 | 1.0 | — | — |
|  | Final Stage of Kneading | Antiaging Agent TMDQ *7 | 1.0 | 1.0 | 1.0 | 1.0 | 1.0 | 1.0 | 1.0 | 1.0 | 1.0 |
|  |  | Zinc Flower | 2.5 | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 0.6 | 0.6 | 0.6 | 0.6 |
|  |  | Vulcanization Promoter MBTS *8 | 1.0 | 1.0 | 1.0 | 1.0 | 1.0 | 1.0 | 1.0 | 1.0 | 1.0 |
|  |  | Vulcanization Promoter TBBS *9 | 0.6 | 0.6 | 0.6 | 0.6 | 0.6 | 0.6 | 0.6 | 0.6 | 0.6 |
|  |  | Sulfur | 1.5 | 1.5 | 1.5 | 1.5 | 1.5 | 1.5 | 1.5 | 1.5 | 1.5 |
| Highest Temperature of Rubber Composition in First Stage of Kneading (° C.) | | | 150 | 150 | 150 | 150 | 150 | 150 | 150 | 150 | 150 |
| Highest Temperature of Rubber Composition in Second Stage of Kneading (° C.) | | | 130 | 130 | 130 | 130 | 130 | 130 | 130 | — | — |
| Number of Total Stages of Kneading | | | 3 | 3 | 3 | 3 | 3 | 3 | 3 | 2 | 2 |
| Vulcanizate Physical Property | | Low-Heat-Generation Property (tanδ index) | 123 | 123 | 122 | 130 | 130 | 134 | 134 | 100 | 114 |

[Notes]
*1 to *18 are all the same as in Table 1 to Table 5, and *31 is the same as in Table 37

TABLE 41

|  |  | Part by mass | Example | | | | | | | | Comparative Example | |
|---|---|---|---|---|---|---|---|---|---|---|---|---|
|  |  |  | 241 | 242 | 243 | 244 | 245 | 246 | 247 | 248 | 17 | 18 |
| Formulation | First Stage of Kneading | Emulsion-Polymerized SBR-C *13 | 68.75 | 68.75 | 68.75 | 68.75 | 68.75 | 68.75 | 68.75 | 68.75 | 68.75 | 68.75 |
|  |  | Solution-Polymerized SBR-D *14 | 68.75 | 68.75 | 68.75 | 68.75 | 68.75 | 68.75 | 68.75 | 68.75 | 68.75 | 68.75 |
|  |  | Carbon Black N220 *2 | 10 | 10 | 10 | 10 | 10 | 10 | 10 | 10 | 10 | 10 |
|  |  | Silica *3 | 80 | 80 | 80 | 80 | 80 | 80 | 80 | 80 | 80 | 80 |
|  |  | Silane Coupling Agent Si75 *4 | 6.5 | — | — | — | 6.5 | — | — | — | 6.5 | 6.5 |
|  |  | Silane Coupling Agent NXT *15 | — | 6.5 | — | — | — | 6.5 | — | — | — | — |
|  |  | Silane Coupling Agent NXT-Z *16 | — | — | 6.5 | — | — | — | 6.5 | — | — | — |
|  |  | Silane Coupling Agent *17 | — | — | — | 6.5 | — | — | — | 6.5 | — | — |
|  |  | Aromatic Oil | 5.0 | 5.0 | 5.0 | 5.0 | 5.0 | 5.0 | 5.0 | 5.0 | 5.0 | 5.0 |
|  |  | Stearic Acid | 2.0 | 2.0 | 2.0 | 2.0 | — | — | — | — | 2.0 | — |
|  |  | Antiaging Agent 6PPD *5 | 1.0 | 1.0 | 1.0 | 1.0 | — | — | — | — | 1.0 | — |
|  | Second Stage of Kneading | Zinc Isopropylxanthate *31 | 1.0 | 1.0 | 1.0 | 1.0 | 1.0 | 1.0 | 1.0 | 1.0 | — | — |
|  | Final Stage of Kneading | Stearic Acid | — | — | — | — | 2.0 | 2.0 | 2.0 | 2.0 | — | 2.0 |
|  |  | Antiaging Agent 6PPD *5 | — | — | — | — | 1.0 | 1.0 | 1.0 | 1.0 | — | 1.0 |
|  |  | Zinc Flower | 3.0 | 3.0 | 3.0 | 3.0 | 3.0 | 3.0 | 3.0 | 3.0 | 3.0 | 3.0 |
|  |  | 1,3-Diphenylguanidine *6 | 1.0 | 1.0 | 1.0 | 1.0 | 1.0 | 1.0 | 1.0 | 1.0 | 1.0 | 1.0 |
|  |  | Vulcanization Promoter MBTS *8 | 0.8 | 0.8 | 0.8 | 0.8 | 0.8 | 0.8 | 0.8 | 0.8 | 0.8 | 0.8 |
|  |  | Vulcanization Promoter CBS *18 | 1.5 | 1.5 | 1.5 | 1.5 | 1.5 | 1.5 | 1.5 | 1.5 | 1.5 | 1.5 |
|  |  | Sulfur | 1.5 | 1.5 | 1.5 | 1.5 | 1.5 | 1.5 | 1.5 | 1.5 | 1.5 | 1.5 |
| Highest Temperature of Rubber Composition in First Stage of Kneading (° C.) | | | 150 | 150 | 150 | 150 | 150 | 150 | 150 | 150 | 150 | 150 |
| Highest Temperature of Rubber Composition in Second Stage of Kneading (° C.) | | | 130 | 130 | 130 | 130 | 130 | 130 | 130 | 130 | — | — |
| Number of Total Stages of Kneading | | | 3 | 3 | 3 | 3 | 3 | 3 | 3 | 3 | 2 | 2 |
| Vulcanizate Physical Property | | Low-Heat-Generation Property (tanδ index) | 120 | 12 | 124 | 128 | 121 | 125 | 120 | 130 | 100 | 100 |

[Notes]
*1 to *18 are all the same as in Table 1 to Table 5, and *31 is the same as in Table 37

TABLE 42

| | | Part by mass | Example | | | | | | | | | Comparative Example | | |
|---|---|---|---|---|---|---|---|---|---|---|---|---|---|---|
| | | | 249 | 250 | 251 | 252 | 253 | 254 | 255 | 256 | 257 | 44 | 45 | 46 |
| Formulation | First Stage of Kneading | Emulsion-Polymerized SBR-A *1 | 100 | 100 | 100 | 100 | 100 | 100 | 100 | 100 | 100 | 100 | 100 | 100 |
| | | Carbon Black N220 *2 | 10 | 10 | 10 | 10 | 10 | 10 | 10 | 10 | 10 | 10 | 10 | 10 |
| | | Silica *32 | 50 | 50 | 50 | 50 | 50 | 50 | 50 | 50 | 50 | 50 | 50 | 50 |
| | | Silane Coupling Agent Si75 *4 | 4.0 | 4.0 | 4.0 | 4.0 | 4.0 | 4.0 | 4.0 | 4.0 | 4.0 | 4.0 | 4.0 | 4.0 |
| | | Aromatic Oil | 30 | 30 | 30 | 30 | 30 | 30 | 30 | 30 | 30 | 30 | 30 | 30 |
| | | Stearic Acid | 2 | 2 | 2 | 2 | 2 | 2 | — | — | — | 2 | 2 | 2 |
| | | Antiaging Agent 6PPD *5 | 1 | 1 | 1 | 1 | 1 | 1 | — | — | — | 1 | 1 | 1 |
| | Second Stage of Kneading | 1,3-Diphenylguanidine *6 | 1 | 1 | 1 | 1 | 1 | 1 | 1 | 1 | 1 | — | — | — |
| | Final Stage of Kneading | Stearic Acid | — | — | — | — | — | — | 2 | 2 | 2 | — | — | — |
| | | Antiaging Agent 6PPD *5 | — | — | — | — | — | — | 1 | 1 | 1 | — | — | — |
| | | Antiaging Agent TMDQ *7 | 1 | 1 | 1 | 1 | 1 | 1 | 1 | 1 | 1 | 1 | 1 | 1 |
| | | Zinc Flower | 2.5 | 2.5 | 2.5 | 2.5 | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 | 0.6 | 0.6 | 0.6 | 0.6 |
| | | Vulcanization Promoter MBTS *8 | 1 | 1 | 1 | 1 | 1 | 1 | 1 | 1 | 1 | 1 | 1 | 1 |
| | | Vulcanization Promoter TBBS *9 | 0.6 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 | 1.5 |
| | Highest Temperature of Rubber Composition in First Stage of Kneading (° C.) | | 150 | 160 | 170 | 160 | 170 | 170 | 160 | 170 | 170 | 150 | 160 | 170 |
| | Highest Temperature of Rubber Composition in Second Stage of Kneading (° C.) | | 130 | 130 | 130 | 150 | 150 | 170 | 130 | 130 | 150 | 130 | 130 | 130 |
| | Number of Total Stages of Kneading | | 3 | 3 | 3 | 3 | 3 | 3 | 3 | 3 | 3 | 3 | 3 | 3 |
| Vulcanizate Physical Property | | Low-Heat-Generation Property (tanδ index) | 140 | 145 | 150 | 155 | 157 | 159 | 150 | 153 | 156 | 100 | 105 | 107 |

[Notes]
*1 to *9 are all the same as in Table 1
*32: Tosoh Silica's trade name "Nipseal KQ", BET specific surface area 240 m$^2$/g

TABLE 43

| | | Part by mass | Example | | | | | | | | | Comparative Example | | |
|---|---|---|---|---|---|---|---|---|---|---|---|---|---|---|
| | | | 258 | 259 | 260 | 261 | 262 | 263 | 264 | 265 | 266 | 47 | 48 | 49 |
| Formulation | First Stage of Kneading | Emulsion-Polymerized SBR-A *1 | 100 | 100 | 100 | 100 | 100 | 100 | 100 | 100 | 100 | 100 | 100 | 100 |
| | | Carbon Black N220 *2 | 10 | 10 | 10 | 10 | 10 | 10 | 10 | 10 | 10 | 10 | 10 | 10 |
| | | Silica *33 | 50 | 50 | 50 | 50 | 50 | 50 | 50 | 50 | 50 | 50 | 50 | 50 |
| | | Silane Coupling Agent Si75 *4 | 4.0 | 4.0 | 4.0 | 4.0 | 4.0 | 4.0 | 4.0 | 4.0 | 4.0 | 4.0 | 4.0 | 4.0 |
| | | Aromatic Oil | 30 | 30 | 30 | 30 | 30 | 30 | 30 | 30 | 30 | 30 | 30 | 30 |
| | | Stearic Acid | 2 | 2 | 2 | 2 | 2 | 2 | — | — | — | 2 | 2 | 2 |
| | | Antiaging Agent 6PPD *5 | 1 | 1 | 1 | 1 | 1 | 1 | — | — | — | 1 | 1 | 1 |
| | Second Stage of Kneading | 1,3-Diphenylguanidine *6 | 1 | 1 | 1 | 1 | 1 | 1 | 1 | 1 | 1 | — | — | — |
| | Final Stage of Kneading | Stearic Acid | — | — | — | — | — | — | 2 | 2 | 2 | — | — | — |
| | | Antiaging Agent 6PPD *5 | — | — | — | — | — | — | 1 | 1 | 1 | — | — | — |
| | | Antiaging Agent TMDQ *7 | 1 | 1 | 1 | 1 | 1 | 1 | 1 | 1 | 1 | 1 | 1 | 1 |
| | | Zinc Flower | 2.5 | 2.5 | 2.5 | 2.5 | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 | 0.6 | 0.6 | 0.6 | 0.6 |
| | | Vulcanization Promoter MBTS *8 | 1 | 1 | 1 | 1 | 1 | 1 | 1 | 1 | 1 | 1 | 1 | 1 |
| | | Vulcanization Promoter TBBS *9 | 0.6 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 | 1.5 |
| | Highest Temperature of Rubber Composition in First Stage of Kneading ((C.) | | 150 | 160 | 170 | 160 | 170 | 170 | 160 | 170 | 170 | 150 | 160 | 170 |
| | Highest Temperature of Rubber Composition in Second Stage of Kneading ((C.) | | 130 | 130 | 130 | 150 | 150 | 170 | 130 | 130 | 150 | 130 | 130 | 130 |
| | Number of Total Stages of Kneading | | 3 | 3 | 3 | 3 | 3 | 3 | 3 | 3 | 3 | 3 | 3 | 3 |
| Vulcanizate Physical Property | | Low-Heat-Generation Property (tan(index) | 128 | 130 | 133 | 133 | 139 | 142 | 130 | 135 | 132 | 100 | 104 | 106 |

[Notes]
*1 to *9 are all the same as in Table 1
*33: Tosoh Silica's trade name "Nipseal NS", BET specific surface area 160 m2/g

TABLE 44

| | Part by mass | Example | | | | | | | | | Comparative Example | | |
|---|---|---|---|---|---|---|---|---|---|---|---|---|---|
| | | 267 | 268 | 269 | 270 | 271 | 272 | 273 | 274 | 275 | 50 | 51 | 52 |
| Formulation | First Stage of Kneading | | | | | | | | | | | | |
| | Emulsion-Polymerized SBR-A *1 | 100 | 100 | 100 | 100 | 100 | 100 | 100 | 100 | 100 | 100 | 100 | 100 |
| | Carbon Black N220 *2 | 10 | 10 | 10 | 10 | 10 | 10 | 10 | 10 | 10 | 10 | 10 | 10 |
| | Silica *34 | 50 | 50 | 50 | 50 | 50 | 50 | 50 | 50 | 50 | 50 | 50 | 50 |
| | Silane Coupling Agent Si75 *4 | 4.0 | 4.0 | 4.0 | 4.0 | 4.0 | 4.0 | 4.0 | 4.0 | 4.0 | 4.0 | 4.0 | 4.0 |
| | Aromatic Oil | 30 | 30 | 30 | 30 | 30 | 30 | 30 | 30 | 30 | 30 | 30 | 30 |
| | Stearic Acid | 2 | 2 | 2 | 2 | 2 | 2 | — | — | — | 2 | 2 | 2 |
| | Antiaging Agent 6PPD *5 | 1 | 1 | 1 | 1 | 1 | 1 | — | — | — | 1 | 1 | 1 |
| Second Stage of Kneading | 1,3-Diphenylguanidine *6 | 1 | 1 | 1 | 1 | 1 | 1 | 1 | 1 | 1 | — | — | — |
| Final Stage of Kneading | Stearic Acid | — | — | — | — | — | — | 2 | 2 | 2 | — | — | — |
| | Antiaging Agent 6PPD *5 | — | — | — | — | — | — | 1 | 1 | 1 | — | — | — |
| | Antiaging Agent TMDQ *7 | 1 | 1 | 1 | 1 | 1 | 1 | 1 | 1 | 1 | 1 | 1 | 1 |
| | Zinc Flower | 2.5 | 2.5 | 2.5 | 2.5 | 2.5 | 2.5 | 2.5 | 2.5 | 2.5 | 2.5 | 2.5 | 2.5 |
| | 1,3-Diphenylguanidine *6 | 0.6 | 0.6 | 0.6 | 0.6 | 0.6 | 0.6 | 0.6 | 0.6 | 0.6 | 0.6 | 0.6 | 0.6 |
| | Vulcanization Promoter MBTS *8 | 1 | 1 | 1 | 1 | 1 | 1 | 1 | 1 | 1 | 1 | 1 | 1 |
| | Vulcanization Promoter TBBS *9 | 0.6 | 0.6 | 0.6 | 0.6 | 0.6 | 0.6 | 0.6 | 0.6 | 0.6 | 0.6 | 0.6 | 0.6 |
| | Sulfur | 1.5 | 1.5 | 1.5 | 1.5 | 1.5 | 1.5 | 1.5 | 1.5 | 1.5 | 1.5 | 1.5 | 1.5 |
| Highest Temperature of Rubber Composition in First Stage of Kneading (° C.) | | 150 | 160 | 170 | 160 | 170 | 170 | 160 | 170 | 170 | 150 | 160 | 170 |
| Highest Temperature of Rubber Composition in Second Stage of Kneading (° C.) | | 130 | 130 | 130 | 150 | 150 | 170 | 130 | 130 | 150 | 130 | 130 | 130 |
| Number of Total Stages of Kneading | | 3 | 3 | 3 | 3 | 3 | 3 | 3 | 3 | 3 | 3 | 3 | 3 |
| Vulcanizate Physical Property | Low-Heat-Generation Property (tanδ index) | 116 | 119 | 120 | 120 | 125 | 128 | 120 | 122 | 124 | 100 | 103 | 104 |

[Notes]
*1 to *9 are all the same as in Table 1
*34: Tosoh Silica's trade name "Nipseal NA", BET specific surface area 135 m$^2$/g

TABLE 45

| | Part by mass | Example | | | | | | | | | Comparative Example | | |
|---|---|---|---|---|---|---|---|---|---|---|---|---|---|
| | | 276 | 277 | 278 | 279 | 280 | 281 | 282 | 283 | 284 | 53 | 54 | 55 |
| Formulation | First Stage of Kneading | | | | | | | | | | | | |
| | Emulsion-Polymerized SBR-A *1 | 100 | 100 | 100 | 100 | 100 | 100 | 100 | 100 | 100 | 100 | 100 | 100 |
| | Carbon Black N220 *2 | 10 | 10 | 10 | 10 | 10 | 10 | 10 | 10 | 10 | 10 | 10 | 10 |
| | Silica *35 | 50 | 50 | 50 | 50 | 50 | 50 | 50 | 50 | 50 | 50 | 50 | 50 |
| | Silane Coupling Agent Si75 *4 | 4.0 | 4.0 | 4.0 | 4.0 | 4.0 | 4.0 | 4.0 | 4.0 | 4.0 | 4.0 | 4.0 | 4.0 |
| | Aromatic Oil | 30 | 30 | 30 | 30 | 30 | 30 | 30 | 30 | 30 | 30 | 30 | 30 |
| | Stearic Acid | 2 | 2 | 2 | 2 | 2 | 2 | — | — | — | 2 | 2 | 2 |
| | Antiaging Agent 6PPD *5 | 1 | 1 | 1 | 1 | 1 | 1 | — | — | — | 1 | 1 | 1 |
| Second Stage of Kneading | 1,3-Diphenylguanidine *6 | 1 | 1 | 1 | 1 | 1 | 1 | 1 | 1 | 1 | — | — | — |
| Final Stage of Kneading | Stearic Acid | — | — | — | — | — | — | 2 | 2 | 2 | — | — | — |
| | Antiaging Agent 6PPD *5 | — | — | — | — | — | — | 1 | 1 | 1 | — | — | — |
| | Antiaging Agent TMDQ *7 | 1 | 1 | 1 | 1 | 1 | 1 | 1 | 1 | 1 | 1 | 1 | 1 |
| | Zinc Flower | 2.5 | 2.5 | 2.5 | 2.5 | 2.5 | 2.5 | 2.5 | 2.5 | 2.5 | 2.5 | 2.5 | 2.5 |
| | 1,3-Diphenylguanidine *6 | 0.6 | 0.6 | 0.6 | 0.6 | 0.6 | 0.6 | 0.6 | 0.6 | 0.6 | 0.6 | 0.6 | 0.6 |
| | Vulcanization Promoter MBTS *8 | 1 | 1 | 1 | 1 | 1 | 1 | 1 | 1 | 1 | 1 | 1 | 1 |
| | Vulcanization Promoter TBBS *9 | 0.6 | 0.6 | 0.6 | 0.6 | 0.6 | 0.6 | 0.6 | 0.6 | 0.6 | 0.6 | 0.6 | 0.6 |
| | Sulfur | 1.5 | 1.5 | 1.5 | 1.5 | 1.5 | 1.5 | 1.5 | 1.5 | 1.5 | 1.5 | 1.5 | 1.5 |
| Highest Temperature of Rubber Composition in First Stage of Kneading (° C.) | | 150 | 160 | 170 | 160 | 170 | 170 | 160 | 170 | 170 | 150 | 160 | 170 |
| Highest Temperature of Rubber Composition in Second Stage of Kneading (° C.) | | 130 | 130 | 130 | 150 | 150 | 170 | 130 | 130 | 150 | 130 | 130 | 130 |
| Number of Total Stages of Kneading | | 3 | 3 | 3 | 3 | 3 | 3 | 3 | 3 | 3 | 3 | 3 | 3 |
| Vulcanizate Physical Property | Low-Heat-Generation Property (tanδ index) | 108 | 109 | 113 | 110 | 115 | 117 | 114 | 116 | 117 | 100 | 102 | 103 |

[Notes]
*1 to *9 are all the same as in Table 1
*35: Tosoh Silica's trade name "Nipseal ER", BET specific surface area 95 m$^2$/g As obvious from Table 1 to Table 45, the rubber compositions of Examples 1 to 284 are all better than the comparative rubber compositions of Comparative Examples 1 to 55 in point of the low-heat-generation property (tan δ index).

INDUSTRIAL APPLICABILITY

According to the production method for a rubber composition of the present invention, it is possible to obtain a rubber composition excellent in low-heat-generation property with successfully inhibiting the coupling function activity of the silane coupling agent used from lowering and with further increasing the coupling function activity thereof, and is therefore favorably used as a production method for constitutive members of various types of pneumatic tires for passenger cars, small-size trucks, minivans, pickup trucks and big-size vehicles (trucks, buses, construction vehicles, etc.) and others, especially for tread members of pneumatic radial tires.

The invention claimed is:

1. A method for producing a rubber composition containing a rubber component (A) of at least one selected from the group consisting of natural rubbers and synthetic dienic rubbers, a filler containing an inorganic filler (B), a silane coupling agent (C) and at least one vulcanization promoter (D) selected from the group consisting of guanidines, sulfenamides thiazoles, thiruams, dithiocarbamate salts, thioureas and xanthate salts, wherein the rubber composition is kneaded in at least three stages, in the first stage (X) of kneading, the rubber component (A), all or part of the inorganic filler (B), and all or a part of the silane coupling agent (C) are kneaded, then in the stage (Y) on and after the second stage of kneading but before the final stage, the vulcanization promoter (D) is added and kneaded, and in the final stage (Z) of kneading, a vulcanizing agent is added and kneaded,
wherein the highest temperature of the rubber composition in stage (Y) of kneading is 120 to 190° C. and wherein the highest temperature of the rubber composition in the first stage (X) of kneading is from 140 to 190° C., and
wherein the number of molecules of the vulcanization promoter (D) in the rubber composition in the stage (Y) of kneading is from 0.1 to 1.0 time the number of molecules of the silane coupling agent (C) therein.

2. The method for producing a rubber composition according to claim 1, wherein the silane coupling agent (C) is at least one compound selected from a group consisting of compounds represented by the following general formulae (I) to (IV):

[Chemical Formula 1]

$$(R^1O)_{3-p}(R^2)_p Si—R^3—S_a—R^3—Si(OR^1)_{3-r}(R^2)_r \qquad (I)$$

wherein multiple $R^1$'s may be the same or different, each representing a linear, cyclic or branched alkyl group having from 1 to 8 carbon atoms, a linear or branched alkoxylalkyl group having from 2 to 8 carbon atoms, or a hydrogen atom; multiple $R^2$'s may be the same or different, each representing a linear, cyclic or branched alkyl group having from 1 to 8 carbon atoms; multiple $R^3$'s may be the same or different, each representing a linear or branched alkylene group having from 1 to 8 carbon atoms; a indicates from 2 to 6 as a mean value; p and r may be the same or different, each indicating from 0 to 3 as a mean value, provided that both p and r are not 3 at the same time;

[Chemical Formula 2]

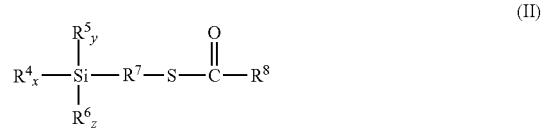

(II)

wherein $R^4$ represents a monovalent group selected from the group consisting of —Cl, —Br, $R^9O$—, $R^9C(=O)O$—, $R^9R^{10}C=NO$—, $R^9R^{10}CNO$—, $R^9R^{10}N$—, and —$(OSiR^9R^{10})_h(OSiR^9R^{10}R^{11})$ where $R^9$, $R^{10}$ and $R^{11}$ each represents a hydrogen atom or a monovalent hydrocarbon group having from 1 to 18 carbon atoms; and h indicates from 1 to 4 as a mean value; $R^5$ represents $R^4$, a hydrogen atom, or a hydrocarbon group having from 1 to 18 carbon atoms; $R^6$ represents $R^4$, $R^5$, a hydrogen atom, or a group —$[O(R^{12}O)_j]_{0.5}$ where $R^{12}$ represents an alkylene group having from 1 to 18 carbon atoms; and j indicates an integer of from 1 to 4; $R^7$ represents a divalent hydrocarbon group having from 1 to 18 carbon atoms; $R^8$ represents a monovalent hydrocarbon group having from 1 to 18 carbon atoms; x, y and z each indicates a number satisfying the relationship of x+y+2z=3, 0≤x≤3, 0≤y≤2, 0≤z≤1;

[Chemical Formula 3]

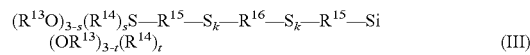

(III)

wherein multiple $R^{13}$'s may be the same or different, each representing a linear, cyclic or branched alkyl group having from 1 to 8 carbon atoms, a linear or branched alkoxylalkyl group having from 2 to 8 carbon atoms, or a hydrogen atom; multiple $R^{14}$'s may be the same or different, each representing a linear, cyclic or branched alkyl group having from 1 to 8 carbon atoms; multiple $R^{15}$'s may be the same or different, each representing a linear or branched alkylene group having from 1 to 8 carbon atoms; $R^{16}$ represents a divalent group of a general formula —S—$R^{17}$—S—, —$R^{18}$—$S_{m1}$—$R^{19}$— or —$R^{20}$—$S_{m2}$—$R^{21}$—$S_{m3}$—$R^{22}$— where $R^{17}$ to $R^{22}$ each represents a divalent hydrocarbon group, a divalent aromatic group or a divalent organic group containing a hetero element except sulfur and oxygen, having from 1 to 20 carbon atoms; m1, m2 and m3 may be the same or different, each indicating from 1 to less than 4 as a mean value; multiple k's may be the same or different, each indicating from 1 to 6 as a mean value; s and t each indicates from 0 to 3 as a mean value, provided that both s and t are not 3 at the same time;

[Chemical Formula 4]

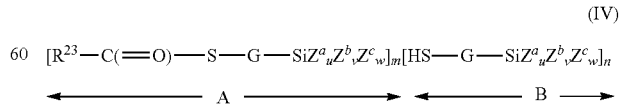

(IV)

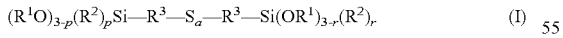

wherein $R^{23}$ represents a linear, branched or cyclic alkyl group having from 1 to 20 carbon atoms; multiple G's may be the same or different, each representing an alkanediyl group or an alkenediyl group having from 1 to 9 carbon atoms; multiple $Z^a$'s may be the same or different, each representing a functional group capable of bonding to the two silicon atoms and selected from $[-O-]_{0.5}$, $[-O-G-]_{0.5}$ and $[-O-G-O-]_{0.5}$; multiple $Z^b$'s may be the same or different, each representing a functional group capable of bonding to the two silicon atoms and represented by $[-O-G-O-]_{0.5}$; multiple $Z^c$'s may be the same or different, each representing a functional group selected from —Cl, —Br, —$OR^a$, $R^a C(=O)O-$, $R^a R^b C=NO-$, $R^a R^b N-$, $R^a-$ and HO-G-O— where G is the same as above; $R^a$ and $R^b$ each represents a linear, branched or cyclic alkyl group having from 1 to 20 carbon atoms; m, n, u, v and w each is $1 \leq m \leq 20$, $0 \leq n \leq 20$, $0 \leq u \leq 3$, $0 \leq v \leq 2$, $0 \leq w \leq 1$, and $(u/2)+v+2w$ is 2 or 3; in case where the formula has multiple A's, then $Z^a_u$, $Z^b_v$ and $Z^c_w$ may be the same or different in those multiple A's; in case where the formula has multiple B's, then $Z^a_u$, $Z^b_v$ and $Z^c_w$ may be the same or different in those multiple B's.

3. The method for producing a rubber composition according to claim 2, wherein the silane coupling agent (C) is a compound represented by the general formula (I).

4. The method for producing a rubber composition according to claim 1, wherein the inorganic filler (B) is silica.

5. The method for producing a rubber composition according to claim 1, wherein the inorganic filler (B) accounts for at least 30% by mass of the filler.

6. The method for producing a rubber composition according to claim 1, wherein the guanidine is at least one compound selected from the group consisting of 1,3-diphenylguanidine, 1,3-di-o-tolylguanidine and 1-o-tolylbiguanide.

7. The method for producing a rubber composition according to claim 1, wherein the sulfenamide is at least one compound selected from the group consisting of N-cyclohexyl-2-benzothiazolylsulfenamide and N-tert-butyl-2-benzothiazolylsulfenamide.

8. The method for producing a rubber composition according to claim 1, wherein the thiazole is at least one compound selected from the group consisting of 2-mercaptobenzothiazole and di-2-benzothiazolyl disulfide.

9. The method for producing a rubber composition according to claim 1, wherein the thiuram is at least one compound selected from the group consisting of tetrakis(2-ethylhexyl)thiuram disulfide and tetrabenzylthiuram disulfide.

10. The method for producing a rubber composition according to claim 1, wherein the thiourea is at least one compound selected from the group consisting of N,N'-diethylthiourea, trimethylthiourea, N,N'-diphenylthiourea and N,N'-dimethylthiourea.

11. The method for producing a rubber composition according to claim 1, wherein the dithiocarbamate salt is at least one compound selected from the group consisting of zinc dibenzyldithiocarbamate, zinc N-ethyl-N-phenyldithiocarbamate, zinc dimethyldithiocarbamate and copper dimethyldithiocarbamate.

12. The method for producing a rubber composition according to claim 1, wherein the xanthate salt is zinc isopropylxanthate.

13. The method for producing a rubber composition according to claim 1, wherein the number of molecules of an organic acid compound contained in the rubber composition in the stage (Y) of kneading is not more than the number of molecules of the vulcanization accelerator (D) added in the stage (Y).

14. The method for producing a rubber composition according to claim 1, comprising the first stage (X) of kneading, the stage (Y) of the second stage of kneading, and the final stage (Z) of the third stage of kneading.

* * * * *